US011958959B2

(12) United States Patent
Katou et al.

(10) Patent No.: US 11,958,959 B2
(45) Date of Patent: Apr. 16, 2024

(54) LENS FOR SPECTACLES AND SPECTACLES

(71) Applicant: FUJIFILM CORPORATION, Tokyo (JP)

(72) Inventors: Takashi Katou, Shizuoka (JP); Daisuke Sasaki, Shizuoka (JP)

(73) Assignee: FUJIFILM CORPORATION, Tokyo (JP)

(*) Notice: Subject to any disclaimer, the term of this patent is extended or adjusted under 35 U.S.C. 154(b) by 603 days.

(21) Appl. No.: 17/174,356

(22) Filed: Feb. 12, 2021

(65) Prior Publication Data

US 2021/0163711 A1 Jun. 3, 2021

Related U.S. Application Data

(63) Continuation of application No. PCT/JP2019/029889, filed on Jul. 30, 2019.

(30) Foreign Application Priority Data

Sep. 5, 2018 (JP) ................................ 2018-166423

(51) Int. Cl.
*C08K 5/45* (2006.01)
*C08K 5/3475* (2006.01)
*C08K 5/41* (2006.01)
*G02B 1/04* (2006.01)
*G02B 5/20* (2006.01)

(52) U.S. Cl.
CPC .............. *C08K 5/45* (2013.01); *C08K 5/3475* (2013.01); *C08K 5/41* (2013.01); *G02B 1/041* (2013.01); *G02B 5/208* (2013.01)

(58) Field of Classification Search
CPC .......... C08K 5/45; C08K 5/41; C08K 5/3475; G02B 5/208; G02B 1/041
USPC ......................................................... 524/84
See application file for complete search history.

(56) References Cited

U.S. PATENT DOCUMENTS

| 2002/0017636 | A1 | 2/2002 | Harada et al. | |
| 2017/0066933 | A1 | 3/2017 | Shiono et al. | |
| 2017/0137444 | A1 | 5/2017 | Sasaki et al. | |
| 2017/0351014 | A1* | 12/2017 | Matsumura | ....... H01L 27/14627 |
| 2019/0196073 | A1 | 6/2019 | Samejima et al. | |
| 2020/0262967 | A1* | 8/2020 | Fromentin | ........... C08K 5/3417 |

FOREIGN PATENT DOCUMENTS

| CN | 105531608 A | 4/2016 |
| CN | 106104319 A | 11/2016 |
| CN | 106575002 A | 4/2017 |
| JP | H08-015805 A | 1/1996 |
| JP | 2000-162431 A | 6/2000 |
| JP | 2002-090521 A | 3/2002 |
| JP | 2008-281973 A | 11/2008 |
| JP | 2010-224282 A | 10/2010 |
| JP | 2017-149820 A | 8/2017 |
| WO | 2007/146933 A2 | 12/2007 |
| WO | 2014/034518 A1 | 3/2014 |
| WO | 2016/031810 A1 | 3/2016 |
| WO | 2016/136784 A1 | 9/2016 |
| WO | 2018/043185 A1 | 3/2018 |
| WO | 2018/082946 A1 | 5/2018 |

OTHER PUBLICATIONS

QCR Solutions, NIR920A, Technical data sheet, 2011. (Year: 2011).*
English language translation of the following: Office action dated Jan. 5, 2023 from the SIPO in a Chinese patent application No. 201980057097.0 corresponding to the instant patent application.
English language translation of the following: Office action dated Jul. 13, 2021 from the JPO in a Japanese patent application No. 2020-541062 corresponding to the instant patent application. This office action translation is submitted now in order to supplement the understanding of the cited reference which is being disclosed in the instant Information Disclosure Statement.
English language translation of the following: Office action dated May 19, 2022 from the SIPO in a Chinese patent application No. 201980057097.0 corresponding to the instant patent application. This office action translation is submitted now in order to supplement the understanding of the cited references which are being disclosed in the instant Information Disclosure Statement.
International Search Report issued in International Application No. PCT/JP2019/029889 dated Oct. 15, 2019.
Written Opinion of the ISA issued in International Application No. PCT/JP2019/029889 dated Oct. 15, 2019.
English language translation of the following: Office action dated Feb. 1, 2022 from the JPO in a Japanese patent application No. 2020-541062 corresponding to the instant patent application. This office action translation is submitted now in order to supplement the understanding of the cited reference which is being disclosed in the instant Information Disclosure Statement.
English language translation of the following: Office action dated Jun. 6, 2023 from the SIPO in a Chinese patent application No. 201980057097.0 corresponding to the instant patent application.

* cited by examiner

*Primary Examiner* — Hui H Chin
(74) *Attorney, Agent, or Firm* — SOLARIS Intellectual Property Group, PLLC

(57) ABSTRACT

A lens for spectacles and spectacles a resin and a near-infrared absorbing agent having a maximum absorption wavelength in a thiourethane resin in a range of more than 700 nm and 1000 nm or less and a transmittance of light at 400 nm of 50% or more and 100% or less.

11 Claims, 4 Drawing Sheets

LENS FOR SPECTACLES AND SPECTACLES

CROSS-REFERENCE TO RELATED APPLICATION

This application is a Continuation of International Application No. PCT/JP2019/0 29889, filed Jul. 30, 2019, which claims priority to Japanese Patent Application No. 2018-166423 filed Sep. 5, 2018. Each of the above applications is hereby expressly incorporated by reference, in its entirety, into the present application.

BACKGROUND OF THE INVENTION

1. Field of the Invention

The present disclosure relates to a lens for spectacles and spectacles.

2. Description of the Related Art

It is known that light of various wavelengths can have an adverse effect on the human eye in a case where it is incident on the human eye directly. In particular, near-infrared light having a wavelength of more than 700 nm and 1000 nm or less has high transmittance in a living body and can penetrate deep into cells without being absorbed, which may cause damage to the optic nerve of the eye.

For example, a lens for spectacles containing a diimmonium-based near-infrared coloring agent has been proposed as a lens for spectacles capable of absorbing near-infrared light (see JP2008-281973 A).

Further, a resin composition capable of absorbing sunlight having a wide range of wavelengths which blocks not only infrared rays but also ultraviolet rays has been proposed, and a wide range of coloring agents have been disclosed as infrared absorbing agents therefor (see JP2017-149820A).

SUMMARY OF THE INVENTION

According to the study by the present inventor, in recent years, near-infrared light has been used in sensors for automated driving in automobiles and the driver is exposed to near-infrared light for a long period of time, which is a problem. In some cases, near-infrared light is used for sensors and other purposes under conditions other than automated driving in automobiles.

Therefore, there is a demand for a technique for effectively blocking near-infrared light for a long period of time without impairing the visibility. As an example, attempts have been made to reduce the influence of near-infrared light on the eye by allowing a spectacle lens to absorb near-infrared light (particularly, light in a wavelength range of more than 700 nm and 1000 nm or less).

However, the diimmonium-based near-infrared coloring agent described as an infrared absorbing agent in JP2008-281973A does not have good compatibility with the resin, which is the material of the plastic lens. Therefore, the diimmonium-based near-infrared coloring agent may precipitate in the case of being applied to a lens for spectacles. Further, diimmonium-based near-infrared coloring agents have low light resistance, so that the coloring agents may be decomposed and deteriorated in long-term use.

Generally, it is required for a lens for spectacles that a change in tint should is hardly recognized in a case where an object is viewed through the lens, but the diimmonium-based near-infrared absorbing coloring agent disclosed herein has a broad absorption waveform, a large half-width of the absorption band in the resin, and absorption of light in the visible region. Therefore, the lens for spectacles containing the diimmonium-based near-infrared absorbing coloring agent may be colored and show deteriorated tint.

An object of the invention disclosed in JP2017-149820A is to provide a resin composition capable of blocking sunlight in a wide wavelength range. Therefore, since no attention is paid to the performance of the resin composition required for the lens for spectacles, that is, only the near-infrared light is blocked while the visible light transmittance is good, the resin composition disclosed in JP2008-281973A has a problem in that in the case of being applied to the lens for spectacles, the resin composition is also colored and visibility is lowered as that in JP2017-149820A.

Furthermore, the near-infrared absorbing agent coloring agents disclosed in these documents, in the case of being contained in the lens for spectacles, have low light resistance, and the compatibility with the resin decreases over time, and this causes an increase in haze of the lens for spectacles.

An object of an embodiment of the present invention is to provide a lens for spectacles capable of blocking near-infrared light in a wavelength range of at least more than 700 nm and 1000 nm or less and having good transmittance of light at a wavelength in the visible light region, in which a change in tint of an object is hardly recognized in a case where the object is viewed through the lens.

An object of another embodiment of the present invention is to provide spectacles comprising the lens for spectacles.

Means for solving the above problems include the following aspects.

<1> A lens for spectacles comprising: a resin; and a near-infrared absorbing agent having a maximum absorption wavelength in a thiourethane resin in a range of more than 700 nm and 1000 nm or less and a transmittance of light having a wavelength of 400 nm of 50% or more and 100% or less.

<2> The lens for spectacles according to <1>, in which a transmittance of the near-infrared absorbing agent at the maximum absorption wavelength is 1% or less, and a transmittance of light having a wavelength of 700 nm is 60% or more and 100% or less.

<3> The lens for spectacles according to <1> or <2>, in which an x value of Lxy coordinate of the near-infrared absorbing agent in the thiourethane resin is in a range of 0.285 or more and 0.350 or less, and a y value thereof is 0.280 or more and 0.350 or less.

<4> The lens for spectacles according to any one of <1> to <3>, in which a ratio D of $A^{max-100}$ to $A^{max}$ is less than 0.20, where $A^{max}$ is an absorbance of the near-infrared absorbing agent in a maximum absorption wavelength band and $A^{max-100}$ is an absorbance at a wavelength shorter than the maximum absorption wavelength by 100 nm.

<5> The lens for spectacles according to any one of <1> to <4>, in which the near-infrared absorbing agent contains at least one selected from a cyanine coloring agent, an oxonol coloring agent, a squarylium coloring agent, or a pyrrolopyrrole coloring agent.

<6> The lens for spectacles according to <5>, in which the near-infrared absorbing agent contains at least one selected from the group consisting of a compound represented by General Formula (1) and a compound represented by General Formula (2):

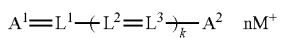  (1)

in General Formula (1), $A^1$ represents a keto form of an acidic nucleus selected from the group consisting of General Formula (1-a) to General Formula (1-x);

$A^2$ represents an enol form of an acidic nucleus selected from the group consisting of General Formula (1-a) to General Formula (1-x), where a hydroxy group in the enol form may be dissociated;

the acidic nuclei represented by $A^1$ and $A^2$ may be the same as or different from each other;

$L^1$, $L^2$, and $L^3$ each independently represent a methine group;

$M^+$ represents a proton or a monovalent counter cation, and n represents a number required to make a positive charge number and a negative charge number of a compound represented by General Formula (1) equal to each other; and k represents 2 or 3,

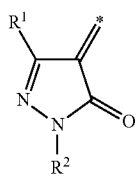  (1-a)

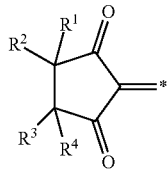  (1-b)

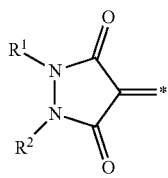  (1-c)

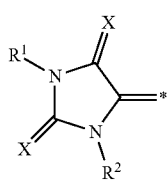  (1-d)

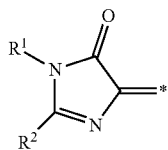  (1-e)

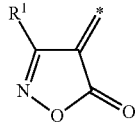  (1-f)

-continued

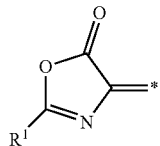  (1-g)

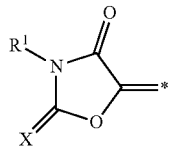  (1-h)

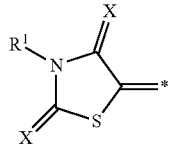  (1-i)

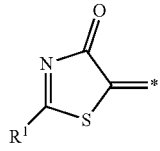  (1-j)

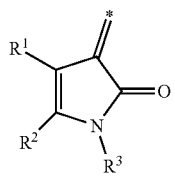  (1-k)

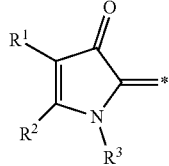  (1-l)

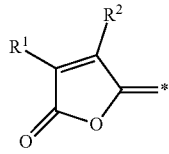  (1-m)

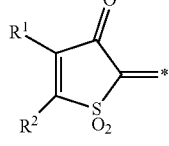  (1-n)

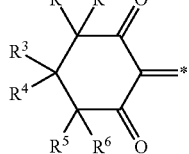  (1-o)

(1-p) 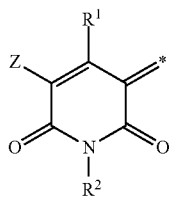

(1-q) 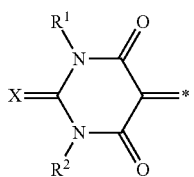

(1-r) 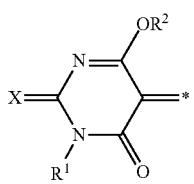

(1-s) 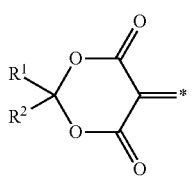

(1-t) 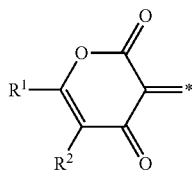

(1-u) 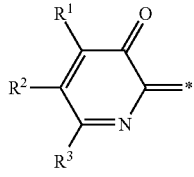

(1-v) 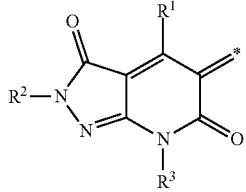

(1-w) 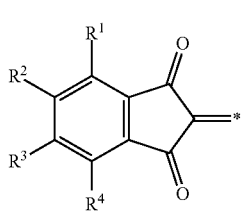

(1-x) 

in General Formula (1-a) to General Formula (1-x), each * represents a position at which the keto form of the acidic nucleus $A^1$ is bonded to $L^1$ and the enol form of the acidic nucleus $A^2$ is bonded to $L^3$;

X represents an oxygen atom or a sulfur atom; Y represents an electron-withdrawing group; Z represents a hydrogen atom, or a carbamoyl group, an alkyl group, an aryl group, a cyano group, a carboxyl group, an acyl group, an alkyloxycarbonyl group, an aryloxycarbonyl group, a halogen atom, an amino group, an acylamino group, an alkylsulfonyl group, an arylsulfonyl group, or a sulfo group; and $R^1$, $R^2$, $R^3$, $R^4$, $R^5$, and $R^6$ each independently represent a hydrogen atom or a monovalent substituent, and

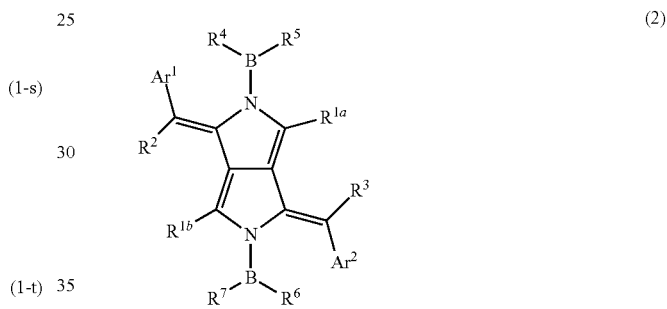

(2)

in General Formula (2), $R^{1a}$ and $R^{1b}$ each independently represent an alkyl group, an aryl group, or a heteroaryl group;

$Ar^1$ and $Ar^2$ each independently represent a heteroaryl group; and $R^2$ and $R^3$ each independently represent a hydrogen atom or a substituent, and $R^4$, $R^5$, $R^6$, and $R^7$ each independently represent a monovalent substituent.

<7> The lens for spectacles according to any one of <1> to <6>, in which a transmittance of light having a wavelength in a range of 400 nm to 700 nm in the thiourethane resin of the near-infrared absorbing agent is 80% or more and 100% or less.

<8> The lens for spectacles according to any one of <1> to <7>, in which the resin contains at least one selected from a thiourethane resin or an episulfide resin.

<9> The lens for spectacles according to any one of <1> to <8>, in which the near-infrared absorbing agent is at least two near-infrared ray absorbing agents.

<10> The lens for spectacles according to any one of <1> to <9>, further comprising at least one ultraviolet absorbing agent.

<11> Spectacles comprising: the lens for spectacles according to any one of <1> to <10>.

According to an embodiment of the present invention, it is possible to provide a lens for spectacles capable of blocking near-infrared light in a wavelength range of at least more than 700 nm and 1000 nm or less and light transmittance at a wavelength in the visible light region, in which a change in tint of an object is hardly recognized in a case where the object is viewed through the lens.

According to another embodiment of the present invention, it is possible to provide spectacles including the lens for spectacles.

DESCRIPTION OF THE PREFERRED EMBODIMENTS

Figure 1:
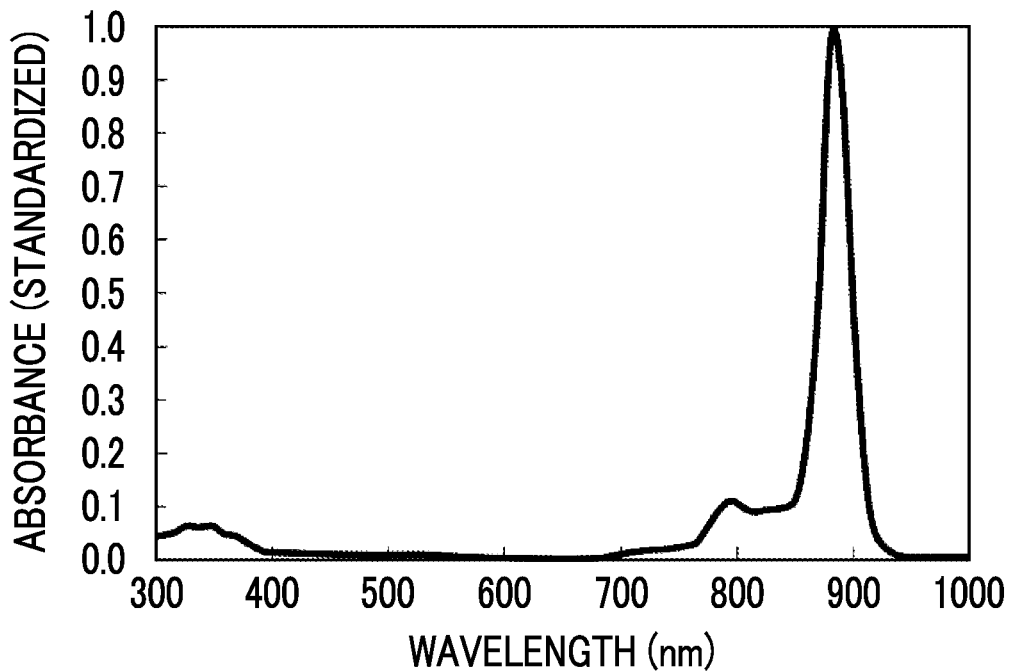
FIG. 1 is a graph showing an absorbance of a pyrrolopyrrole coloring agent (D-1), which is an example of a near-infrared absorbing coloring agent of the present disclosure, at wavelengths of 300 nm to 1000 nm.

Hereinafter, a lens for spectacles and spectacles of the present disclosure will be described.

However, the present disclosure is not limited to the embodiments described below in any way, and modifications can be made as appropriate within the scope of an intended object thereof.

In the present disclosure, a numerical range indicated by using "to" means a range including numerical values described before and after "to" as the minimum value and the maximum value, respectively.

In the numerical ranges described in a stepwise manner in the present disclosure, an upper limit value or a lower limit value described in a certain numerical range may be replaced with an upper limit value or a lower limit value in another numerical range described in a stepwise manner. Further, in the numerical ranges described in the present disclosure, the upper limit value or the lower limit value in a certain numerical range may be replaced with values described in Examples.

In the present disclosure, in a case where a plurality of substances corresponding to each component are present, the content or the compounding of each component means the total content or the total compounding of the plurality of substances, unless otherwise specified.

In the present disclosure, the term "(meth)acrylic" means at least one of acrylic or methacrylic, and the term "(meth)acrylate" means at least one of acrylate or methacrylate.

As used herein, the scope of each substituent mentioned includes unsubstituted forms thereof and forms having a further substituent, unless otherwise specified. For example, the expression "alkyl group" as used herein is intended to encompass unsubstituted alkyl groups as well as alkyl groups having a further substituent. The same shall apply to other substituents.

The number of carbon atoms of the substituent in the present disclosure means the total carbon number including the case where the substituent further has a substituent, unless otherwise specified.

In the numerical ranges described in a stepwise manner in the present disclosure, an upper limit value or a lower limit value described in a certain numerical range may be replaced with an upper limit value or a lower limit value in another numerical range described in a stepwise manner. Further, in the numerical ranges described in the present disclosure, the upper limit value or the lower limit value in a certain numerical range may be replaced with values described in Examples.

Further, in the present disclosure, a combination of two or more preferred aspects is a more preferable aspect.

In the present disclosure, the term "step" encompasses not only an independent step but also a step by which a predetermined object of the step is accomplished even in a case where the step cannot clearly be distinguished from other steps.

In the present disclosure, the "blocking near-infrared light (near-infrared light)" encompasses not only a case where the near-infrared light is completely blocked but also a case where at least a part of the near-infrared light through a lens for spectacles is blocked to reduce the transmittance of the near-infrared light.

[Lens for Spectacles]

A lens for spectacles of the present disclosure contains a resin and a near-infrared absorbing agent having a maximum absorption wavelength in a thiourethane resin in a range of more than 700 nm and 1000 nm or less and a transmittance of light having a wavelength of 400 nm of 50% or more and 100% or less.

The near-infrared absorbing agent that satisfies the above conditions may be referred to as "specific near-infrared absorbing agent" hereinafter.

As for the near-infrared absorbing agent, the higher the transmittance of light having a wavelength of 400 nm, the smaller the yellowish tint of the resin containing the near-infrared absorbing agent, and the lower the transmittance, the greater the yellowish tint of the resin.

The lens for spectacles of the present disclosure is capable of blocking near-infrared light in a wavelength range of at least more than 700 nm and 1000 nm or less and has high transmittance of light at a wavelength of 400 nm, so that the yellowish tint is hardly recognized in a case where an object is viewed through the lens.

Since the yellowish tint is a color that makes it easy to recognize the discomfort of the tint in the lens for spectacles, it is desirable that the near-infrared absorbing agent included in the lens for spectacles has a high transmittance of light at a wavelength of 400 nm and has a small yellowish tint as the lens.

From such a viewpoint, the transmittance of light at a wavelength of 400 nm is preferably 60% or more and 100% or less, and more preferably 70% or more and 100% or less.

[Specific Near-Infrared Absorbing Agent]

As described above, the specific near-infrared absorbing agent contained in the lens for spectacles of the present disclosure has a maximum absorption wavelength in a thiourethane resin in a range of more than 700 nm and 1000 nm or less and a transmittance of light having a wavelength of 400 nm of 50% or more and 100% or less.

In the present disclosure, the measurement of the transmittance of the near-infrared absorbing agent, in other words, the measurement of the absorbance is performed in a state where the near-infrared absorbing agent is contained in the thiourethane resin. This is because the measuring method for measuring the absorbance of the near-infrared absorbing agent in the thiourethane resin makes it easier to more accurately confirm the characteristics of the near-infrared absorbing agent contained in the lens for spectacles than the absorbance generally measured in a state where the near-infrared absorbing agent is contained in an organic solvent such as methanol.

The absorbance of the near-infrared absorbing agent in the thiourethane resin in the present disclosure can be calculated by measuring the absorbance of the near-infrared absorbing agent under the following conditions. Further, the transmittance can be obtained from the calculated absorbance. The absorbance can be measured by the following method.

As the thiourethane resin, a thiourethane resin obtained by polymerizing MR-7 (registered trademark) (refractive index n=1.67) [trade name, Mitsui Chemicals, Inc.] which is a precursor monomer of the thiourethane resin is used.

Regarding measurement conditions, 100 parts by mass of a thiourethane resin precursor monomer are mixed with 0.05 parts by mass of a near-infrared absorbing agent and 0.01 parts by mass of dibutyltin dichloride as a polymerization catalyst to obtain a resin composition. The obtained resin composition was filled into a mold (that is, a molding die: the same applies below) and then was heated at 130° C. for 2 hours, and cured to prepare a sample for resin evaluation having a thickness of 2 mm, a width of 100 mm, and a length of 50 mm was produced. The thickness direction of the obtained sample is used as an optical path for measuring the absorbance.

Using an ultraviolet-visible-near-infrared spectrophotometer (Model number: UV 3150) of Shimadzu Corporation as the measuring instrument, the measurement is carried out at room temperature (25° C.), and the absorbance is measured to obtain the absorption spectrum, referring to air as a control.

By measuring the absorbance of a wavelength in a predetermined wavelength range, the maximum absorption wavelength, the transmittance, and the like can be calculated.

Although the reason why the lens for spectacles of the present disclosure can exhibit the above effects is not clear, the present inventors presume as follows.

Near-infrared light in the wavelength range of more than 700 nm and 1000 nm or less can be blocked to some extent by the near-infrared absorbing agent having maximum absorption in the wavelength range of more than 700 nm and 1000 nm or less. However, in a case where a general near-infrared absorbing agent is applied to a plastic lens formed using a resin, the near-infrared absorbing agent may be easily precipitated and may increase the haze of the lens for spectacles with time. Therefore, a plastic lens containing a general near-infrared absorbing agent tends to be inferior in suitability as a lens for spectacles.

Examples of near-infrared absorbing coloring agents applied to a conventional lens for spectacles include a phthalocyanine coloring agent and a diimmonium coloring agent. Of these, the phthalocyanine coloring agent has a maximum absorption wavelength in the range of more than 700 nm and 1000 nm or less, but has a plurality of vibration structures, so that the molecular structure thereof tends to be thermally twisted. Further, the diimmonium coloring agent has a maximum absorption wavelength longer than the range of 1000 nm and has a plurality of vibration structures like the phthalocyanine coloring agent, the molecular structure tends to be thermally twisted.

On the other hand, the specific near-infrared absorbing agent contained in the lens for spectacles of the present disclosure has a maximum absorption in the wavelength range of more than 700 nm and 1000 nm or less in a thiourethane resin, and has good transmittance of light having a wavelength of 400 nm. This indicates that the peak of the maximum absorption wavelength in the absorption spectrum is sharp and that the absorption of light having a wavelength shorter than the maximum absorption wavelength is extremely low. Therefore, the specific near-infrared absorbing agent has a single vibration mode and tends to be difficult to be twisted thermally.

As described above, in the specific near-infrared absorbing agent contained in the lens for spectacles of the present disclosure, the peak of the maximum absorption wavelength in the absorption spectrum is in the near-infrared region that needs to be blocked, and the absorption of light having a wavelength shorter than the maximum absorption wavelength is extremely low. This results in good blocking of near-infrared light at the specific wavelengths required and sharp absorption spectra, resulting in good transmittance of light at peripheral wavelengths. Accordingly, it is considered that in a case where the specific near-infrared absorbing agent is applied to the lens for spectacles, the transmittance of light in the visible region is high and the lens for spectacles is not colored, so that a change in tint is hardly recognized in a case where an object is viewed through the lens for spectacles.

Generally, in a case where the molecular structure of a compound is easily twisted thermally, a plurality of vibration modes are present and the half-width is large, and on the other hand, in a case where only a single vibration mode is present, the compound tends not to be twisted thermally.

Regarding the phase separation of the near-infrared absorbing agent with respect to the resin, it is presumed that factors such as the difference in hydrophilicity/hydrophobicity between the coloring agent compound as the near-infrared absorbing agent and the resin and the magnitude of intermolecular interaction are involved. Further, regarding the phase separation of the coloring agent compound with respect to the resin, it is considered that the difference in the twist of the molecules of the coloring agent compound also affects the phase separation. That is, a coloring agent compound having a plurality of absorption peaks, in other words, a plurality of vibration structures tends to cause twisting in the molecular structure in the case of being excited, and for example, twisting of the molecule is easily caused by energy application by ultraviolet irradiation or the like. Therefore, there is a concern that phase separation is easily caused due to the twist of the coloring agent compound dispersed in the resin.

On the contrary, the specific near-infrared absorbing agent of the present disclosure having a single absorption peak and having only a single vibration mode is expected to be hardly twisted in the molecular structure and hardly cause phase separation. Therefore, the specific near-infrared absorbing agent is considered to have, while having a desired near-infrared light blocking property, the advantage of suppressing the phase separation between the resin and the specific near-infrared absorbing agent due to the twisting of the coloring agent compound molecule, suppressing a decrease in transparency and an increase in haze caused by the phase separation, and thereby further improving the durability of the lens for spectacles.

The specific near-infrared absorbing agent preferably has a transmittance at the maximum absorption wavelength of the specific near-infrared absorbing agent of 1% or less and preferably has a transmittance of light having a wavelength of 700 nm of 60% or more and 100% or less, more preferably has a transmittance at the maximum absorption wavelength of the specific near-infrared absorbing agent of 0.8% or less and has a transmittance of light having a wavelength of 700 nm of 70% or more and 100% or less, and more preferably has a transmittance at the maximum absorption wavelength of the specific near-infrared absorbing agent of 0.5% or less and has a transmittance of light having a wavelength of 700 nm of 80% or more and 100% or less.

Since the specific near-infrared absorbing agent has a maximum absorption wavelength in the thiourethane resin in a range of more than 700 nm and 1000 nm or less and a transmittance at the maximum absorption wavelength of 1.0% or less, the lens for spectacles of the present disclosure can more efficiently block near-infrared light of a predetermined wavelength. Further, since the transmittance of light having a wavelength of 700 nm is 60% or more and 100% or less, the resin containing the near-infrared absorbing agent is suppressed from showing bluish green tint, a change in color of an object is hardly recognized in a case where an object is viewed through the lens.

The specific near-infrared absorbing agent preferably has, in Lxy coordinates in the thiourethane resin, an x value in a range of 0.285 or more and 0.350 or less and a y value of 0.280 or more and 0.350 or less, and more preferably an x value in a range of 0.3 or more and 0.330 or less, and a y value of 0.3 or more and 0.330 or less.

In a case where the x value and the y value of the Lxy coordinate of the specific near-infrared absorbing agent are within this range, the tint becomes neutral, and the spectacles including the lens for spectacles cause less discomfort regarding the tint of the observation object in the case of being worn.

A ratio D of $A^{max-100}$ to $A^{max}$ [$D=(A^{max-100})/(A^{max})$], where $A^{max}$ is an absorbance of the specific near-infrared absorbing agent at a maximum absorption wavelength measured in a thiourethane resin and $A^{max-100}$ is the absorbance at a wavelength shorter than the maximum absorption wavelength by 100 nm, is preferably less than 0.20, more preferably 0.16 or less, still more preferably 0.15 or less, and further preferably 0.10 or less.

In a case where the ratio D of $A^{max-100}$ to $A^{max}$, where $A^{max}$ is an absorbance of the specific near-infrared absorbing agent at a maximum absorption wavelength measured in a thiourethane resin and $A^{max-100}$ is the absorbance at a wavelength shorter than the maximum absorption wavelength by 100 nm, is less than 0.20, the optical stability of the specific near-infrared absorbing agent becomes better because the blocking property of the visible region on the shorter wavelength side is low while efficiently blocking near-infrared light at the target specific wavelength and the wavelength band in the vicinity thereof. Therefore, the light resistance of the lens for spectacles becomes higher. Furthermore, there is also a secondary effect that the coloring of the lens for spectacles can be further reduced.

In the lens for spectacles of the present disclosure, the specific near-infrared absorbing agent, preferably contains at least one selected from a cyanine coloring agent, an oxonol coloring agent, a squarylium coloring agent, or a pyrrolopyrrole coloring agent, and more preferably at least one selected from a cyanine coloring agent, an oxonol coloring agent, or a pyrrolopyrrole coloring agent.

Among them, the specific near-infrared absorbing agent preferably contains at least one selected from the group consisting of a compound represented by General Formula (1) and a compound represented by General Formula (2).

(Compound represented by General Formula (1))

(1)

In General Formula (1), $A^1$ represents a keto form of an acidic nucleus selected from the group consisting of General Formula (1-a) to General Formula (1-x).

$A^2$ represents an enol form of an acidic nucleus selected from the group consisting of General Formula (1-a) to General Formula (1-x), where a hydroxy group in the enol form may be dissociated.

The acidic nuclei represented by $A^1$ and $A^2$ may be the same as or different from each other.

$L^1$, $L^2$, and $L^3$ each independently represent a methine group.

$M^+$ represents a proton or a monovalent counter cation, and n represents a number required to make the positive charge number and the negative charge number of a compound represented by General Formula (1) equal to each other. k represents 2 or 3.

(1-a)

(1-b)

(1-c)

(1-d)

(1-e)

-continued
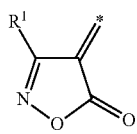 (1-f)
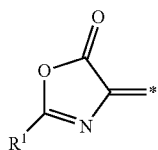 (1-g)
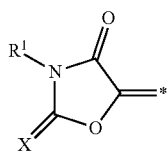 (1-h)
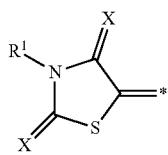 (1-i)
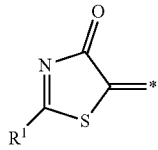 (1-j)
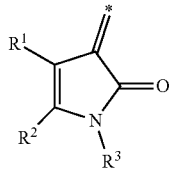 (1-k)
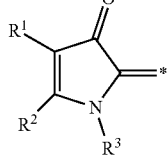 (1-l)
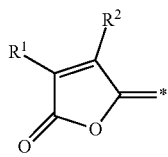 (1-m)
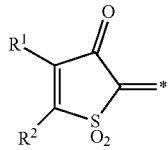 (1-n)
-continued
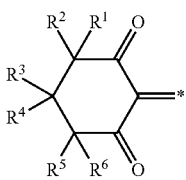 (1-o)
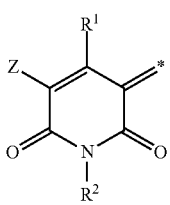 (1-p)
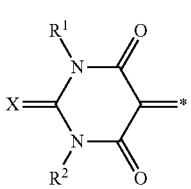 (1-q)
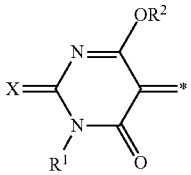 (1-r)
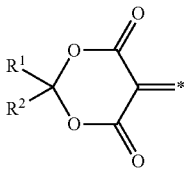 (1-s)
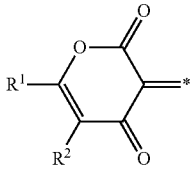 (1-t)
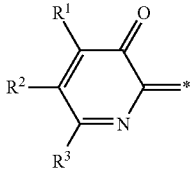 (1-u)
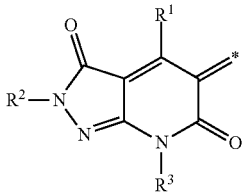 (1-v)

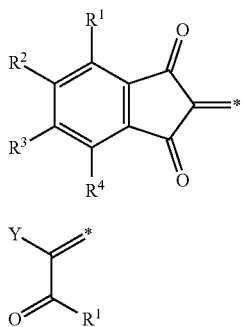

(1-w)

(1-x)

In General Formula (1-a) to General Formula (1-x), each * represents a position at which the keto form of the acidic nucleus $A^1$ is bonded to $L^1$ and the enol form of the acidic nucleus $A^2$ is bonded to $L^3$.

Each X independently represents an oxygen atom or a sulfur atom. Y represents an electron-withdrawing group. Z represents a hydrogen atom, or a carbamoyl group, an alkyl group, an aryl group, a cyano group, a carboxyl group, an acyl group, an alkyloxycarbonyl group, an aryloxycarbonyl group, a halogen atom, an amino group, an acylamino group, an alkylsulfonyl group, an arylsulfonyl group, or a sulfo group.

$R^1$, $R^2$, $R^3$, $R^4$, $R^5$, and $R^6$ each independently represent a hydrogen atom or a monovalent substituent.

General Formula (1-a) to General Formula (1-x) will be described.

In General Formula (1-a) to General Formula (1-x), X represents an oxygen atom or a sulfur atom. X is preferably an oxygen atom.

Y represents an electron-withdrawing group. The electron-withdrawing group refers to a substituent having a property of attracting electrons from a substitution position at a specific substitution position of a molecule and having an effect of reducing electron density. Examples of the electron-withdrawing group include groups having a halogen atom, a nitrile group, a carboxy group, a carbonyl group, a nitro group, or the like.

Specific examples of the electron-withdrawing group represented by Y include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a heterocyclic sulfonyl group, a sulfonyloxy group, an acylthio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, an aryl group substituted with another electron-withdrawing group having a Hammett substituent constant σp value of 0.2 or more, a heterocyclic group, a halogen atom, an azo group, or a selenocyanate group.

The "Hammett substituent constant" according to the present disclosure is a constant specific to the substituent in the relational expression established as the Hammett rule. The positive Hammett substituent constant σ value indicates that the substituent is electron-withdrawing.

The Hammett rule is a rule of thumb proposed by L. P. Hammett in 1935 to quantitatively discuss the influence of substituents on the reaction or equilibrium of benzene derivatives, which is widely accepted today. Substituent constants determined by the Hammett rule include σp values and σm values. These values are disclosed in many general documents, for example, "Lange's Handbook of Chemistry" 12th Edition, edited by J. A. Dean, 1979 (Mc Graw-Hill) and "Special Issue of Field of Chemistry", No. 122, pages 96 to 103, 1979 (Nankodo Co., Ltd.).

The substituents defined by the Hammett substituent constant σp value are not limited to substituents having known values disclosed in these documents, and it is needless to say that even substituents a having σp value not disclosed in these documents are also included, as long as the value thereof determined based on the Hammett rule is 0.2 or more.

Examples of the group having a Hammett substituent constant σp value of 0.2 or more include a cyano group (0.66), a carboxy group (—COOH: 0.45), an alkoxycarbonyl group (—COOMe: 0.45, —COOC$_8$H$_{17}$: 0.44, —COOC$_9$H$_{19}$: 0.44, —COOC13H27: 0.44), an aryloxycarbonyl group (—COOPh: 0.44), a carbamoyl group (—CONH$_2$: 0.36), an acetyl group (—COMe: 0.50), an arylcarbonyl group (—COPh: 0.43), an alkylsulfonyl group (—SO$_2$Me: 0.72), and an arylsulfonyl group (—SO$_2$Ph: 0.68). Representative substituents and σp values thereof in the parentheses are from Chem. Rev., 1991, vol. 91, pages 165 to 195. Further, a sulfamoyl group, a sulfinyl group, a heterocyclic group and the like are also included in the group having a Hammett substituent constant σp value of 0.2 or more.

Among them, preferred is a substituent selected from a cyano group, an alkylsulfonyl group, an arylsulfonyl group, a heterocyclic sulfonyl group, an acyl group, a sulfamoyl group, a carbamoyl group, an alkyloxycarbonyl group, and an aryloxycarbonyl group. Here, in a case where the sulfamoyl group or the carbamoyl group has a substituent, examples of the substituent include a substituted or unsubstituted alkyl group, a substituted or unsubstituted aryl group, and a substituted or unsubstituted heterocyclic group.

Z represents a hydrogen atom, a carbamoyl group, an alkyl group, an aryl group, a cyano group, a carboxyl group, an acyl group, an alkyloxycarbonyl group, an aryloxycarbonyl group, a halogen atom, an amino group, an acylamino group, an alkylsulfonyl group, an arylsulfonyl group, or a sulfo group. Z is preferably a hydrogen atom, a carbamoyl group, an alkyl group, a cyano group, an acyl group, a halogen atom, an acylamino group, an alkylsulfonyl group, or a sulfo group, and more preferably a hydrogen atom, a carbamoyl group, or a cyano group. In a case where Z is a substituent other than a hydrogen atom, the substituent may further have a substituent.

In General Formula (1-a) to General Formula (1-x), $R^1$, $R^2$, $R^3$, $R^4$, $R^5$, and $R^6$ each independently represent a hydrogen atom or a monovalent substituent.

In a case where $R^1$, $R^2$, $R^3$, $R^4$, $R^5$, and $R^6$ each independently represent a monovalent substituent, the monovalent substituent is a halogen atom, an alkyl group (including a cycloalkyl group, a bicycloalkyl group), an alkenyl group (including a cycloalkenyl group, a bicycloalkenyl group), an alkynyl group, an aryl group, a heterocyclic group, a cyano group, a hydroxyl group, a nitro group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, a sulfo group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclic azo group, or an imide group, and these substituents may be further substituted by the above substituents, and the substituents may be bonded to each other to form a ring.

Hereinafter, each of the exemplified substituents in a case where $R^1$, $R^2$, $R^3$, $R^4$, $R^5$, and $R^6$ are monovalent substituents will be described.

Examples of the halogen atom include a fluorine atom, a chlorine atom, a bromine atom, or an iodine atom.

The alkyl group may be linear, branched, or cyclic. Further, the alkyl group may be an alkyl group having a substituent or an unsubstituted alkyl group. In other words, the alkyl group in the monovalent substituent is used in the sense that it encompasses a cycloalkyl group, a bicycloalkyl group, and an alkyl group having a tricyclo structure which is a polycyclic structure or the like.

The alkyl groups in the substituents (for example, an alkyl group in an alkoxy group or an alkylthio group) which will be described below also represent alkyl groups having such a concept.

Specifically, the alkyl group is preferably an alkyl group having 1 to 30 carbon atoms, and examples thereof include a methyl group, an ethyl group, an n-propyl group, an i-propyl group, a t-butyl group, an n-octyl group, an eicosyl group, a benzyl group, a phenethyl group, a 2-chloroethyl group, a 2-cyanoethyl group, and a 2-ethylhexyl group. The cycloalkyl group is preferably a cycloalkyl group having 3 to 30 carbon atoms, and examples thereof include a cyclohexyl group, a cyclopentyl group, and a 4-n-dodecylcyclohexyl group. The bicycloalkyl group is preferably a bicycloalkyl group having 5 to 30 carbon atoms, i.e., a monovalent group obtained by removing one hydrogen atom from a bicycloalkane having 5 to 30 carbon atoms, and examples thereof include a bicyclo[1,2,2]heptan-2-yl group and a bicyclo[2,2,2]octane-3-yl group.

The alkenyl group may be linear, branched, or cyclic. Further, the alkenyl group may be an alkyl group having a substituent or an unsubstituted alkyl group. In other words, the alkenyl group in the monovalent substituent encompasses a cycloalkenyl group and a bicycloalkenyl group.

Specifically, the alkenyl group is preferably a substituted or unsubstituted alkenyl group having 2 to 30 carbon atoms, and examples thereof include a vinyl group, an allyl group, a prenyl group, a geranyl group, and an oleyl group. The cycloalkenyl group is preferably a substituted or unsubstituted cycloalkenyl group having 3 to 30 carbon atoms, i.e., a monovalent group obtained by removing one hydrogen atom from a cycloalkene having 3 to 30 carbon atoms, and examples thereof include a 2-cyclopenten-1-yl group and a 2-cyclohexen-1-yl group. The bicycloalkenyl group is a bicycloalkenyl group, preferably a bicycloalkenyl group having 5 to 30 carbon atoms, i.e., a monovalent group obtained by removing one hydrogen atom from a bicycloalkene having one double bond, and examples thereof include a bicyclo[2,2,1]hept-2-en-1-yl group and a bicyclo[2,2,2]oct-2-en-4-yl group.

The alkynyl group is preferably an alkynyl group having 2 to 30 carbon atoms, and examples thereof include an ethynyl group, a propargyl group, and a trimethylsilylethynyl group.

The aryl group is preferably an aryl group having 6 to 30 carbon atoms, and examples thereof include a phenyl group, a p-tolyl group, a naphthyl group, a m-chlorophenyl group, and an o-hexadecanoylaminophenyl group.

The heterocyclic group is preferably a monovalent group obtained by removing one hydrogen atom from a 5-membered or 6-membered aromatic or non-aromatic heterocyclic compound. Still more preferred is a 5-membered or 6-membered aromatic heterocyclic group having 3 to 30 carbon atoms, and examples thereof include a 2-furyl group, a 2-thienyl group, a 2-pyrimidinyl group, and a 2-benzothiazolyl group.

The alkoxy group is preferably an alkoxy group having 1 to 30 carbon atoms, and examples thereof include a methoxy group, an ethoxy group, an isopropoxy group, a t-butoxy group, an n-octyloxy group, and a 2-methoxyethoxy group.

The aryloxy group is preferably an aryloxy group having 6 to 30 carbon atoms, and examples thereof include a phenoxy group, a 2-methylphenoxy group, a 4-t-butylphenoxy group, a 3-nitrophenoxy group, and a 2-tetradecanoylaminophenoxy group.

The silyloxy group is preferably a silyloxy group having 0 to 20 carbon atoms, and examples thereof include a trimethylsilyloxy group and a diphenylmethylsilyloxy group.

The heterocyclic oxy group is preferably a heterocyclic oxy group having 2 to 30 carbon atoms, and examples thereof include a 1-phenyltetrazole-5-oxy group, and a 2-tetrahydropyranyloxygroup.

The acyloxy group is preferably a formyloxy group, an alkylcarbonyloxy group having 2 to 30 carbon atoms, an arylcarbonyloxy group having 6 to 30 carbon atoms, and examples thereof include an acetyloxy group, a pivaloyloxy group, a stearoyloxy group, a benzoyloxy group, and a p-methoxyphenylcarbonyloxy group.

The carbamoyloxy group is preferably a carbamoyloxy group having 1 to 30 carbon atoms, and examples thereof include an N,N-dimethylcarbamoyloxy group, an N,N-diethylcarbamoyloxy group, a morpholinocarbonyloxy group, an N,N-di-n-octylaminocarbonyloxy group, and an N-n-octylcarbamoyloxy group.

The alkoxycarbonyloxy group is preferably an alkoxycarbonyloxy group having 2 to 30 carbon atoms, and examples thereof include a methoxycarbonyloxy group, an ethoxycarbonyloxy group, a t-butoxycarbonyloxy group, and an n-octylcarbonyloxy group.

The aryloxycarbonyloxy group is preferably an aryloxycarbonyloxy group having 7 to 30 carbon atoms, and examples thereof include a phenoxycarbonyloxy group, a p-methoxyphenoxycarbonyloxy group, and a p-n-hexadecyloxyphenoxycarbonyloxy group.

The amino group encompasses, in addition to the amino group, an alkylamino group, an arylamino group, and a heterocyclic amino group, which are amino groups having an alkyl group, an aryl group, or a heterocyclic group.

The amino group is preferably an amino group, an alkylamino group having 1 to 30 carbon atoms, or an anilino group having 6 to 30 carbon atoms, and examples thereof include a methylamino group, a dimethylamino group, an anilino group, an N-methyl-anilino group, a diphenylamino group, and a triazinylamino group.

The acylamino group is preferably a formylamino group, an alkylcarbonylamino group having 1 to 30 carbon atoms, or an arylcarbonylamino group having 6 to 30 carbon atoms, and examples thereof include an acetylamino group, a pivaloylamino group, a lauroylamino group, a benzoylamino group, and a 3,4,5-tri-n-octyloxyphenylcarbonylamino group.

The aminocarbonylamino group is preferably an aminocarbonylamino group having 1 to 30 carbon atoms, and examples thereof include a carbamoylamino group, an N,N-dimethylaminocarbonylamino group, an N,N-diethylaminocarbonylamino group, and a morpholinocarbonylamino group.

The alkoxycarbonylamino group is preferably an alkoxycarbonylamino group having 2 to 30 carbon atoms, and examples thereof include a methoxycarbonylamino group, an ethoxycarbonylamino group, a t-butoxycarbonylamino group, an n-octadecyloxycarbonylamino group, and an N-methyl-methoxycarbonylamino group.

The aryloxycarbonylamino group is preferably an aryloxycarbonylamino group having 7 to 30 carbon atoms, and examples thereof include a phenoxycarbonylamino group, a p-chlorophenoxycarbonylamino group, and an m-n-octyloxyphenoxycarbonylamino group.

The sulfamoylamino group is preferably a sulfamoylamino group having 0 to 30 carbon atoms, and examples thereof include a sulfamoylamino group, an N,N-dimethylaminosulfonylamino group, and an N-n-octylaminosulfonylamino group.

The alkylsulfonylamino group or arylsulfonylamino group is preferably an alkylsulfonylamino group having 1 to 30 carbon atoms, or an arylsulfonylamino group having 6 to 30 carbon atoms, and examples thereof include a methylsulfonylamino group, a butylsulfonylamino group, a phenylsulfonylamino group, a 2,3,5-trichlorophenylsulfonylamino group, and a p-methylphenylsulfonylamino group.

The alkylthio group is preferably an alkylthio group having 1 to 30 carbon atoms, and examples thereof include a methylthio group, an ethylthio group, and an n-hexadecylthio group.

The arylthio group is preferably an arylthio group having 6 to 30 carbon atoms, and examples thereof include a phenylthio group, a p-chlorophenylthio group, and an m-methoxyphenylthio group.

The heterocyclic thio group is preferably a heterocyclic thio group having 2 to 30 carbon atoms, and examples thereof include a 2-benzothiazolylthio group and a 1-phenyltetrazol-5-ylthio group.

The sulfamoyl group is preferably a sulfamoyl group having 0 to 30 carbon atoms, and examples thereof include an N-ethylsulfamoyl group, an N-(3-dodecyloxypropyl)sulfamoyl group, an N,N-dimethylsulfamoyl group, an N-acetylsulfamoyl group, an N-benzoylsulfamoyl group, and an N-(N'-phenylcarbamoyl)sulfamoyl group.

The alkylsulfinyl group or arylsulfinyl group is preferably an alkylsulfinyl group having 1 to 30 carbon atoms, or an arylsulfinyl group having 6 to 30 carbon atoms, and examples thereof include a methylsulfinyl group, an ethylsulfinyl group, a phenylsulfinyl group, and a p-methylphenylsulfinyl group.

The alkylsulfonyl group or arylsulfonyl group is preferably an alkylsulfonyl group having 1 to 30 carbon atoms, or an arylsulfonyl group having 6 to 30 carbon atoms, and examples thereof include a methylsulfonyl group, an ethylsulfonyl group, a phenylsulfonyl group, and a p-methylphenylsulfonyl group.

The acyl group is preferably a formyl group, an alkylcarbonyl group having 2 to 30 carbon atoms, an arylcarbonyl group having 7 to 30 carbon atoms, or a heterocyclic carbonyl group having 2 to 30 carbon atoms in which the heterocycle is bonded to the carbonyl group at a carbon atom, and examples thereof include an acetyl group, a pivaloyl group, a 2-chloroacetyl group, a stearoyl group, a benzoyl group, a p-n-octyloxyphenylcarbonyl group, a 2-pyridyl group, and a 2-furylcarbonyl group.

The aryloxycarbonyl group is preferably an aryloxycarbonyl group having 7 to 30 carbon atoms, and examples thereof include a phenoxycarbonyl group, an o-chlorophenoxycarbonyl group, an m-nitrophenoxycarbonyl group, and a p-t-butylphenoxycarbonyl group.

The alkoxycarbonyl group is preferably an alkoxycarbonyl group having 2 to 30 carbon atoms, and examples thereof include a methoxycarbonyl group, an ethoxycarbonyl group, a t-butoxycarbonyl group, and an n-octadecyloxycarbonyl group.

The carbamoyl group is preferably a carbamoyl group having 1 to 30 carbon atoms, and examples thereof include a carbamoyl group, an N-methylcarbamoyl group, an N,N-dimethylcarbamoyl group, an N,N-di-n-octylcarbamoyl group, and an N-(methylsulfonyl)carbamoylgroup.

The arylazo group or heterocyclic azo group is preferably an arylazo group having 6 to 30 carbon atoms, or a heterocyclic azo group having 3 to 30 carbon atoms, and examples thereof include phenylazo, p-chlorophenylazo, and 5-ethylthio-1,3,4-thiadiazol-2-ylazo.

The imide group is preferably, for example, an N-succinimide group or an N-phthalimide group.

In General Formula (1-a) to General Formula (1-x), $R^1$, $R^2$, $R^3$, $R^4$, $R^5$, and $R^6$ are each independently preferably a hydrogen atom, an alkyl group, an aryl group, a heterocyclic group, a carboxyl group, an acyl group, an alkyloxycarbonyl group, an aryloxycarbonyl group, a carbamoyl group, a cyano group, an amino group, an acylamino group, an alkylsulfonylamino group, an arylsulfonylamino group, an aminocarbonylamino group, a carbamoyloxy group, a hydroxyl group, an alkoxy group, an aryloxy group, a heterocyclic oxy group, an acyloxy group, or a sulfamoyl group, more preferably a hydrogen atom, an alkyl group, an aryl group, a heterocyclic group, a carboxyl group, an acyl group, an alkyloxycarbonyl group, a carbamoyl group, a cyano group, an amino group, an acylamino group, an alkylsulfonylamino group, an arylsulfonylamino group, a hydroxyl group, an alkoxy group, or a sulfamoyl group, and still more preferably a hydrogen atom, an alkyl group, an aryl group, a heterocyclic group, a carboxyl group, an alkyloxycarbonyl group, a carbamoyl group, a cyano group, an acylamino group, a hydroxyl group, or an alkoxy group.

From the viewpoint that the absorption peak of the specific near-infrared absorbing agent tends to be steep and the half-width thereof can be easily kept within an appropriate range, both $A^1$ and $A^2$ preferably have a structure having a ring structure selected from a 5-membered ring, a 6-membered ring, and a condensed ring structure, and a structure derived from an acidic nucleus having a structure having an electron-withdrawing group. Among the ring structures, $A^1$ and $A^2$ more preferably have a structure having a saturated 5-membered ring, and still more preferably have a structure having a saturated 5-membered ring in which carbonyl groups are symmetrical.

From the viewpoint of synthetic suitability, $A^1$ and $A^2$ are preferably a keto form and an enol form derived from acidic nuclei having the same structure.

In General Formula (1), from the viewpoint that the absorption peak at the maximum absorption wavelength tends to be steep, the color value is high, and the durability of the specific near-infrared absorbing agent is high, $A^1$ is preferably a keto form of an acidic nucleus selected from the group consisting of (1-b), (1-c), (1-f), (1-o), (1-q), (1-r), (1-v), and (1-w) among General Formulae (1-a) to (1-x) described above, and $A^2$ is preferably an enol form of an acidic nucleus selected from the group consisting of (1-b), (1-c), (1-f), (1-o), (1-q), (1-r), (1-v), and (1-w), and it is still more preferable that A represents a keto form of an acidic nucleus selected from the group consisting of (1-b), (1-c), and (1-q) and $A^2$ represents en enol form of an acidic nucleus selected from the group consisting of (1-b), (1-c), and (1-q).

In General Formula (1), examples of the counter cation $M^+$ forming the salt include ammonium ion, an alkali metal ion (e.g., lithium ion, sodium ion, and potassium ion) and an organic cation (e.g., tetramethylammonium ion, tetraethylammonium ion, tetrabutylammonium ion, triethylammonium ion, tributylammonium ion, trihexylammonium ion, trioctylammonium ion, tetramethylguanidinium ion, and tetramethylphosphonium ion,).

The counter cation M is preferably an organic cation, in particular, more preferably tetraalkylammonium ion or trialkylammonium ion.

Examples of the specific near-infrared absorbing agent represented by General Formula (1) will be shown below by specifying General Formulae representing their structures and the substituents in the respective General Formulae.

The specific near-infrared absorbing agent represented by General Formula (1) in the present disclosure is not limited to the following examples.

In the structural formulae shown below, Me represents a methyl group, Et represents an ethyl group, Bu represents a butyl group, Pr represents a propyl group, Ph represents a phenyl group, and H represents a hydrogen atom.

In each structural formula shown below, 1,8-diazabicycloundecene (1,8-diazabicyclo(5,4,0)undec-7-ene) is abbreviated as DBU.

The oxonol coloring agent is preferably a compound represented by General Formula (1-2) to General Formula (1-4), and more preferably a compound represented by General Formula (1-2) or General Formula (1-3).

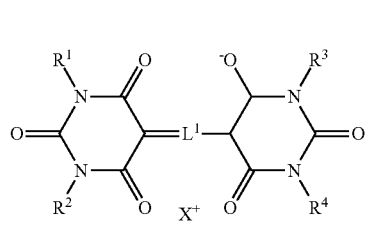

General Formula (1-2)

In General Formula (1-2), $L^1$ represents a methine chain consisting of 5 or 7 methines, and $X^+$ represents a polyvalent metal atom ion. $R^1$, $R^2$, $R^3$, and $R^4$ each independently represent a hydrogen atom, an alkyl group, an aryl group, or a heterocyclic group.

The alkyl group, the aryl group or the heterocyclic group has the same meaning as the alkyl group, the aryl group or the heterocyclic group in General Formula (1), and the preferable examples are also the same.

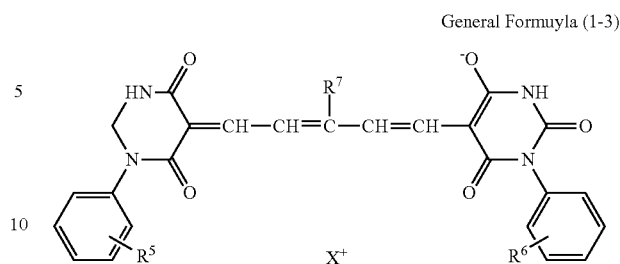

General Formuyla (1-3)

In General Formula (1-3), $R^5$, $R^6$, and $R^7$ are each independently represent a monovalent group, $X^+$ has the same meaning as $X^+$ in General Formula (1-2).

Examples of the monovalent group represented by $R^5$ and $R^6$ include those described as the substituent of the aryl group in General Formula (1), and $R^5$ and $R^6$ are each independently preferably a hydrogen atom, a hydroxy group, a carboxy group, a sulfo group, an amide group, a carbamoyl group, or an acylamino group. The monovalent group represented by $R^7$ is preferably a hydrogen atom, an alkyl group (for example, a methyl group or an ethyl group), a halogen atom (for example, a chlorine atom or a bromine atom), an aryl group (for example, a phenyl group), a heterocyclic group (for example, pyridyl group, 2-pyridone ring group, or 2,5-dioxo-pyrrolidine ring group), $OR^O$. or $SR^O$. Here, $R^O$ each independently represents a hydrogen atom, an alkyl group or an aryl group. $R^7$ is preferably a hydrogen atom, a phenyl group, or a pyridyl group.

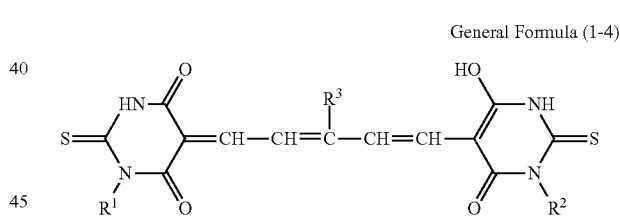

General Formula (1-4)

In General Formula (1-4), $R^1$ and $R^2$ each independently represent an aryl group, and $R^3$ represents an alkyl group. However, $R^1$ and $R^2$ are aryl groups having a substituent, the substituent does not have an ionizable proton and does not form a salt.

The aryl group as $R^1$ and $R^2$ has the same meaning as in General Formula (1). The chalcogen atom linked to the ring structures at both ends of the oxonol coloring agent is an oxygen atom in a compound represented by General Formula (1-2) and General Formula (1-3), and is a sulfur atom in a compound represented by General Formula (1-4), both of which are preferred embodiments. Among them, the chalcogen atom is more preferably an oxygen atom.

Hereinafter, examples of the oxonol coloring agent that can be used in the lens for spectacles of the present disclosure will be given, but the present disclosure is not limited to the following exemplary compounds.

(F-1) 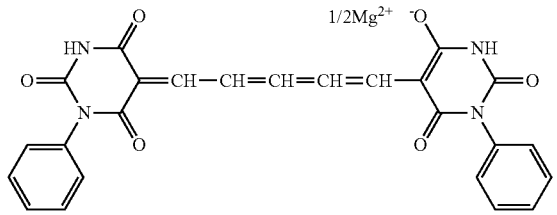
(F-2) 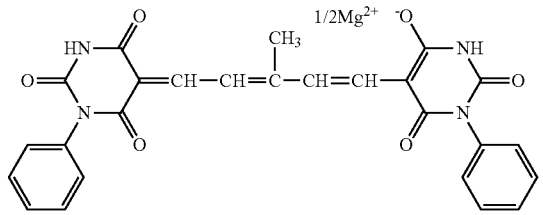
(F-3) 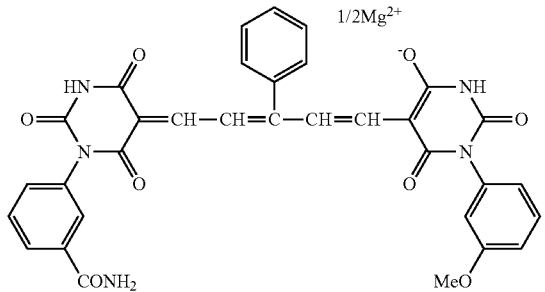
(F-4) 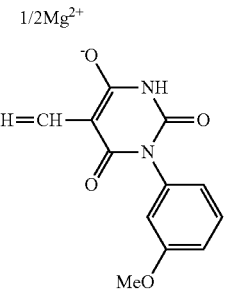
(F-5) 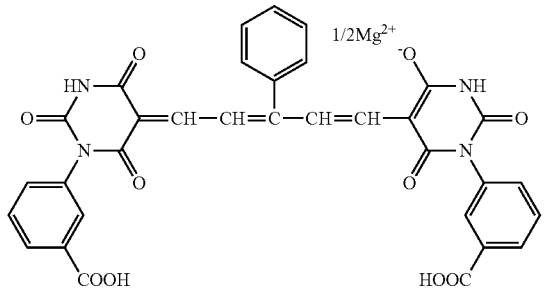
(F-6) 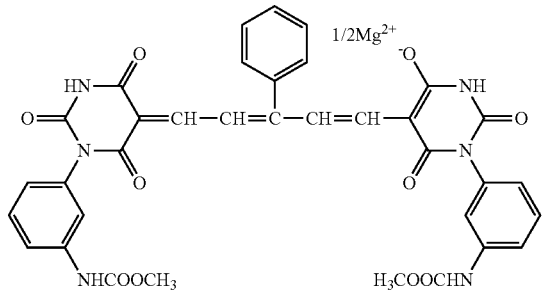
(F-7) 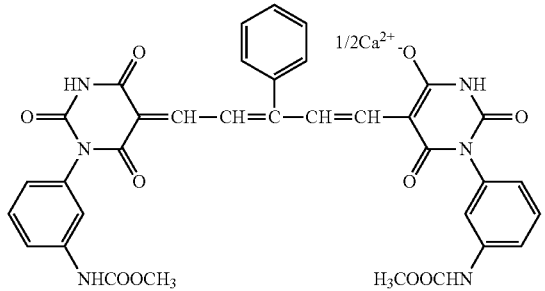
(F-8) 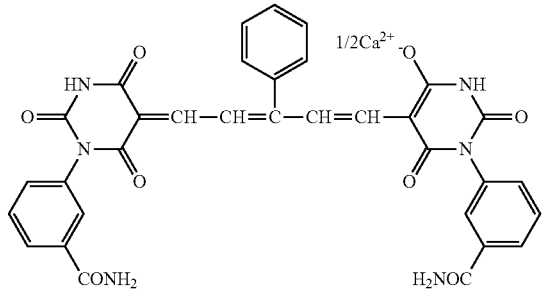
(F-9) 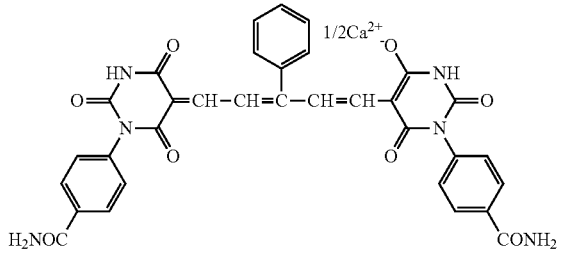
(F-10) 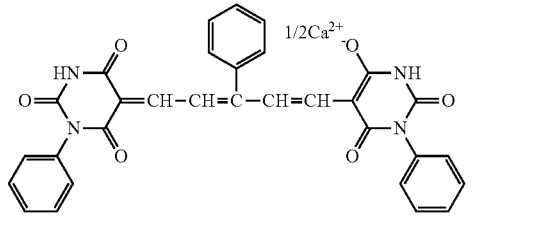

-continued
(F-11)
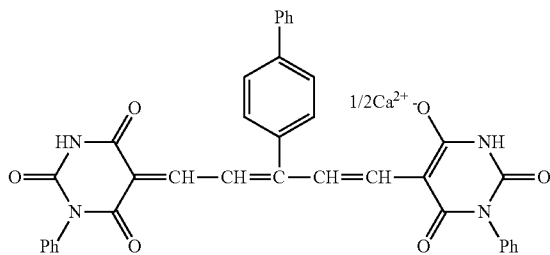
(F-12)
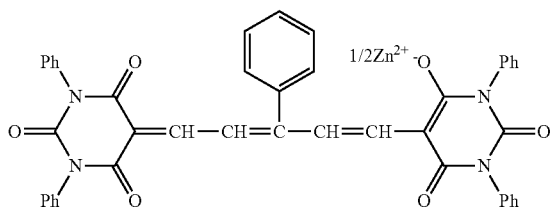
(F-13)
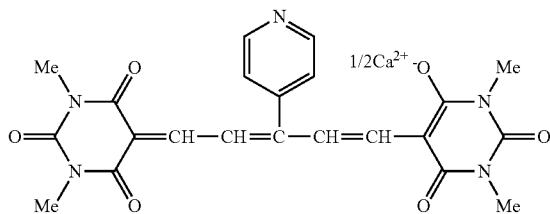
(F-14)
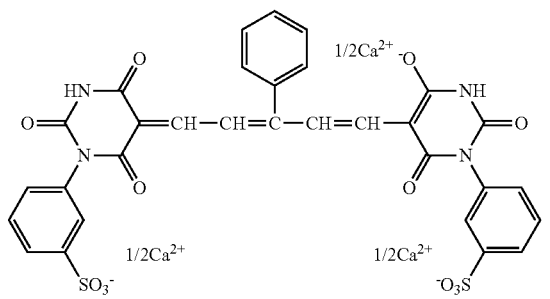
(F-15)
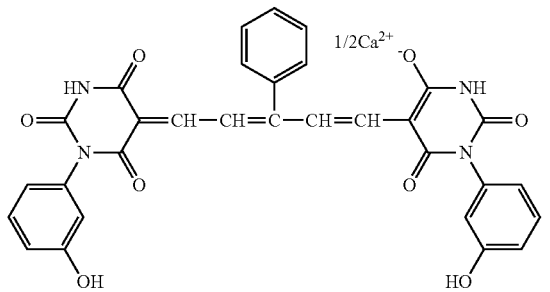
(F-16)
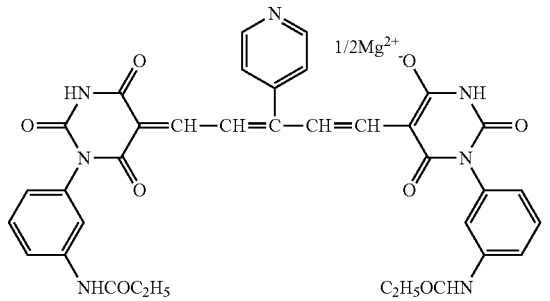
(F-17)
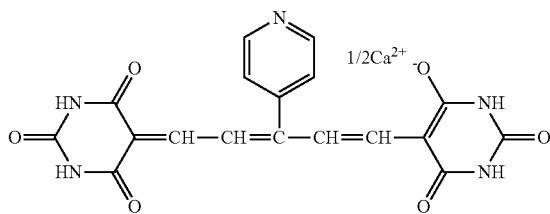
(F-18)
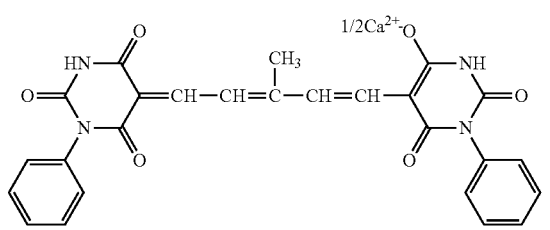
(F-19)
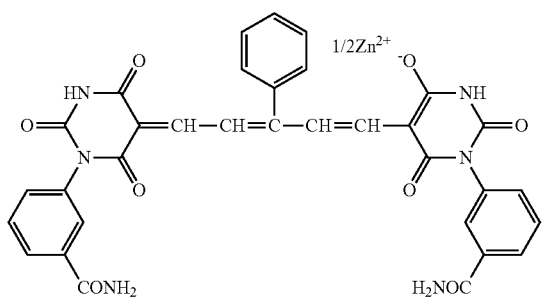
(F-20)
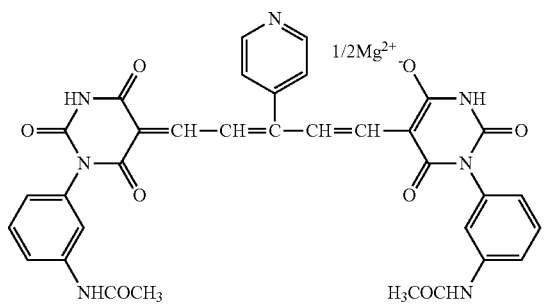

-continued
(F-21)
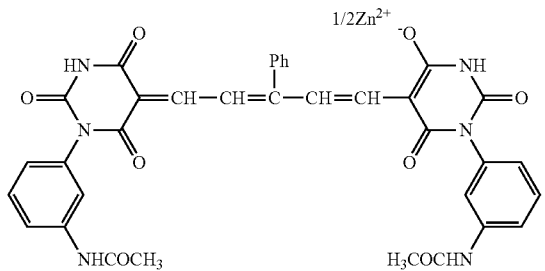
(F-22)
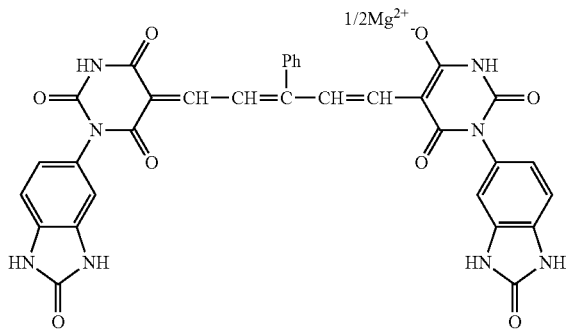
(F-23)
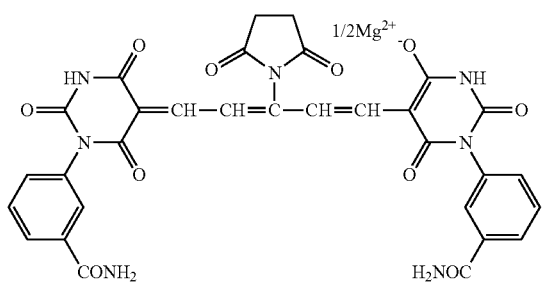
(F-24)
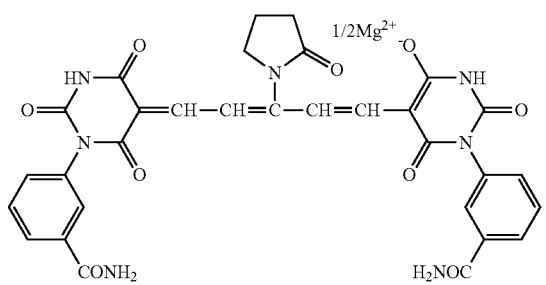
(F-25)
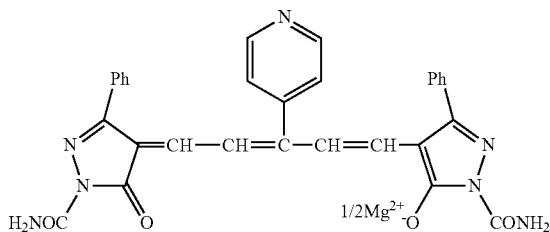
(F-26)
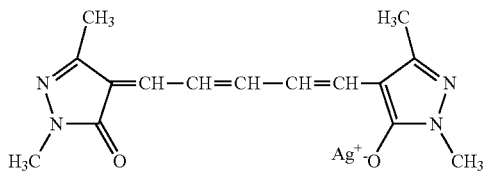
(F-27)
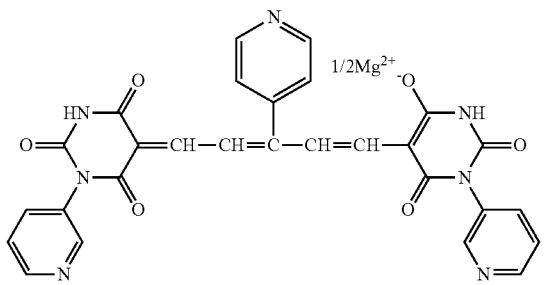
(F-28)
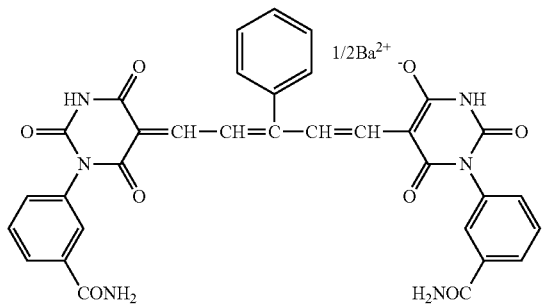

-continued

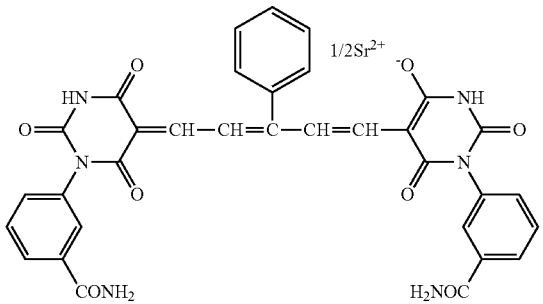

(F-29)

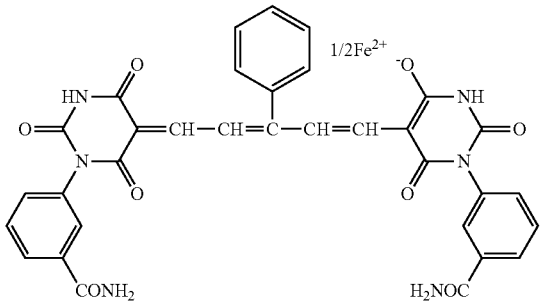

(F-30)

(Pyrrolopyrrole Coloring Agent)

Examples of the pyrrolopyrrole coloring agent as the specific near-infrared absorbing agent that can be used in the lens for spectacles of the present disclosure include compounds represented by General Formula (2).

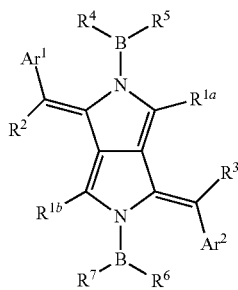

(2)

In General Formula (2), $R^1$ and $R^{1b}$ each independently represent an alkyl group, an aryl group, or a heteroaryl group.

$Ar^1$ and $Ar^2$ each independently represent a heteroaryl group.

$R^2$ and $R^3$ each independently represent a hydrogen atom or a monovalent substituent, and $R^4$, $R^5$, $R^6$, and $R^7$ each independently represent a monovalent substituent.

Examples of the substituent represented by $R^2$, $R^3$, $R^4$, $R^5$, $R^6$, and $R^7$ include a hydrocarbon group which may contain an oxygen atom, a heteroaryl group, an amino group, an acylamino group, an alkoxycarbonylamino group, an aryloxycarbonylamino group, a sulfonylamino group, a sulfamoyl group, a carbamoyl group, an alkylthio group, an arylthio group, a heteroarylthio group, an alkylsulfonyl group, an arylsulfonyl group, a sulfinyl group, an ureido group, a phosphoric amide group, a mercapto group, a sulfo group, a carboxyl group, a nitro group, a hydroxamic acid group, a sulfino group, a hydrazino group, an imino group, a silyl group, a hydroxy group, a halogen atom, and a cyano group.

The heteroaryl group is preferably a monocyclic ring or a fused ring, preferably a monocyclic ring or a fused ring having a fused number of 2 to 8, and more preferably a monocyclic ring or a fused ring having a fused number of 2 to 4. The number of heteroatoms constituting the heteroaryl group is preferably 1 to 3. The hetero atom constituting the heteroaryl group is preferably a nitrogen atom, an oxygen atom, or a sulfur atom. The heteroaryl group preferably has 3 to 30 carbon atoms, more preferably has 3 to 18 carbon atoms, more preferably has 3 to 12 carbon atoms, and particularly preferably has 3 to 5 carbon atoms. The heteroaryl group is preferably a 5-membered ring or a 6-membered ring. Specific examples of the heteroaryl group include, for example, an imidazolyl group, a pyridyl group, a pyrazyl group, a pyrimidyl group, a pyridazyl group, a triazyl group, a quinolyl group, a quinoxalyl group, an isoquinolyl group, an indolenyl group, a furyl group, a thienyl group, a benzoxazolyl group, a benzimidazolyl group, a benzthiazolyl group, a naphthothiazolyl group, a benzoxazoli group, a m-carbazolyl group, and an azepinyl group.

Examples of the halogen atom include a fluorine atom, a chlorine atom, a bromine atom, and an iodine atom.

Examples of the hydrocarbon group include an alkyl group, an alkenyl group, and an aryl group.

The alkyl group preferably has 1 to 40 carbon atoms. The lower limit is more preferably 2 or more, still more preferably 3 or more, and further preferably 4 or more. The upper limit is more preferably 35 or less, and still more preferably 30 or less. The alkyl group may be linear, branched, or cyclic, but linear or branched is preferable, and branched is particularly preferable. The branched alkyl group preferably has 3 to 40 carbon atoms. The lower limit is, for example, more preferably 5 or more, still more preferably 8 or more, and further preferably 10 or more. The upper limit is more preferably 35 or less, and still more preferably 30 or less.

The number of branches of the branched alkyl group is, for example, preferably 2 to 10, and more preferably 2 to 8. In a case where the number of branches is in the above range, the solubility of the coloring agent compound in a solvent becomes better.

The alkenyl group preferably has 2 to 40 carbon atoms. The lower limit is, for example, more preferably 2 or more, still more preferably 3 or more, and further preferably 4 or more. The upper limit is more preferably 35 or less, and still more preferably 30 or less. The alkenyl group may be linear, branched, or cyclic, but linear or branched is preferable, and branched is particularly preferable. The branched alkenyl group preferably has 3 to 40 carbon atoms. The lower limit is, for example, more preferably 5 or more, still more preferably 8 or more, and further preferably 10 or more. The upper limit is more preferably 35 or less, and still more preferably 30 or less. The number of branches of the branched alkenyl group is preferably 2 to 10, and more preferably 2 to 8. In a case where the number of branches is in the above range, the solubility of the coloring agent compound in a solvent becomes better.

The aryl group preferably has 6 to 30 carbon atoms, more preferably has 6 to 20 carbon atoms, and still more preferably has 6 to 12 carbon atoms.

Examples of the pyrrolopyrrole coloring agent include the compounds shown below, but the pyrrolopyrrole coloring agent in the present disclosure is not limited to the following exemplary compounds.

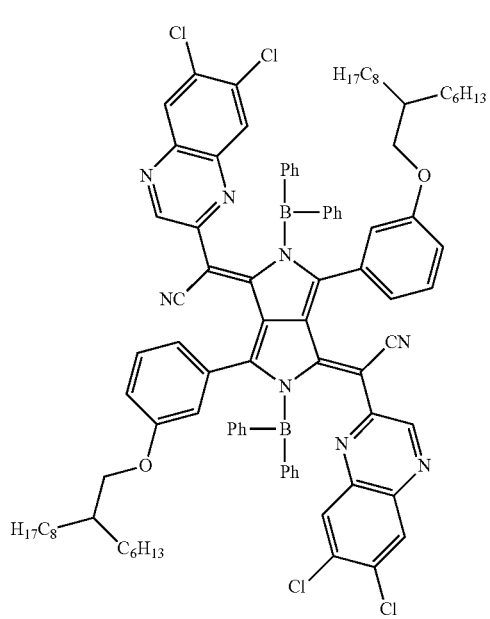

D-1

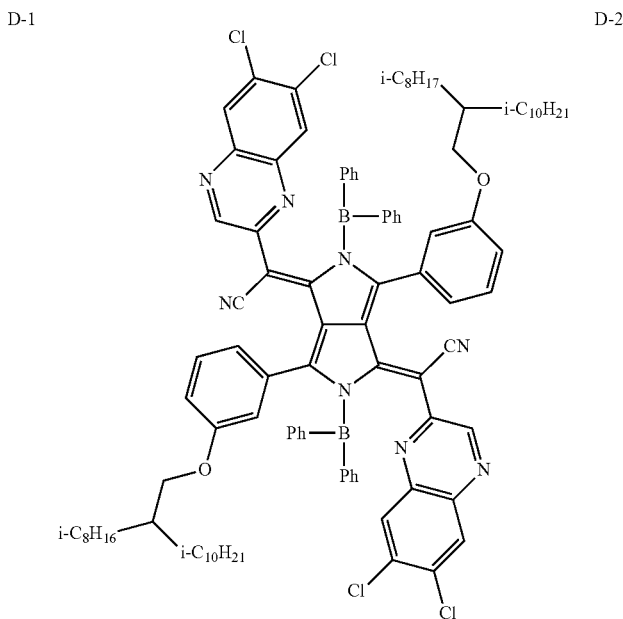

D-2

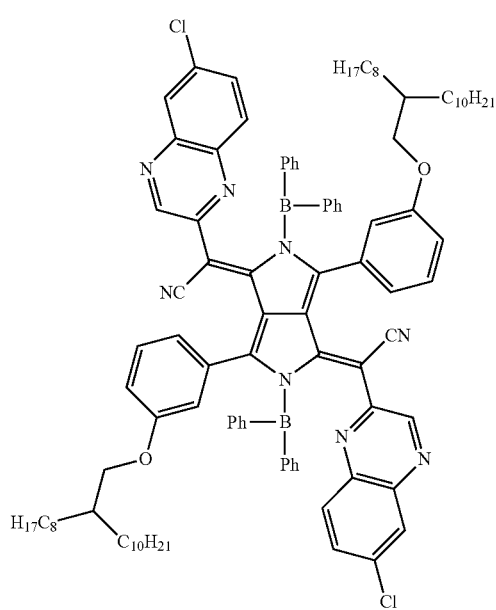

D-3

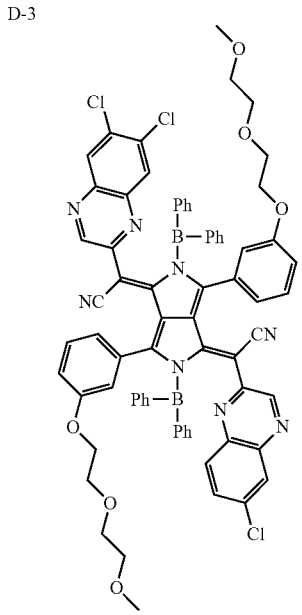

D-4

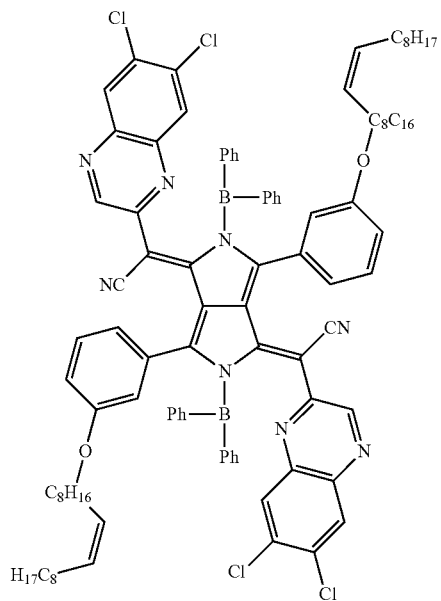
D-5
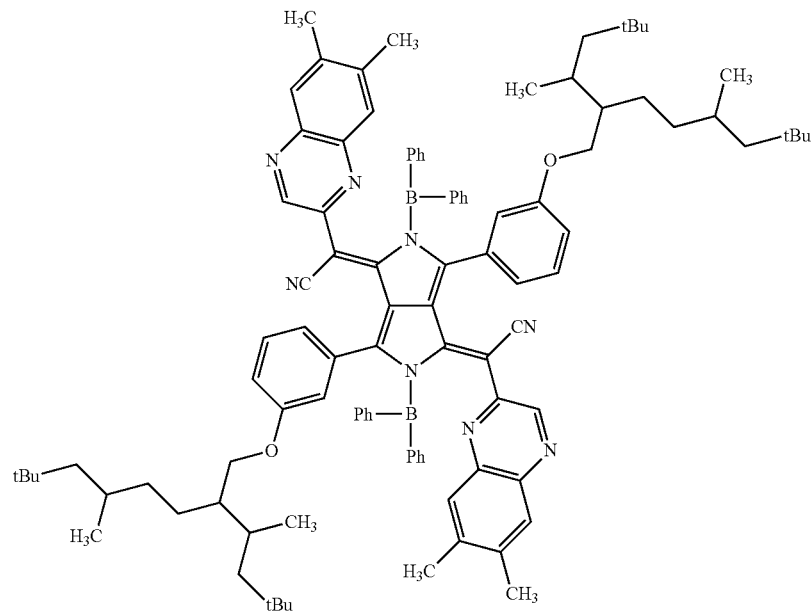
D-6

-continued
D-7
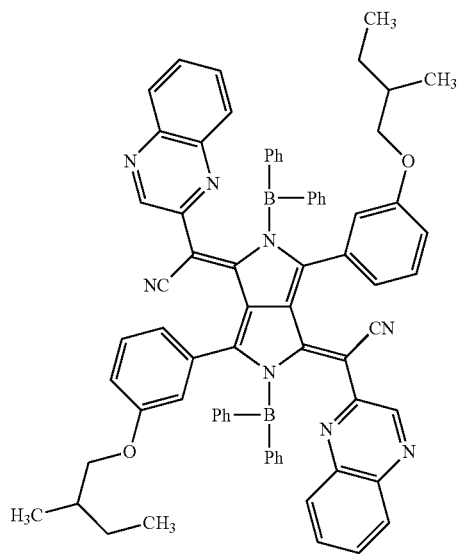
D-8
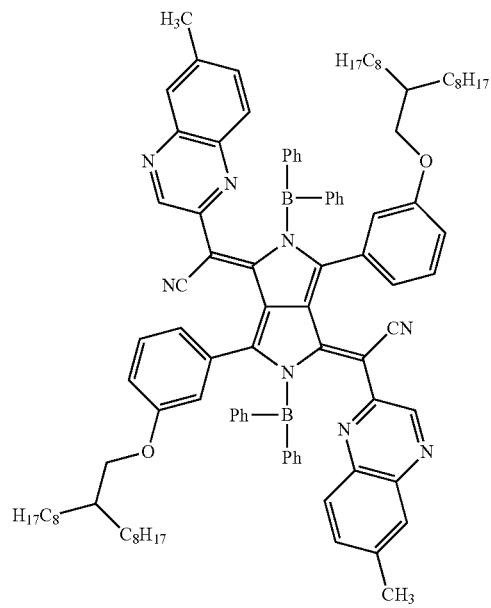
D-9
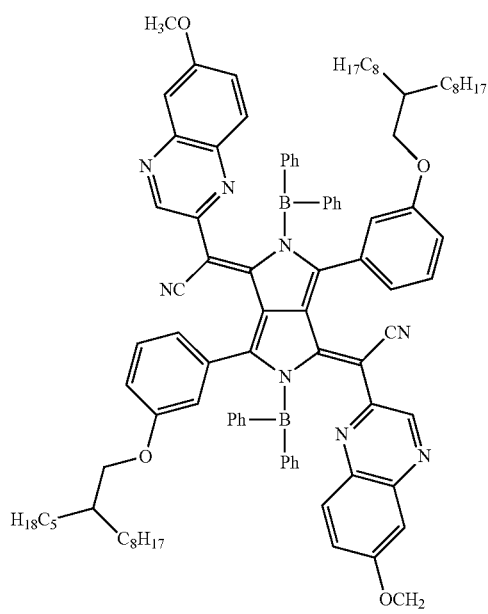
D-10
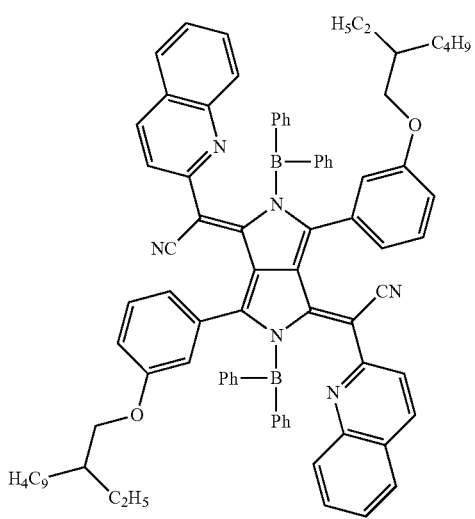

-continued
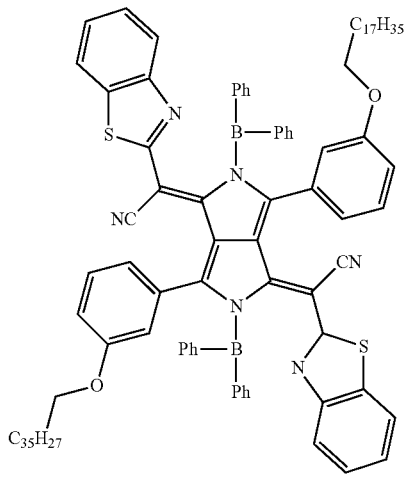
D-11
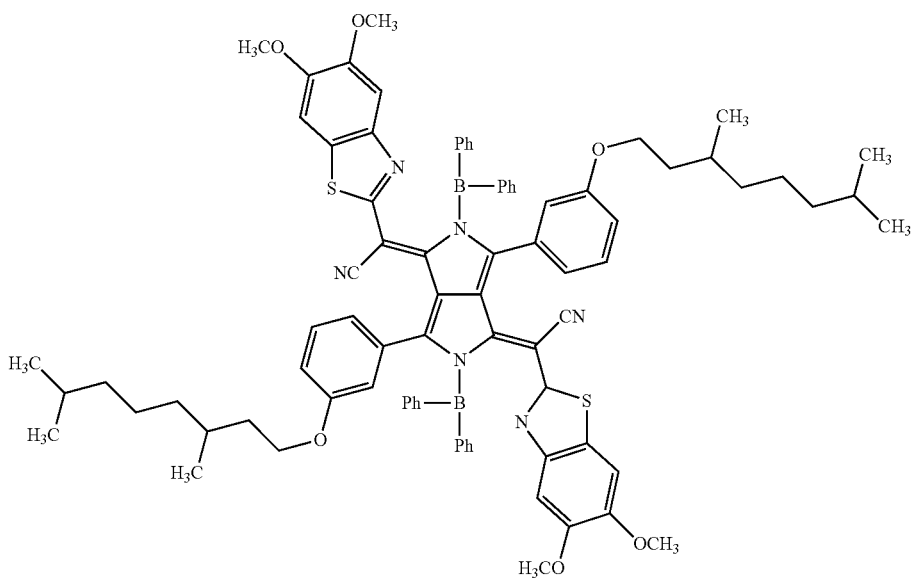
D-12
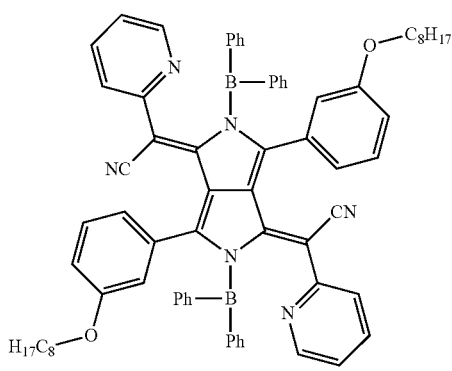
D-13
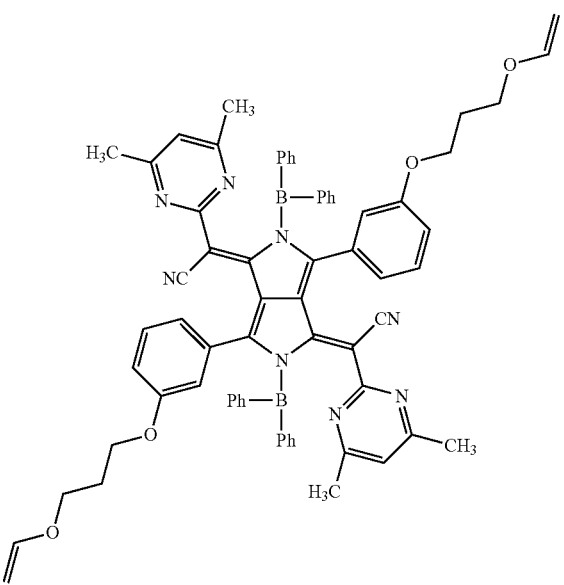
D-14

-continued
D-15
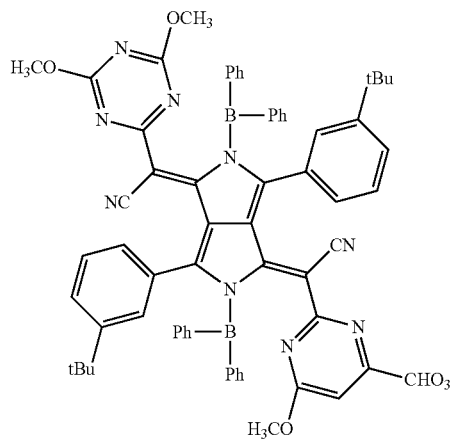
D-16
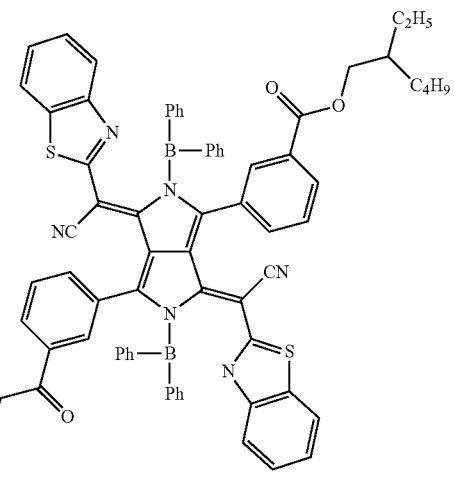
D-17
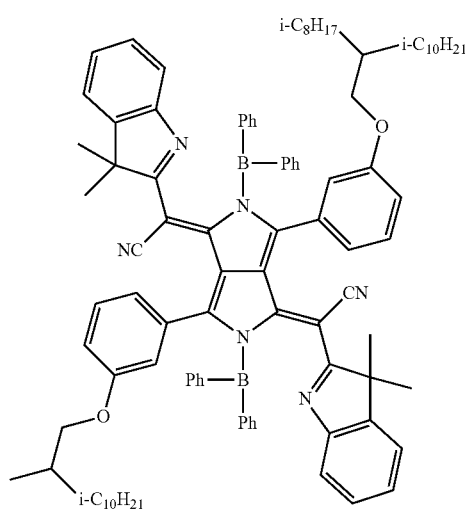
C-18
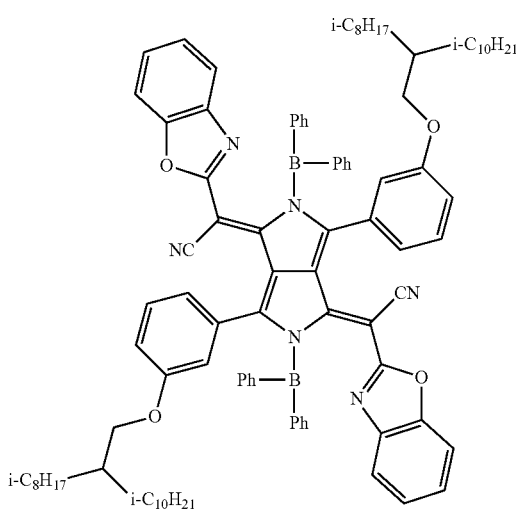
D-19
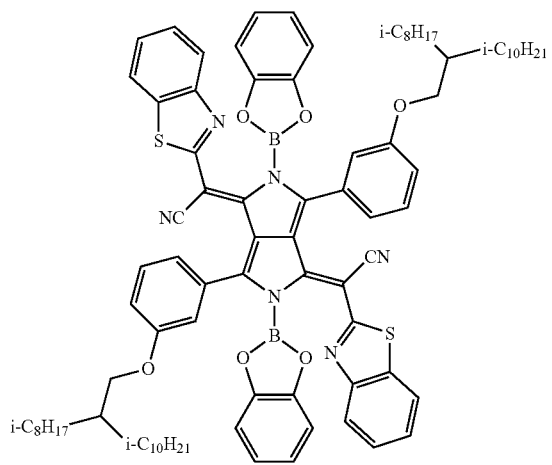
D-20
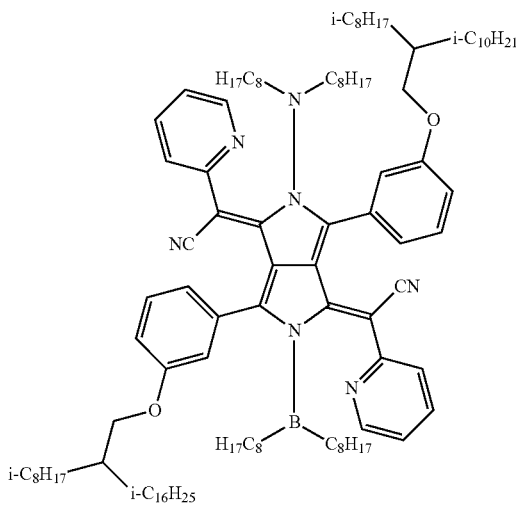

-continued
D-21
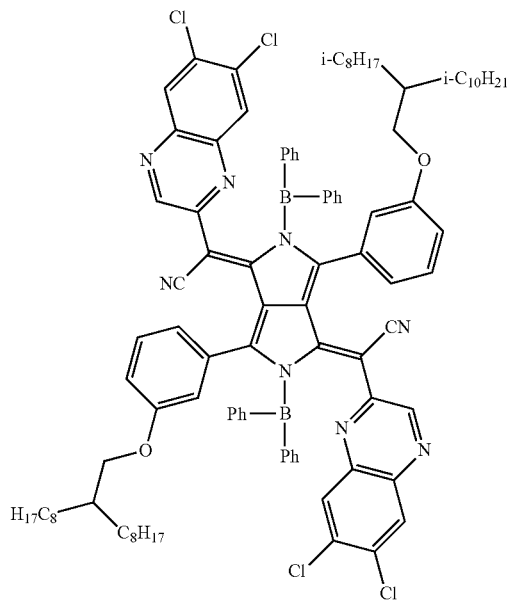
D-22
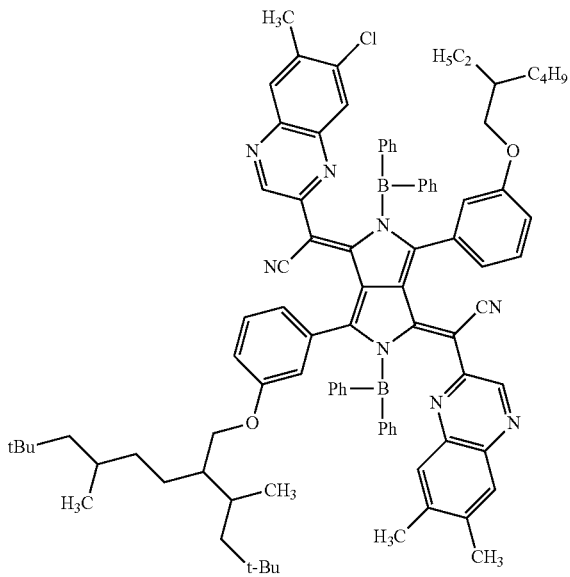
D-23
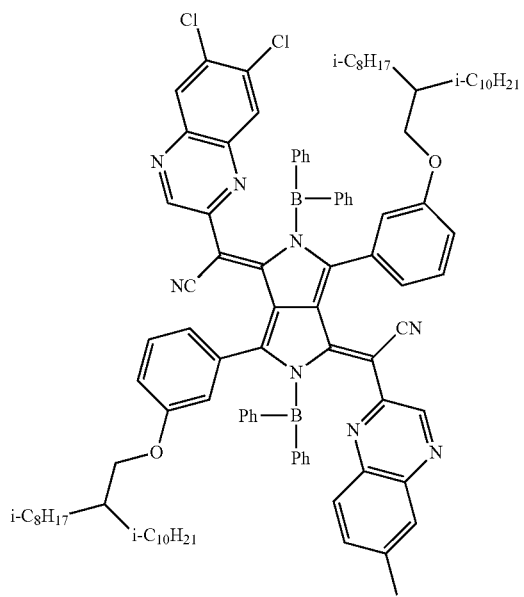
D-24
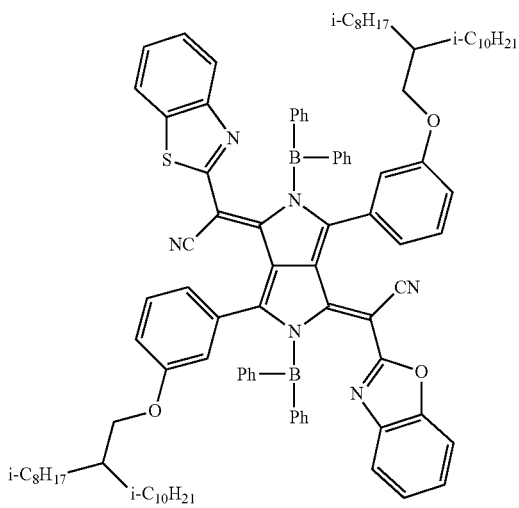

-continued
D-25
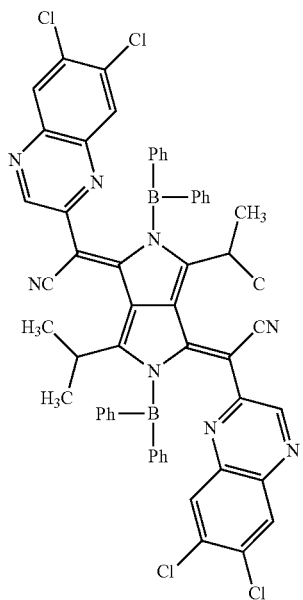
D-26
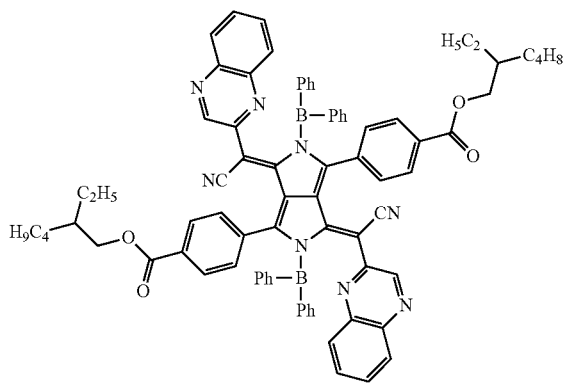
D-27
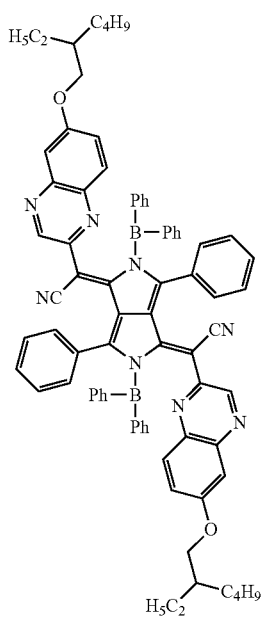

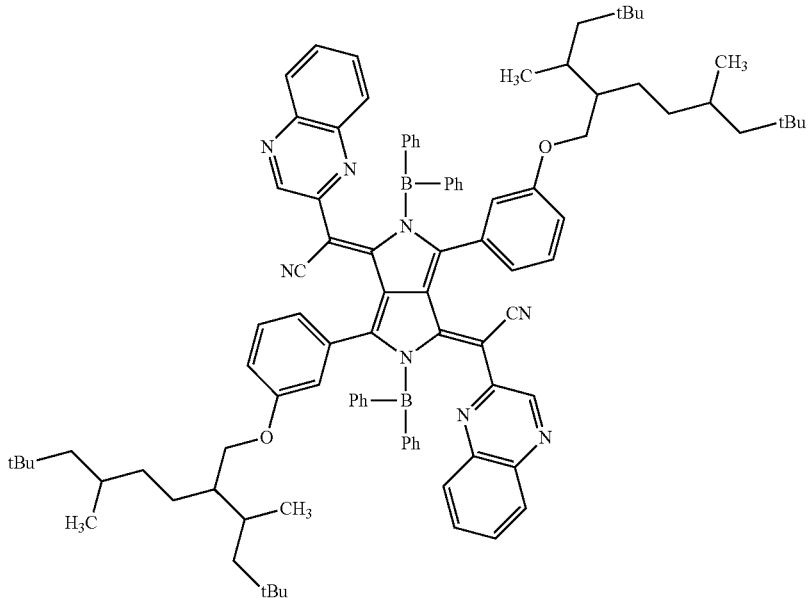
D-28
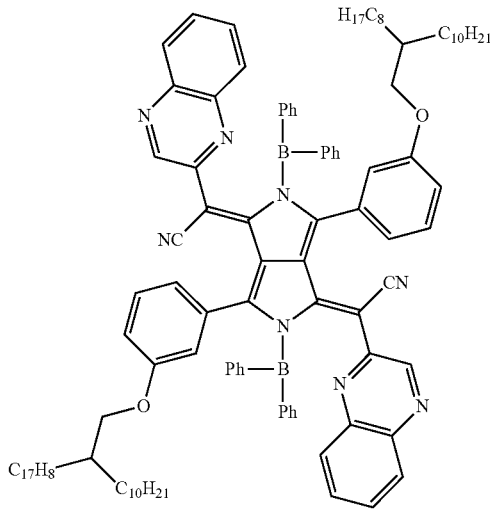
D-29
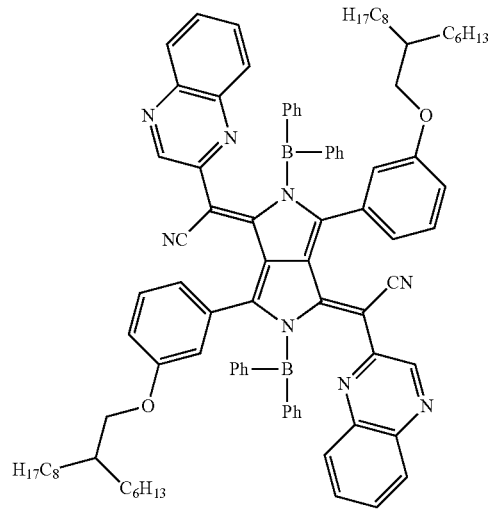
D-30

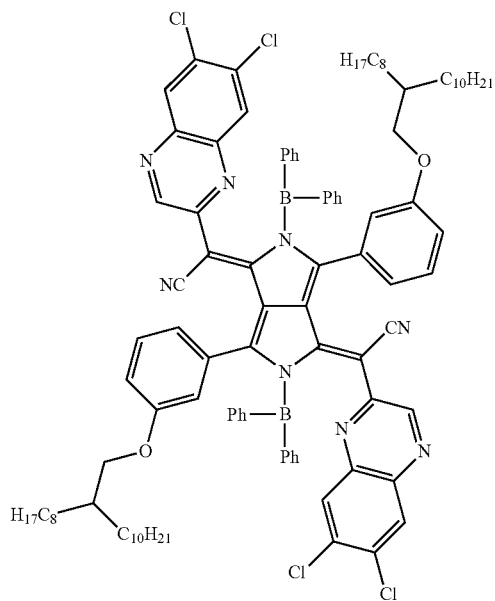
D-31
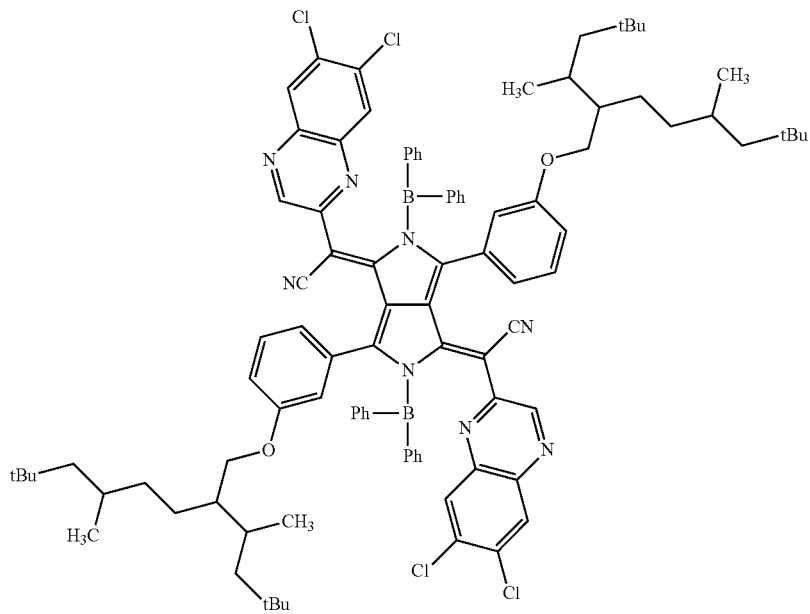
D-32

D-33
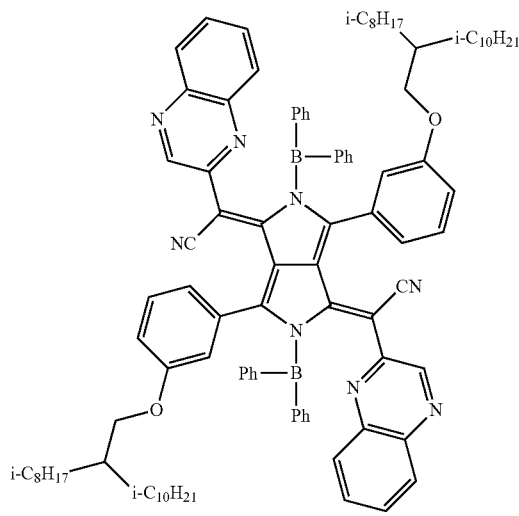
D-34
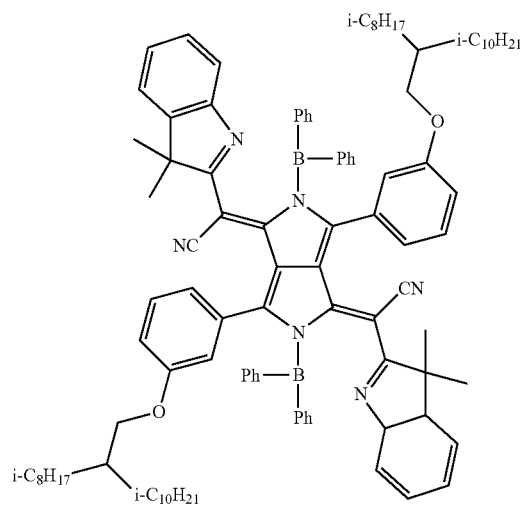
D-35
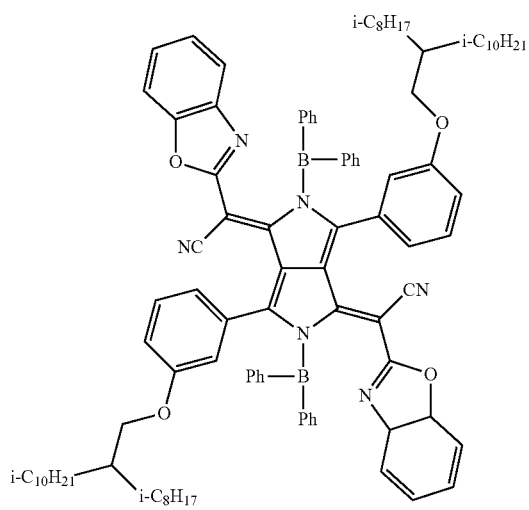
D-36
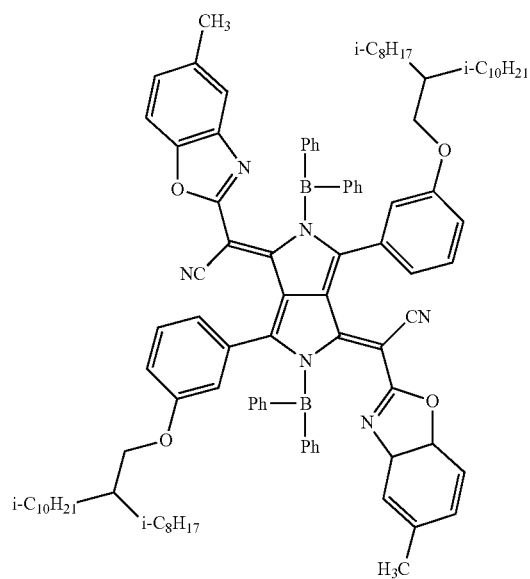

-continued
D-37
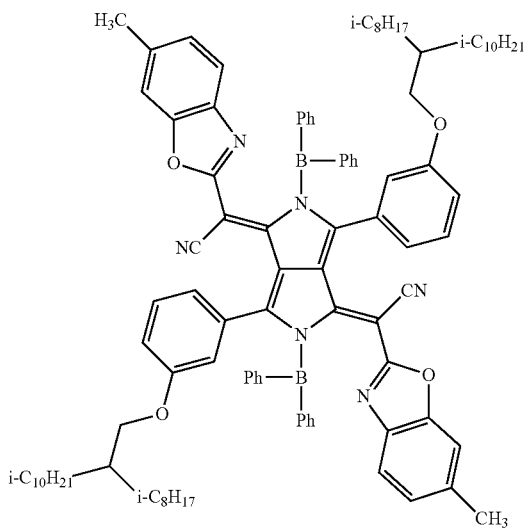
D-38
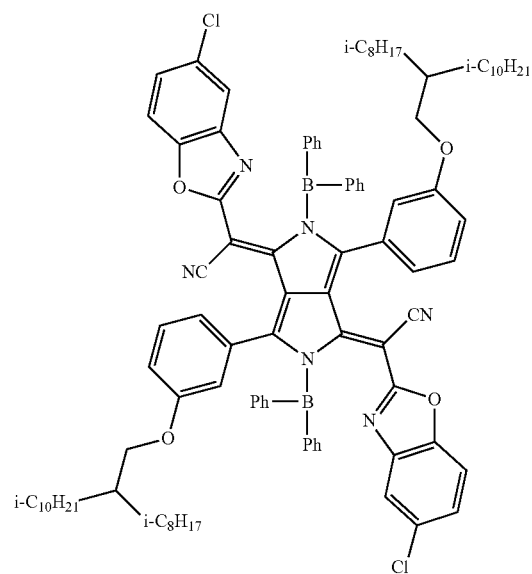
D-39
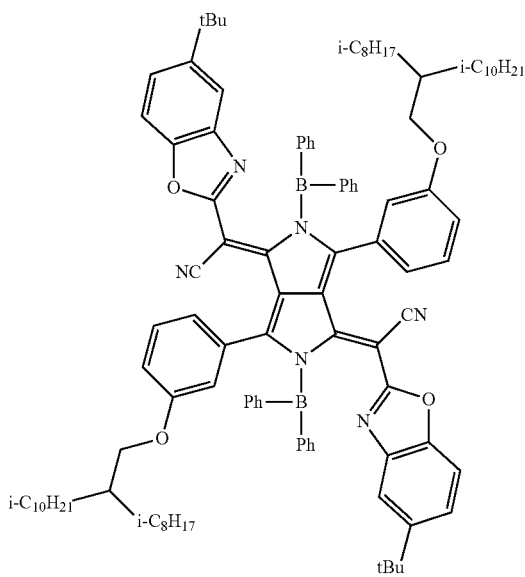
D-40
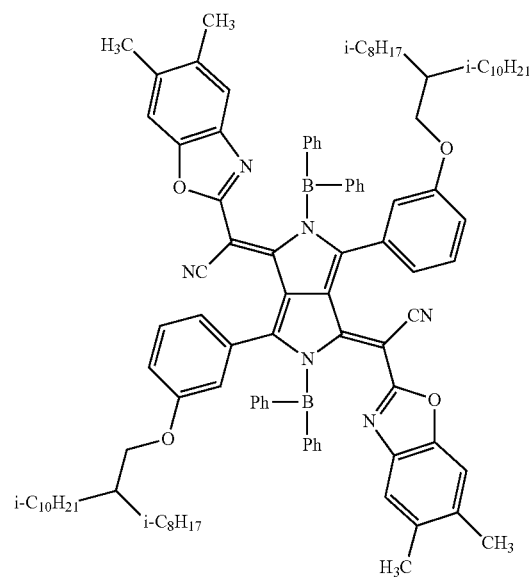

-continued
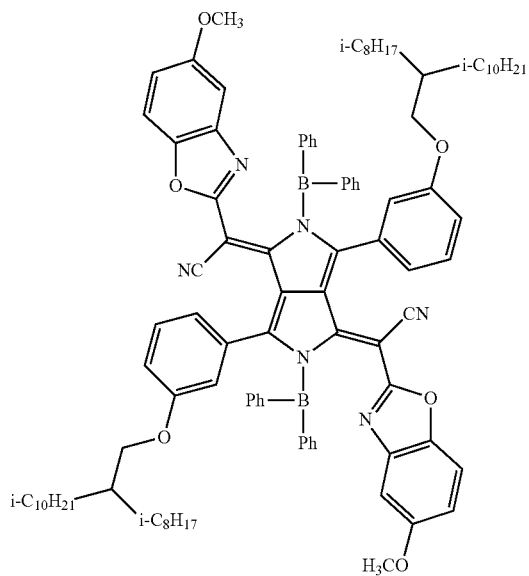
D-41
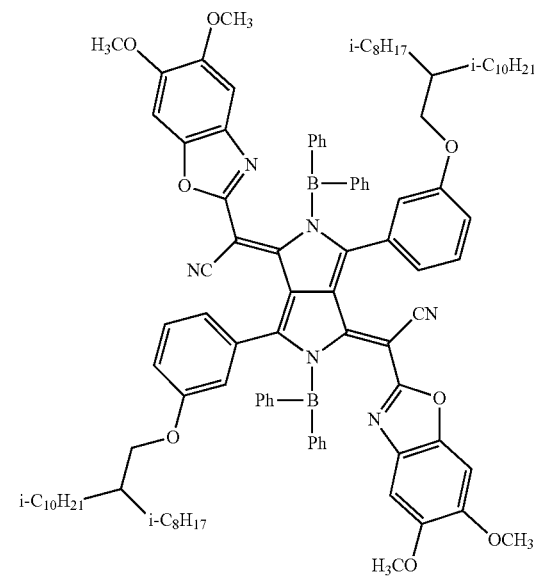
D-42
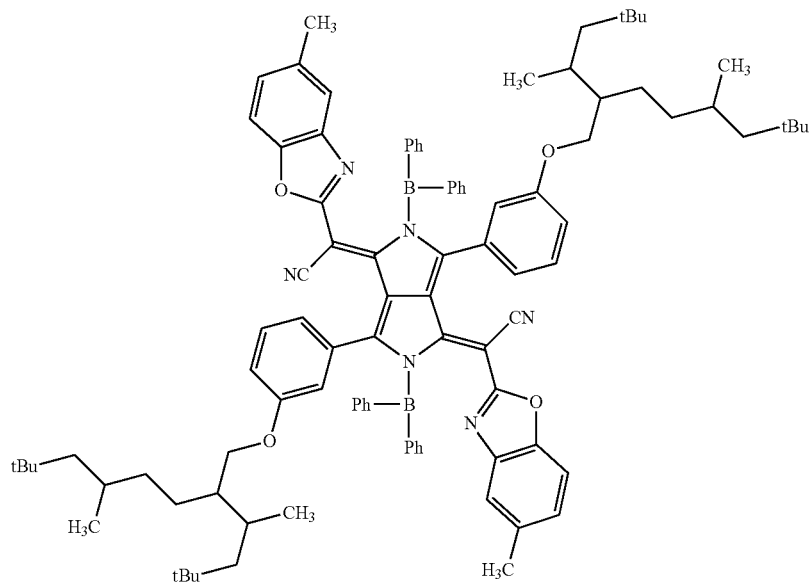
D-43

D-44
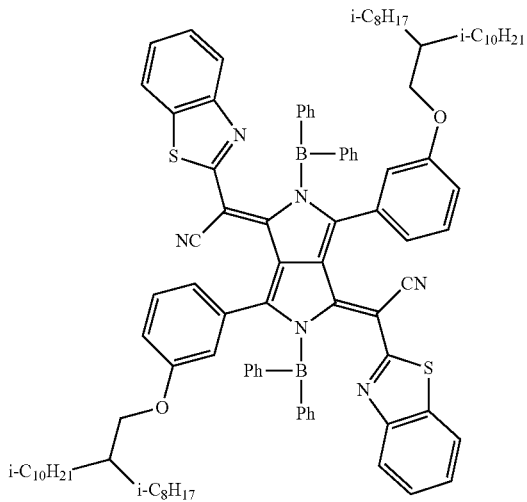
D-45
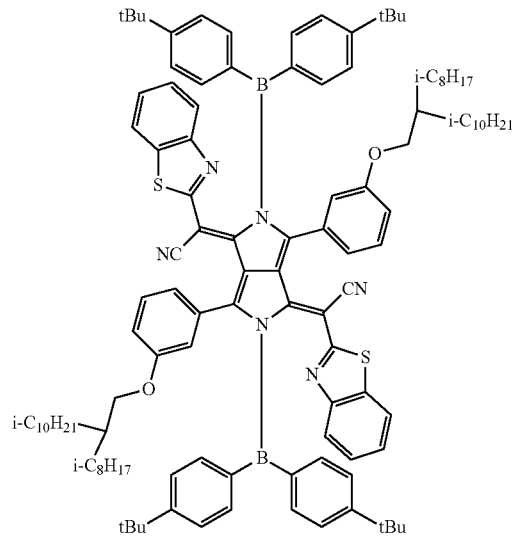
D-46
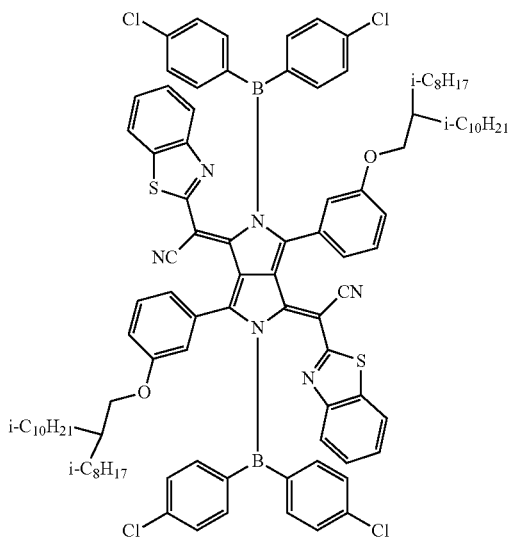
D-47
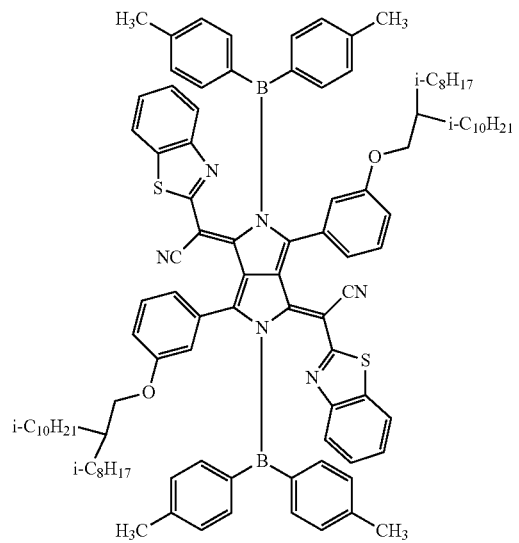
D-48
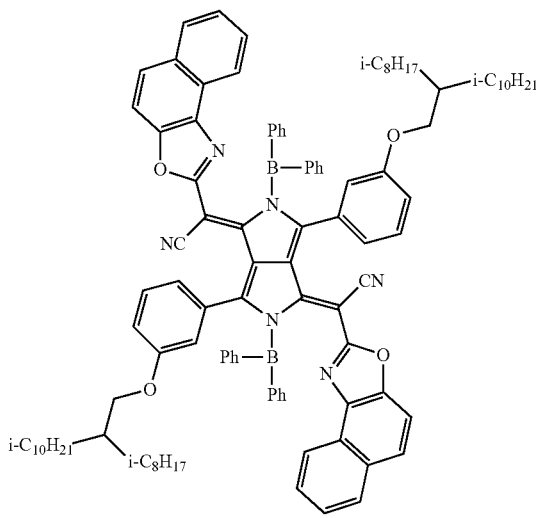
D-49
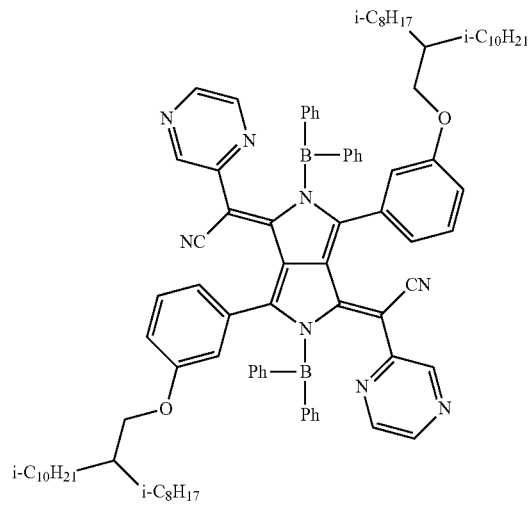

-continued
D-50
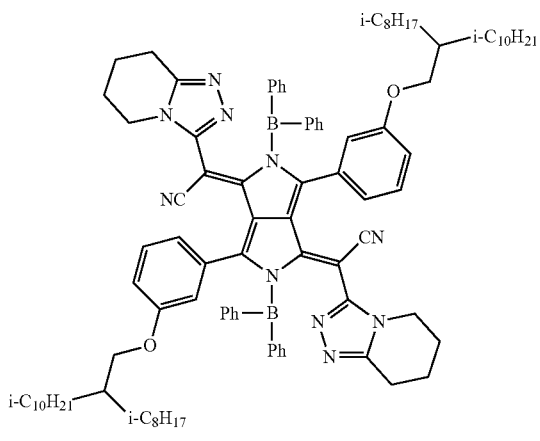
D-51
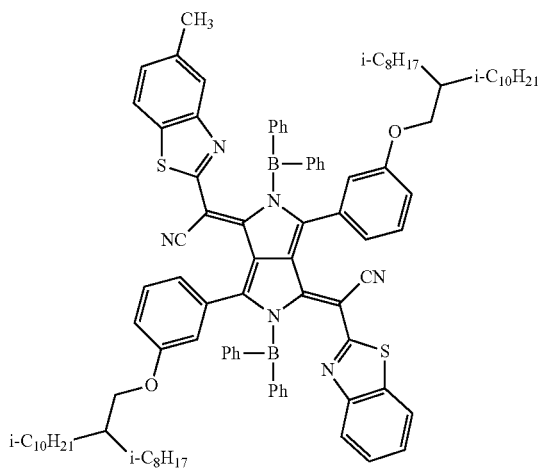
D-52
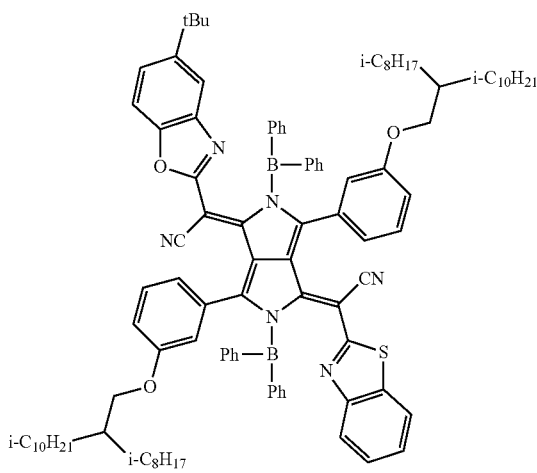
D-53
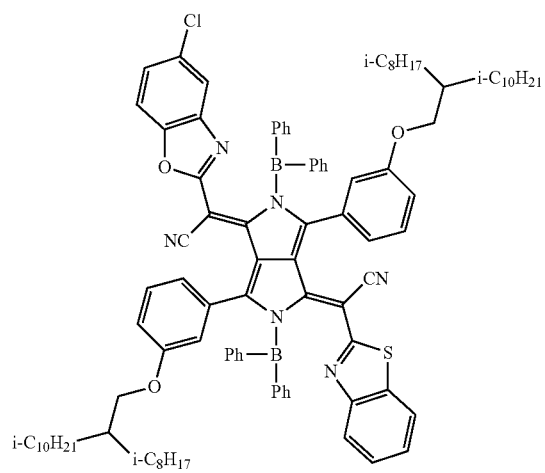
D-54
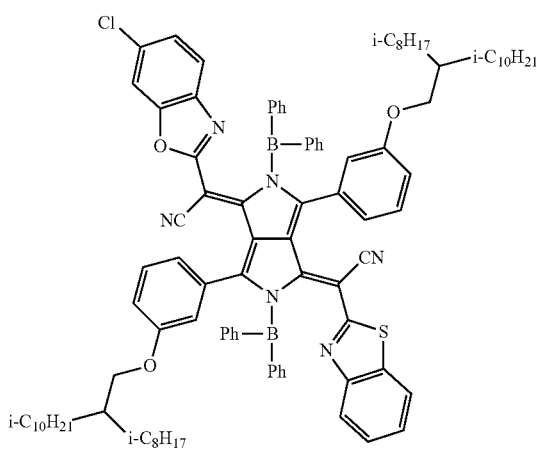
D-55
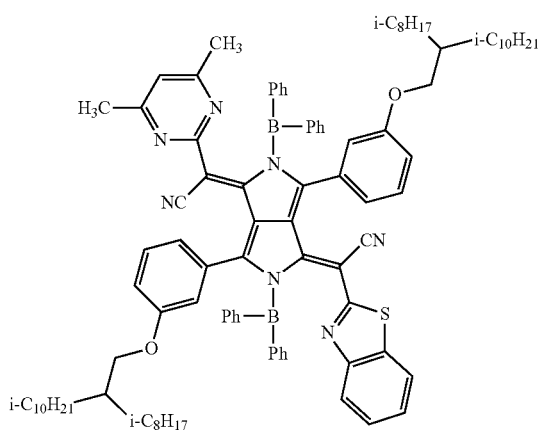

-continued
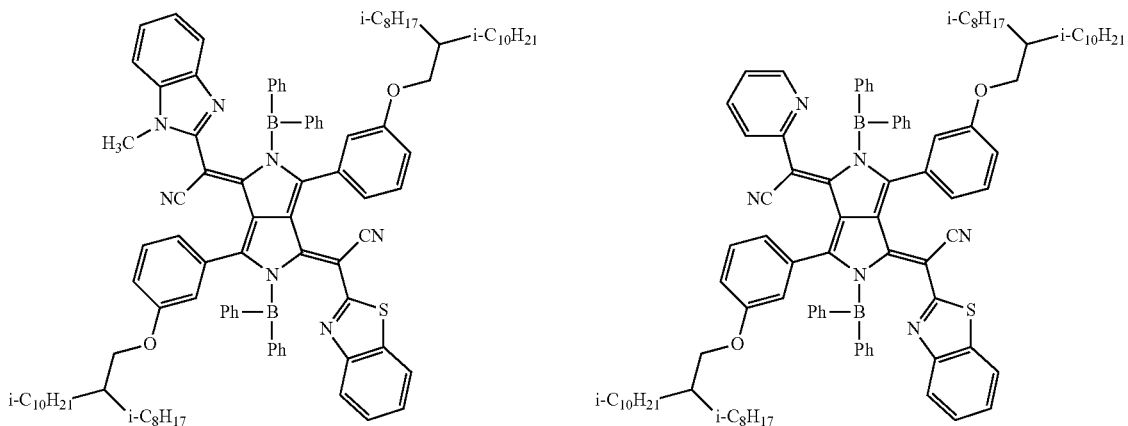
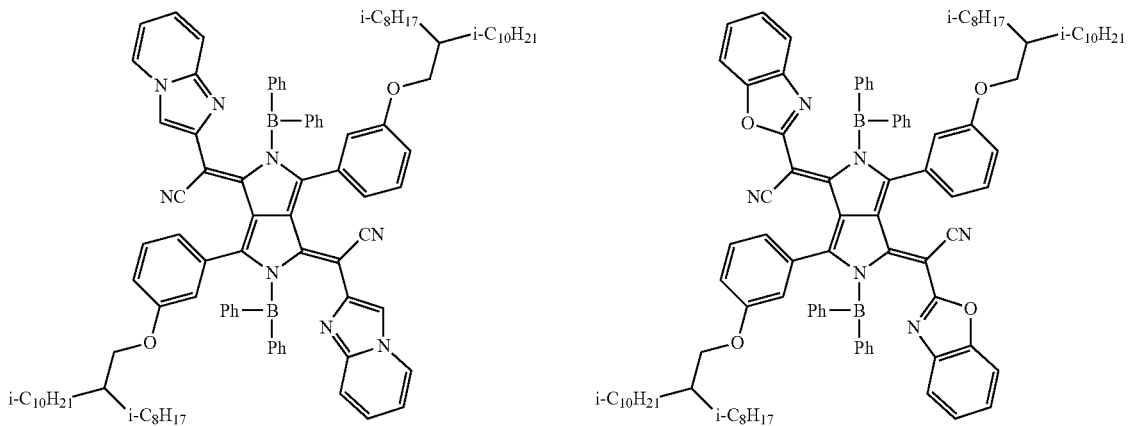
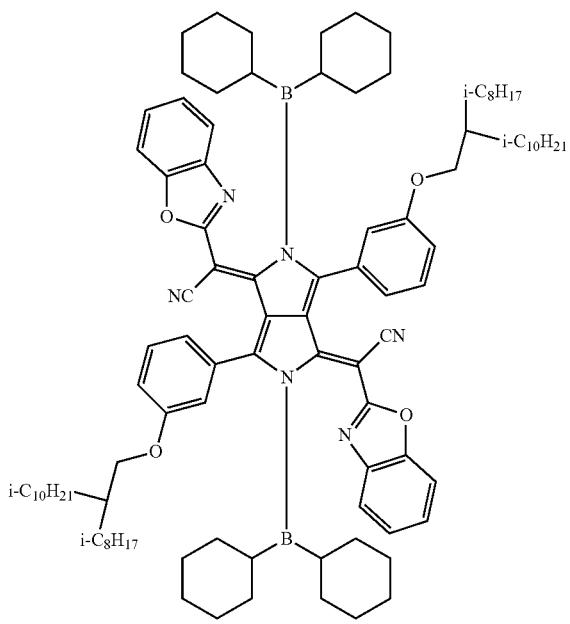

-continued
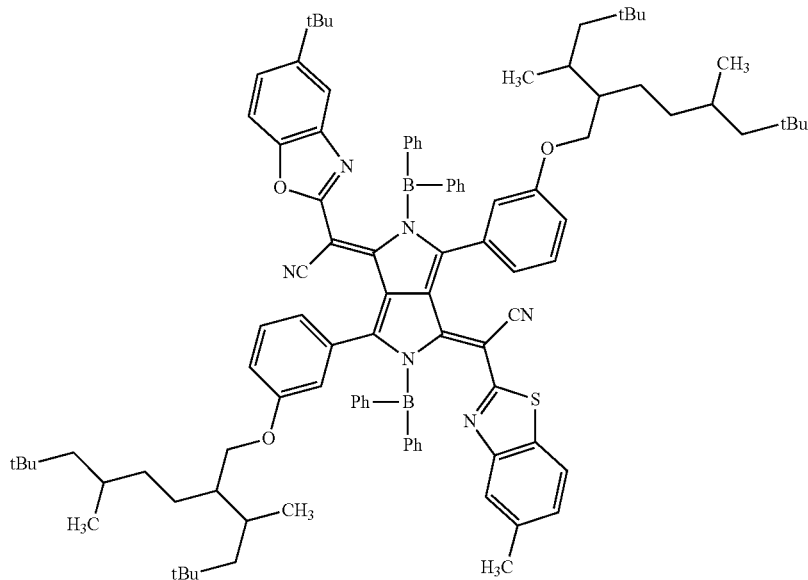
D-61
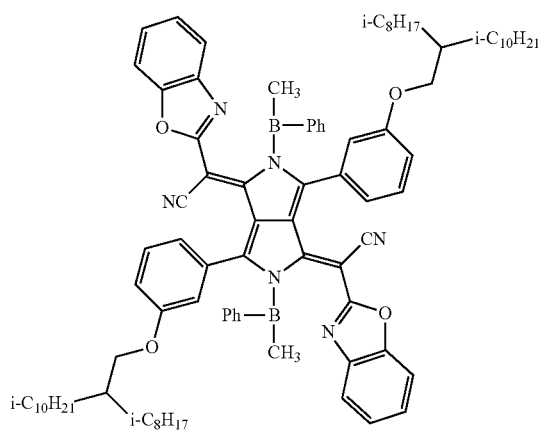
D-62
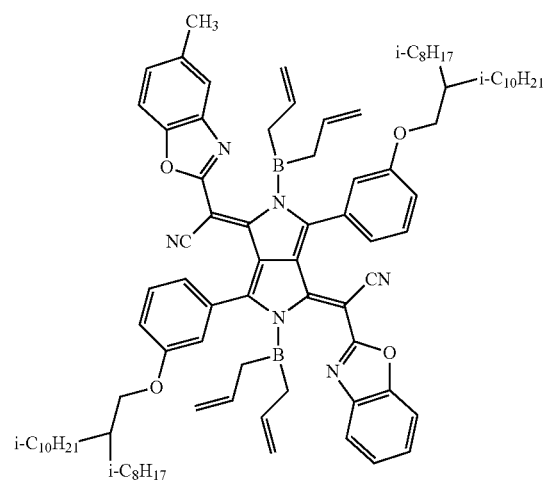
D-63
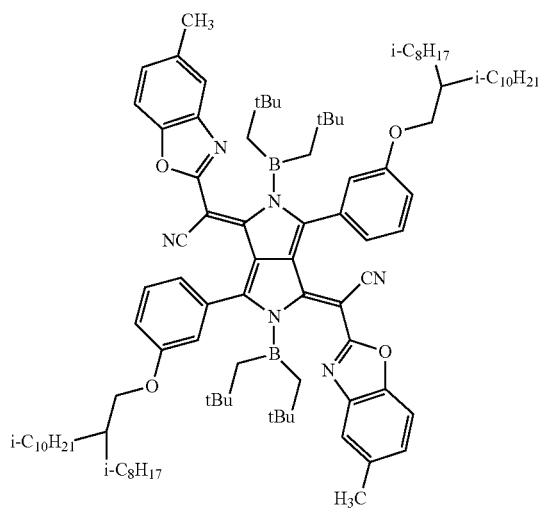
D-64
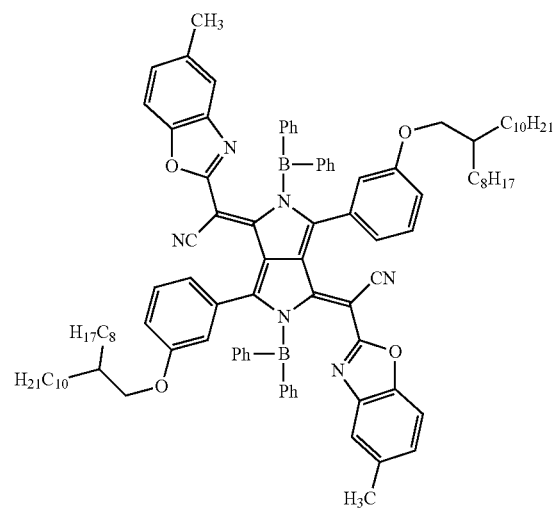
D-65

-continued
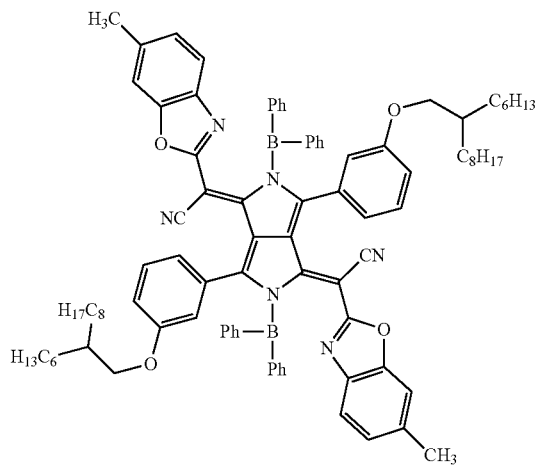
D-66
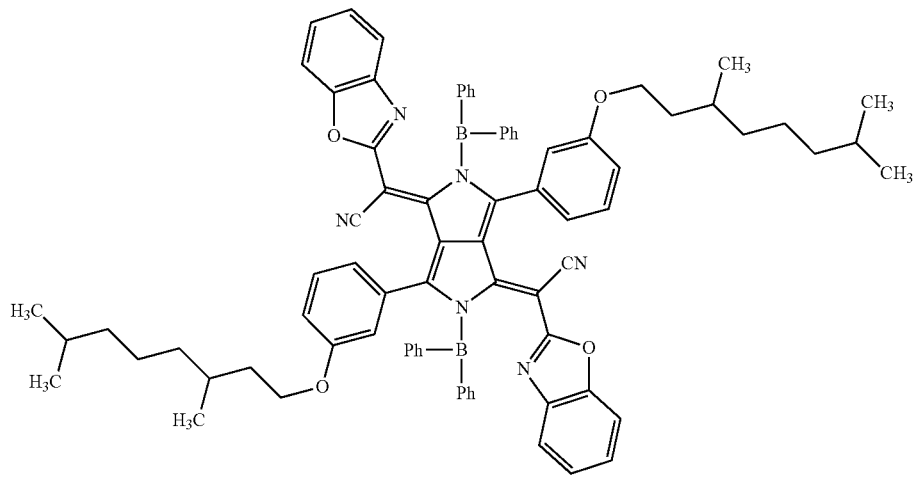
D-67
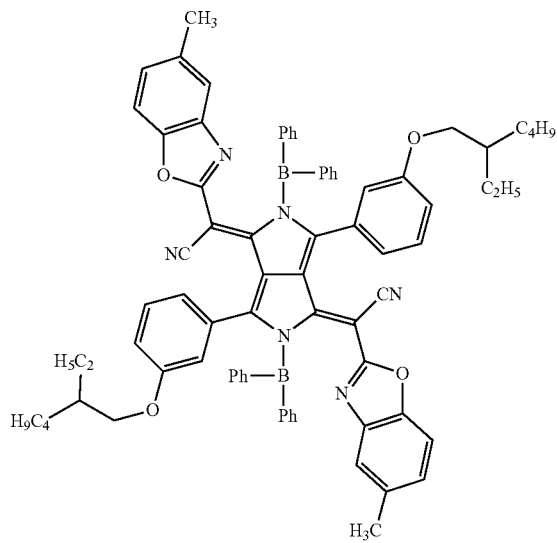
D-68
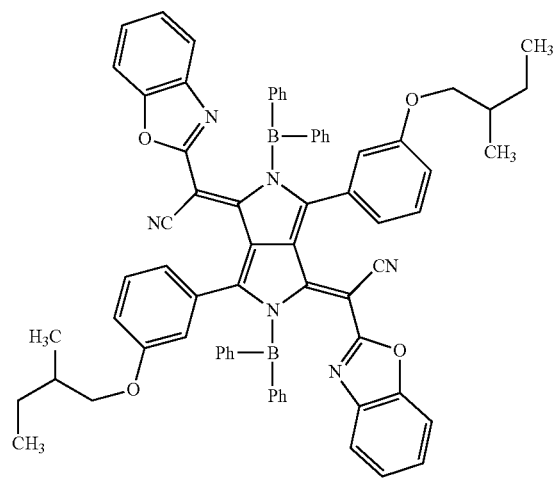
D-69

D-70

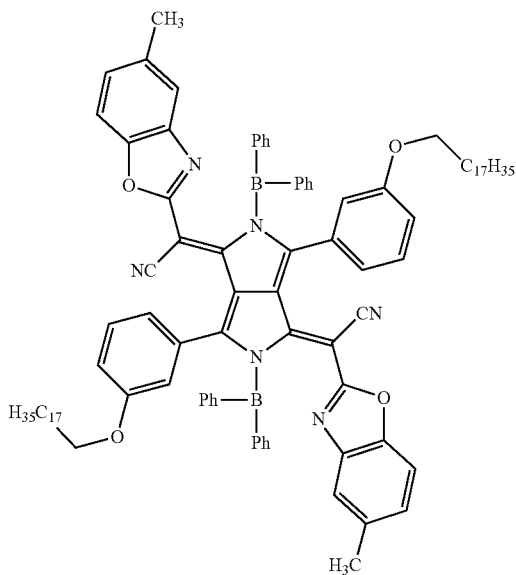

(Cyanine Coloring Agent)

Examples of the cyanine coloring agent as the specific near-infrared absorbing agent that can be used in the lens for spectacles of the present disclosure include compounds represented by General Formula (3).

General Formula (3)

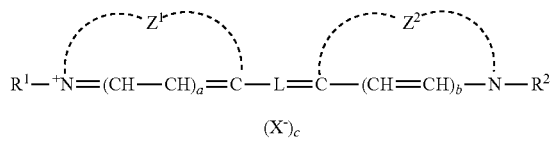

In General Formula (3), $Z^1$ and $Z^2$ each independently represent a nonmetallic atom group forming a 5-membered or 6-membered nitrogen-containing heterocycle which may be condensed. $R^1$ and $R^2$ each independently represent an alkyl group, an alkenyl group, or an aralkyl group, and L represents a linking group in which 5, 7, or 9 methine groups are bonded at a position conjugated with a double bond. a, b, and c are each independently 0 or 1, and x⁻ represents a counter anion.

In General Formula (3), $Z^1$ and $Z^2$ each are a nonmetallic atom group forming a 5-membered or 6-membered nitrogen-containing heterocycle which may be condensed. Examples of the nitrogen-containing heterocycle and the condensed ring thereof include an oxazole ring, an isoxazole ring, a benzoxazole ring, a naphthoxazole ring, a thiazole ring, a benzothiazole ring, a naphthothiazole ring, an indolenine ring, a benzoindolenine ring, an imidazole ring, a benzimidazole ring, a naphthimidazole ring, a quinoline ring, a pyridine ring, a pyrrolopyridine ring, a furopyrrole ring, an indolizine ring, an imidazoquinoxaline ring, and a quinoxaline ring. The nitrogen-containing heterocycle is preferably a 5-membered ring rather than a 6-membered ring. In a still more preferred embodiment, a benzene ring or a naphthalene ring is fused to a 5-membered nitrogen-containing heterocycle. Most preferred are the indolenine ring and the benzoindolenine ring.

The nitrogen-containing heterocycle and the ring fused therewith may have a substituent. Examples of the substituent include an alkyl group (for example, methyl, ethyl, or propyl), an alkoxy group (for example, methoxy, or ethoxy), an aryloxy group (for example, phenoxy, or p-chlorophenoxy), a halogen atom (Cl, Br, or F), an alkoxycarbonyl group (for example, ethoxycarbonyl), a cyano group, a nitro group, a sulfo group (which may be a salt), and a carboxyl group (which may be a salt).

$R^1$ and $R^2$ each are an alkyl group, an alkenyl group, or an aralkyl group. An alkyl group is particularly preferable. The alkyl group preferably has 1 to 10 carbon atoms, and may be substituted with a halogen atom (Cl, Br, or F), an alkoxycarbonyl group (for example, methoxycarbonyl or ethoxycarbonyl), a hydroxyl group, a carboxyl group (which may be a salt), a sulfo group (which may be a salt) or the like. The alkenyl group preferably has 2 to 10 carbon atoms and includes 2-pentenyl, vinyl, allyl, 2-butenyl, and 1-propenyl. The alkenyl group may be substituted with the substituents described for the alkyl group. The aralkyl group preferably has 7 to 12 carbon atoms, and includes benzyl and phenethyl. The aralkyl group may be substituted with the substituents described in $Z^1$ and $Z^2$.

L is a linking group in which 5, 7, or 9 methine groups are bonded at a position conjugated with a double bond. The number of methine groups is preferably 7 or 9, and more preferably 7. The methine groups may be bonded to each other to form a 5-membered or 6-membered ring.

The methine group may have a substituent. The methine group having a substituent is preferably a central (meso) methine group. Examples of the substituent include a methyl group, an ethyl group, a methoxy group, a phenoxy group, a halogen atom (Cl, Br, or F), an aryl group (including phenyl, or naphthyl, which may have a substituent, in which examples of the substituent include methyl, ethyl, methoxy, ethoxy, phenoxy, Cl, Br, F, ethoxycarbonyl, cyano, nitro), —NR³R⁴ ($R^3$ and $R^4$ are each independently a hydrogen atom, an alkyl group, or an aryl group), —OR³, —SR³, SO₂R³ ($R^3$ represents a hydrogen atom, an alkyl group, or an aryl group), a hydroxyl group, or a ketone.

In a case where $R^3$ and $R^4$ are each an alkyl group or an aryl group, the alkyl group or the aryl group has the same meaning as the alkyl group or the aryl group exemplified as the substituent that can be introduced into the methine group.

a, b, and c each are 0 or 1. c is 1 in a case where the counter anion represented by $x^-$ is present in General Formula (3). Further, in a case where an anionic substituent forms an intramolecular salt with $N^+$, such as carboxyl, c is 0.

$x^-$ represents a counter anion. Examples of counter anion include halide ions ($Cl^-$, $Br^-$, $I^-$), p-toluenesulfonate ion, ethylsulfate ion, $PF_6^-$, $BF_4^-$, or $ClO_4^-$.

The cyanine coloring agent that can be used as the specific near-infrared absorbing agent is exemplified by showing General Formula and the substituents thereof, but the present disclosure is not limited to the following compounds.

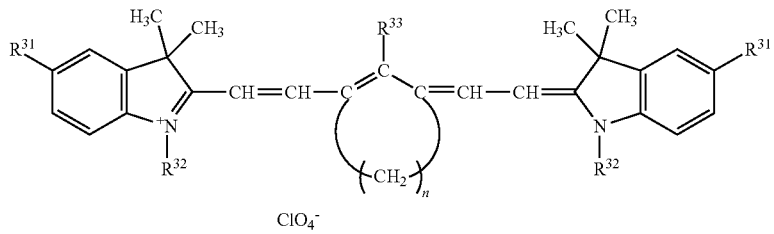

| Compound | $R^{31}$ | $R^{32}$ | $R^{33}$ | n |
|---|---|---|---|---|
| E-1 | H | $C_4H_9$ | H | 0 |
| E-2 | H | $C_4H_9$ | H | 2 |
| E-3 | H | $C_4H_9$ | Cl | 3 |
| E-4 | $CH_3$ | $C_4H_9$ | $SC_6H_5$ | 3 |
| E-5 | Cl | $C_2H_5$ | $N(C_6H_5)_2$ | 2 |
| E-6 | $CH_3$ | $(H_2C)_3O$—⟨phenyl with $C_5H_{11}(t)$ and $C_5H_{11}(t)$⟩ | $SC_6H_5$ | 3 |
| E-7 | H | $(H_2C)_3O$—⟨phenyl with $C_5H_{11}(t)$ and $C_5H_{11}(t)$⟩ | $OC_6H_5$ | 2 |
| E-8 | $CH_3$ | $(H_2C)_3O$—⟨phenyl with $C_5H_{11}(t)$ and $C_5H_{11}(t)$⟩ | (barbiturate group with $C_2H_5$—N, N—$C_2H_5$) | 2 |
| E-9 | H | $C_{18}H_{37}$ | $SC_6H_5$ | 3 |
| E-10 | H | $CH_3$ | $SO_2C_6H_5$ | 3 |
| E-11 | $CO_2C_2H_5$ | $C_8H_{17}$ | Br | 3 |

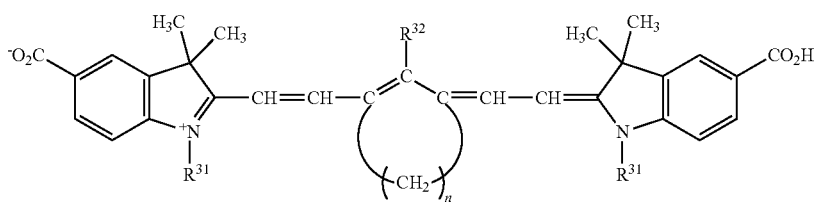

| Compound | R³¹ | R³² | n |
|---|---|---|---|
| E-12 | CH₃ | CH₃ | 0 |
| E-13 | CH₃ | Cl | 3 |
| E-14 | C₂H₄CO₂H | Cl | 3 |
| E-15 | CH₃ | CH₃ | 0 |
| E-16 | CH₃ | N(C₆H₅)₂ | 2 |
| E-17 | CH₃ | OCH₃ | 3 |
| E-18 | C₂H₄CONHPh | N(C₆H₅)₂ | 2 |
| E-19 | CH₃ | SC₆H₅ | 2 |
| E-20 | CH₃ | —O—⟨C₆H₄⟩—CH₃ | 2 |

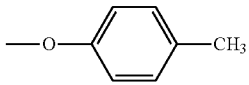

| Compound | R³¹ | n | X⁻ |
|---|---|---|---|
| E-21 | Cl | 3 | H₃C—⟨C₆H₄⟩—SO₃⁻ |
| E-22 | SC₆H₅ | 3 | BF₄⁻ |
| E-23 | SO₂C₆H₅ | 2 | Br⁻ |

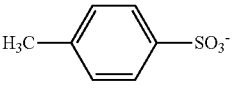

| Compound | n |
|---|---|
| E-24 | 2 |
| E-25 | 4 |
| E-26 | 5 |

(Squarylium Coloring Agent)

Examples of the squarylium coloring agent as the specific near-infrared absorbing agent that can be used in the lens for spectacles of the present disclosure include compounds represented by General Formula (4).

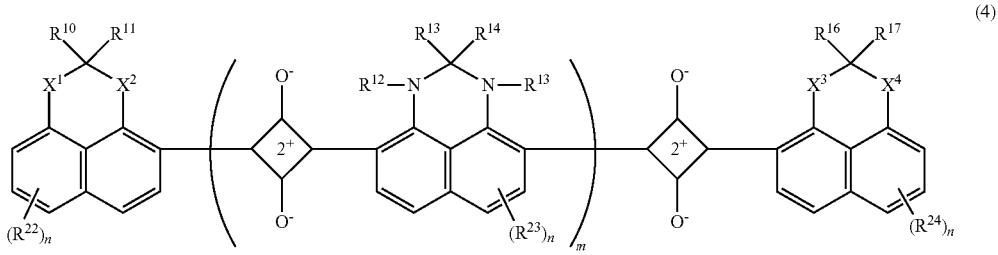

In General Formula (4), $R^{10}$, R, $R^{12}$, $R^{13}$, $R^{14}$, $R^{15}$, $R^{16}$, and $R^{17}$ each independently represents a hydrogen atom, an alkyl group, a cycloalkyl group, an aryl group, an aralkyl group, or a heterocyclic group, and $R^{10}$ and $R^{11}$, or $R^{12}$ and $R^{13}$, or $R^{13}$ and $R^{14}$, or $R^{14}$ and $R^{15}$, or $R^{16}$ and $R^{17}$ may be bonded to each other to form a 5-membered ring or a 6-membered ring.

$X^1$ represents an oxygen atom or $NR^{18}$, $X^2$ represents an oxygen atom or $NR^{19}$, $X^3$ represents an oxygen atom or $NR^{20}$, and $X^4$ represents an oxygen atom or $NR^{21}$, respectively, and $R^{18}$, $R^{19}$, $R^{20}$, and $R^{21}$ each independently represent a hydrogen atom, an alkyl group, a cycloalkyl group, an aryl group, an aralkyl group, or a heterocyclic group, and $R^{18}$ and $R^{10}$ and/or $R^{19}$ and $R^{11}$ and/or $R^{20}$ and $R^{16}$ and/or $R^{21}$ and $R^{17}$ may be linked to each other to form a 5-membered ring or a 6-membered ring.

$R^{22}$, $R^{23}$, and $R^{24}$ represent a hydrogen atom or a monovalent group, n represents an integer of 1 to 3, and m represents 0 or an integer of 1 to 6.

In General Formula (4), the alkyl group represented by $R^{10}$ to $R^{21}$ is an alkyl group having 1 to 20 carbon atoms, more preferably 1 to 12 carbon atoms (for example, methyl, ethyl, propyl, butyl, hexyl, or undecyl). Further, the alkyl group may be substituted with a halogen atom (F, Cl, or Br), an alkoxycarbonyl group (for example, methoxycarbonyl, or ethoxycarbonyl), a hydroxy group, an alkoxy group (for example, methoxy, ethoxy, phenoxy, or isobutoxy) or an acyloxy group (for example, acetyloxy, butyryloxy, hexyryloxy, or benzoyloxy), a sulfo group (which may be a salt), a carboxyl group (which may be a salt), or the like. Examples of the cycloalkyl group represented by $R^{10}$ to $R^{21}$ include cyclopentyl or cyclohexyl.

The aryl group represented by $R^{10}$ to $R^{21}$ is preferably an aryl group having 6 to 12 carbon atoms, and examples thereof include a phenyl group or a naphthyl group. The aryl group may be substituted. Examples of the substituent include an alkyl group having 1 to 8 carbon atoms (for example, methyl, ethyl, or butyl), an alkoxy group having 1 to 6 carbon atoms (for example, methoxy, or ethoxy), an aryloxy group (for example, phenoxy, or p-chlorophenoxy), a halogen atom (F, Cl, or Br), an alkoxycarbonyl group (for example, methoxycarbonyl or ethoxycarbonyl), an amino group (for example, methylamino, acetylamino, or methanesulfonamide), a cyano group, a nitro group, a carboxyl group (which may be a salt), and a sulfo group (which may be a salt).

The aralkyl group represented by $R^{10}$ to $R^{21}$ is preferably an aralkyl group having 7 to 12 carbon atoms (for example, benzyl or phenylethyl), and may have a substituent (for example, methyl, methoxy, or chloro atom).

Examples of the heterocyclic group represented by $R^{10}$ to $R^{21}$ include thienyl, furyl, pyrrolyl, pyrazolyl, pyridyl, and indolyl.

Examples of the monovalent group represented by $R^{22}$ to $R^{24}$ include the substituents described above for the aryl group. $R^{10}$ and $R^{11}$, $R^{12}$ and $R^{13}$, $R^{13}$ and $R^{14}$, $R^{14}$ and $R^{15}$, $R^{16}$ and $R^{17}$, $R^{13}$ and $R^{10}$, $R^{19}$ and $R^{11}$, $R^{20}$ and $R^{16}$, and $R^{21}$ and $R^{17}$ may be bonded to each other to form a cyclopentane or cyclohexane ring. m represents 0 or an integer of 1 to 6. The compound represented by General Formula (4) may be a mixture of two or more compounds in which m is different from each other.

The squarylium coloring agent that can be used as the specific near-infrared absorbing agent is exemplified as a specific example [(G-1) and (G-2)]. The squarylium coloring agent will be further exemplified with the following General Formulae and the substituents thereof [(G-3) to (G-15)]. The squarylium coloring agent as the specific near-infrared absorbing agent in the present disclosure is not limited to the compounds exemplified below.

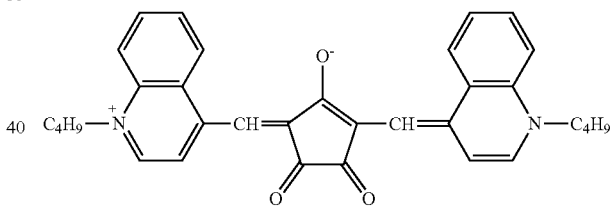

(G-1)

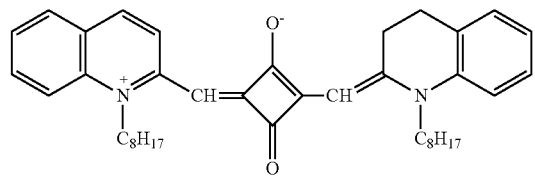

(G-2)

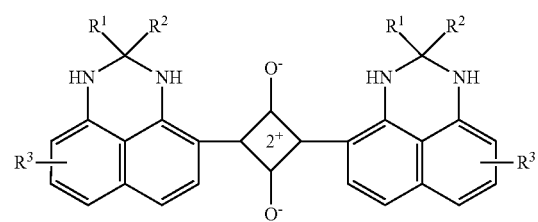

| Compound | R¹ | R² | R³ |
|---|---|---|---|
| G-3 | $CH_3$ | $C_{11}H_{23}$ | H |
| G-4 | $C_2H_5$ | $C_2H_5$ | H |
| G-5 | $C_5H_{11}$ | $C_5H_{11}$ | H |
| G-6 | $C_2H_5$ | $C_{13}H_{27}$ | H |
| G-7 | R¹ and R² are linked to each other | 4-tert-butylcyclohexyl group | H |
| G-8 | $CH_3$ | furyl group | H |
| G-9 | $CH_3$ | $C_6H_5$ | H |
| G-10 | $CH_3$ | N-methylindolyl group | H |
| G-11 | $CH_3$ | thienyl group | H |
| G-12 | $CH_3$ | $C_{11}H_{23}$ | 4-$NHCOCH_3$ |
| G-13 | $CH_2OCOC_5H_{11}$ | $CH_2OCOC_5H_{11}$ | H |

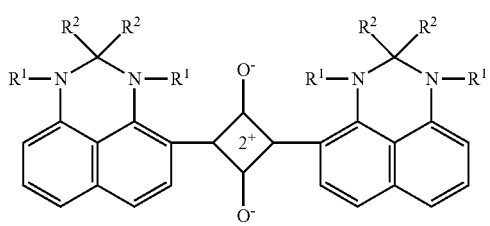

| Compound | R¹ | R² |
|---|---|---|
| G-14 | $CH_3$ | $CH_3$ |
| G-15 | $CH_3$ | Both R² and R² are 4-tert-butylcyclohexyl group |

Among the specific near-infrared absorbing agent, at least one selected from an oxonol coloring agent represented by General Formula (1), a pyrrolopyrrole coloring agent represented by General Formula (2), or a cyanine coloring agent represented by General Formula (3) is preferable from the viewpoint of physical properties such as maximum absorption wavelength and compatibility with the resin, and at least one selected from an oxonol coloring agent or a pyrrolopyrrole coloring agent is more preferable.

More specifically, the pyrrolopyrrole coloring agent is preferably (D-1), (D-28), (D-35), (D-32), or the like among the exemplified compounds, and the cyanine coloring agent is preferably (E-1), (E-13), (E-21), (E-25), or the like among the exemplified compounds, the squarylium coloring agent is preferably (G-1), (G-5), (G-7), or the like, and the oxonol coloring agent is preferably (F-1), (F-53), or the like.

The lens for spectacles of the present disclosure may contain only one kind of the specific near-infrared absorbing agent or may contain two or more kinds thereof.

From the viewpoint of being able to absorb near-infrared light in a wide range, the lens for spectacles of the present disclosure preferably contains at least two specific near-infrared absorbing agents.

The content of the specific near-infrared absorbing agent in the lens for spectacles of the present disclosure is not particularly limited. For example, the content is preferably 0.01 mass % to 1.0 mass %, more preferably 0.01 mass % to 0.5 mass %, and still more preferably 0.01 mass % to 0.1 mass % with respect to the total mass of the resin.

In a case where the content of the specific near-infrared absorbing agent in the lens for spectacles of the present disclosure is in the above range, the compatibility with the resin becomes better, and thus the specific near-infrared absorbing agent is hardly precipitated in the resin, and an increase in haze hardly occurs.

Since the specific near-infrared absorbing agent has a high molar absorption coefficient in the wavelength range of more than 700 nm and 1000 nm or less, even in a case where the content in the lens for spectacles of the present disclosure is within the above range, the near-infrared light in the above wavelength range can be blocked in a satisfactory manner.

The lens for spectacles of the present disclosure containing the specific near-infrared absorbing agent as described above preferably has a transmittance of light of 80% or more and 100% or less in the wavelength range of 400 nm to 700 nm, and more preferably 85% or more and 100% or less.

The higher the transmittance of light in the wavelength range of 400 nm to 700 nm, the smaller the coloring of the lens for spectacles, and the lower the transmittance, the greater the coloring. Therefore, by setting the transmittance of light of the lens for spectacles in the wavelength range of 400 nm to 700 nm in the above range, a change in tint is hardly recognized in a case where an object is viewed through the lens for spectacles.

[Resin for Lens for Spectacles]

The lens for spectacles of the present disclosure contains a resin.

The resin is not particularly limited, as long as it is a resin that satisfies physical properties required for the lens for spectacles such as transparency, refractive index, workability, and hardness after curing. The resin may be a thermoplastic resin (for example, a polycarbonate resin) or a thermosetting resin (for example, a urethane resin and an episulfide resin).

The resin is preferably a urethane resin, and the urethane resin is more preferably a thiourethane resin.

The thiourethane resin and the episulfide resin are widely used as materials for the lens for spectacles having a high refractive index, but have poor compatibility with a near-infrared absorbing agent (for example, a benzotriazole-based near-infrared absorbing agent) used in the lens for spectacles in the related art and are susceptible to precipitation of the near-infrared absorbing agent.

Even in a case where a thiourethane resin and an episulfide resin are contained as resins in the lens for spectacles of the present disclosure, the compatibility between the specific near-infrared absorbing agent and the resin is good, and the precipitation of the near-infrared absorbing agent is suppressed, so that the increase in haze with time is suppressed, and a change in tint is hardly recognized in a case where an object is viewed through the lens.

Therefore, the resin contained in the lens for spectacles of the present disclosure preferably contains at least one selected from a thiourethane resin or an episulfide resin.

For details of the thiourethane resin and the episulfide resin suitable as the resin of the lens for spectacles of the present disclosure, refer to the disclosure of JP2009-256692A, JP2007-238952A, JP2009-074624A, JP2015-212395A, and JP2016-084381A.

As the resin, a commercially available resin can be used.

Examples of commercially available products of the resins include PANLITE (registered trademark) L-1250WP [trade name, aromatic polycarbonate resin powder, Teijin Limited], SP-1516 [trade name, Teijin Limited], EP-5000 [trade name, Mitsubishi Gas Chemical Company Inc.], and EP-4000 [trade name, Mitsubishi Gas Chemical Company Inc.].

The resin may be a resin formed using a precursor monomer of a commercially available resin.

Examples of commercially available products of the precursor monomer of the resin include MR-7 (registered trademark) (refractive index n=1.67), MR-8 (registered trademark) (refractive index n=1.60), MR-10 (registered trademark) (refractive index n=1.67), and MR-174 (registered trademark) (refractive index n=1.74) (above trade names, Mitsui Chemicals, Inc.) which are precursor monomers of the thiourethane resin. Further, examples thereof also include LUMIPLUS LPB-1102 (registered trademark) (refractive index n=1.71) [all trade name, Mitsubishi Chemical Corporation].

The lens for spectacles of the present disclosure may contain only one kind of the resin or may contain two or more kinds thereof.

The content of the resin in the lens for spectacles according to the present disclosure is not particularly limited, for example, and is preferably 20 mass % or more and less than 100 mass %, more preferably 30 mass % or more and less than 100 mass %, and still more preferably 50 mass % or more and less than 100 mass % with respect to the total mass of the lens for spectacles.

In a case where the content of the resin in the lens for spectacles of the present disclosure is in the above range, it is possible to produce a lightweight and thin lens.

[Other Near-Infrared Absorbing Agents]

The lens for spectacles of the present disclosure may contain a compound having a near-infrared absorbing ability (hereinafter, also referred to as "other near-infrared absorbing agent") other than the specific near-infrared absorbing agent described above.

Adding another near-infrared absorbing agent allows the lens for spectacles of the present disclosure to block near-infrared light in a wide range of the near-infrared region.

The other near-infrared absorbing agent is not particularly limited, as long as the near-infrared absorbing agent is a known near-infrared absorbing agent used for the lens for spectacles.

Examples of the other near-infrared absorbing agent include near-infrared absorbing agents such as a benzotriazole-based compound, a triazine-based compound, a benzophenone-based compound, a dibenzoylmethane-based compound, a cinnamic acid-based compound, an acrylate-based compound, a benzoic acid ester-based compound, an oxalic acid diamide-based compound, and a formamidine-based compound, a benzoxazinone-based compound, and a merocyanine-based compound.

For details of these near-infrared absorbing agents, refer to "Monthly Fine Chemicals" May 2004, pages 28 to 38, "New Development of Functional Additives for Polymers" published by Toray Research Center Research Division, (Toray Research Center, 1999) pages 96 to 140, "Development of Polymer Additives And Environmental Measures" edited by Okachi Junichi, (CMC Publishing Co., Ltd., 2003) pages 54 to 64, and "Polymer Deterioration/Discoloring Mechanism and Stabilization Technology Thereof—Know-How Collection" (Technical Information Institute Co., Ltd., 2006) published by Technical Information Institute Co., Ltd., for example.

Specific examples of the benzoxazinone-based compound include compounds described in JP5591453B and JP5250289B.

Since the specific near-infrared absorbing agent described above does not absorb light having a wavelength of 350 nm or less, the other near-infrared absorbing agent is preferably a near-infrared absorbing agent having a maximum absorption wavelength of 350 nm or less, for example, from the viewpoint of blocking near-infrared light in a wide range of the near-infrared region.

In the case of containing the other near-infrared absorbing agent, the lens for spectacles of the present disclosure may contain only one kind of the other near-infrared absorbing agent or may contain two or more kinds thereof.

In a case where the lens for spectacles of the present disclosure contains the other near-infrared absorbing agent, the content of the other near-infrared absorbing agent in the lens for spectacles is appropriately set according to the kind of the near-infrared absorbing agent selected.

Generally, the content of the other near-infrared absorbing agent in the lens for spectacles of the present disclosure is preferably 0.01 mass % to 1.0 mass % with respect to the total mass of the resin for one kind of the other near-infrared absorbing agent.

The total content of the other near-infrared absorbing agent in the present disclosure is not particularly limited, and, for example, is preferably 0.01 mass % to 10 mass %, more preferably 0.05 mass % to 5 mass %, and still more preferably 0.1 mass % to 1 mass % with respect to the total mass of the resin.

In a case where the total content of the other near-infrared absorbing agent in the lens for spectacles of the present disclosure is in the above range, the occurrence of haze and the yellowish tint are suppressed and the near-infrared light in a wide range of the near-infrared region can be blocked in a satisfactory manner.

[Ultraviolet Absorbing Agent]

The lens for spectacles of the present disclosure preferably contains at least one ultraviolet absorbing agent in order to reduce the influence of ultraviolet rays contained in sunlight, fluorescent lamps, and the like on the eyes.

There is no particular limitation on the ultraviolet absorbing agent that can be used for the lens for spectacles, and any ultraviolet absorbing agent having a maximum absorption in the wavelength range of 400 nm or less can be used according to the purpose. From the viewpoint of being suitable for lens for spectacles, an ultraviolet absorbing agent having a high transmittance of light in the visible light region is preferable.

Examples of the ultraviolet absorbing agent include a merocyanine-based compound, a benzoxazinone-based compound, a benzotyran-based compound, and a benzotriazole-based compound, of which at least one selected from the merocyanine-based compound or the benzothirane-based compound is preferable from the viewpoint of absorbing ultraviolet rays on the longer wavelength side, having a small yellowish tint, having high compatibility with a lens for spectacles, and having low precipitation with time.

The lens for spectacles of the present disclosure may include only one kind of the ultraviolet absorbing agent, or may include two or more kinds thereof.

In a case where the lens for spectacles of the present disclosure contains an ultraviolet absorbing agent, the content of the ultraviolet absorbing agent is not particularly limited and can be selected according to the purpose.

Generally, the ultraviolet absorbing agent can be used, for example, in the range of 0.01 parts by mass to 10 parts by mass, preferably 0.05 parts by mass to 5 parts by mass, and more preferably 0.1 parts by mass to 2 parts by mass with respect to 100 parts by mass of the resin contained in the lens for spectacles.

[Other Components]

The lens for spectacles of the present disclosure may contain a component other than the component described above (so-called, other additives).

Examples of the other additive include a plasticizer, an antidegradant (for example, an antioxidant, a peroxide decomposer, a radical inhibitor, a metal deactivator, an acid scavenger, and amine), a dye, an internal release agent, and a deodorant.

[Method of Manufacturing Lens for Spectacles]

A method of manufacturing the lens for spectacles of the present disclosure is not particularly limited, as long as the lens for spectacles of the present disclosure described above can be manufactured.

For example, in a case where the resin contained in the lens for spectacles is a thermoplastic resin, the lens for spectacles of the present disclosure can be manufactured by molding a resin composition containing the resin, a specific near-infrared absorbing agent, and as necessary, another near-infrared absorbing agent and another additive as optional components into pellets using a melt extruder, and applying a known molding method such as an injection molding method using the obtained pellet-shaped resin composition.

For example, in a case where the resin contained in the lens for spectacles is a thermosetting resin, the lens for spectacles of the present disclosure can be manufactured by preparing a resin composition containing a monomer as a precursor of the resin, a specific near-infrared absorbing agent, a polymerization catalyst (for example, dibutyltin dichloride), and as necessary, another near-infrared absorbing agent and another additive as optional components, filling the obtained resin composition into a mold, and curing the resin composition by heating.

[Spectacles]

The spectacles of the present disclosure include the lens for spectacles of the present disclosure described above.

In other words, the spectacles of the present disclosure have a configuration in which the lens for spectacles of the present disclosure is mounted on an appropriate spectacle frame described above.

According to the spectacles of the present disclosure, it is possible to block near-infrared light in the wavelength range of at least more than 700 nm and 1000 nm or less, and thus reduction of eye fatigue in a case where an operation of viewing a display of an image display device is performed for a long period of time can be expected.

Further, according to the spectacles of the present disclosure, a change in tint is hardly recognized in a case where an object is viewed through the lens.

EXAMPLES

Hereinafter, the present invention will be described more specifically with reference to Examples, but the present invention is not limited to the following Examples without departing from the gist thereof.

The maximum absorption wavelength and the half-width measured by incorporating the specific near-infrared absorbing agent and the comparative near-infrared absorbing agent used in the following Examples and Comparative Examples into a thiourethane resin (resin derived from MR-7) are shown below.

First, a sample for measurement is produced.

As the thiourethane resin, a thiourethane resin obtained by polymerizing MR-7 (registered trademark) (refractive index n=1.67) [trade name, Mitsui Chemicals, Inc.] which is a precursor monomer of the thiourethane resin was used.

As the sample for measurement, 100 parts by mass of a thiourethane resin precursor monomer was mixed with 0.05 parts by mass of a near-infrared absorbing agent and 0.01 parts by mass of dibutyltin dichloride as a polymerization catalyst to obtain a resin composition. The obtained resin composition was filled into a mold and then was heated at 130° C. for 2 hours, and cured to produce a sample for resin evaluation having a thickness of 2 mm, a width of 100 mm, and a length of 50 mm. The thickness direction of the obtained sample was used as an optical path for measuring the absorbance.

Using an ultraviolet-visible-near-infrared spectrophotometer (Model number: UV 3150) of Shimadzu Corporation as the measuring instrument, the measurement was carried out at room temperature (25° C.), and the absorbance was measured to obtain an absorption spectrum, referring to air as a control.

By measuring the absorbance of a wavelength in a predetermined wavelength range, the maximum absorption wavelength, the transmittance, and the like can be calculated.

[Physical Properties of Near-Infrared Absorbing Agent]
(Maximum Absorption Wavelength in the Near-Infrared Region)

Using the obtained sample, the absorbance in the range of 700 nm to 1000 nm was measured to determine the maximum absorption wavelength. Using an ultraviolet-visible-near-infrared spectrophotometer (Model number: UV 3150) of Shimadzu Corporation as the measuring instrument, the measurement was carried out at room temperature (25° C.), and the absorbance was measured, referring to air as a control. As a result, the wavelength with the highest absorbance was taken as the maximum absorption wavelength.

(Transmittance of Light of Wavelength 400 nm and Wavelength 700 nm)

Using the obtained sample, the absorbance at wavelengths of 400 nm and 700 nm was measured, and the transmittance of light at the wavelength was determined from the absorbance. The measuring instrument was the same as that used for measuring the maximum absorption wavelength, and the measurement was carried out under the same conditions.

(Half-Width in Near-Infrared Region)

Using the obtained sample, the absorbance in the wavelength range of 700 nm to 1000 nm was measured to determine the half-width of the maximum absorption band. The measuring instrument was the same as that used for measuring the maximum absorption wavelength.

The smaller the measured value of the half-width, the more efficiently the near-infrared light of a specific wavelength can be blocked. Results thereof are as shown in Table 1.

(X Value and y Value of Lxy Coordinates)

Using the obtained sample, the x-value and y-value of the Lxy coordinates were determined with a spectrophotometer, X-rite eXact (manufactured by X-Rite, Incorporated.). Results thereof are as shown in Table 1.

(Ratio of Absorbance at Wavelength Shorter than Maximum Absorption Wavelength by 100 nm to Absorbance at Maximum Absorption Wavelength)

Using the obtained sample, the ratio of the absorbance at a wavelength shorter than the maximum absorption wavelength by 100 nm ($A^{max-100}$) to the absorbance at the maximum absorption wavelength ($A^{max}$) (D calculated by the following equation) was determined. Measurement results thereof are as shown in Table 1.

$$D = [(\text{absorbance at wavelength shorter than maximum absorption wavelength by 100 nm})/(\text{absorbance at maximum absorption wavelength})] = [(A^{max-100})/(A^{max})]$$ [Equation]

TABLE 1

| | | | | | | | | | |
|---|---|---|---|---|---|---|---|---|---|
| | | | | Physical properties of near-infrared absorbing agent in thiourethane resin | | | | | |
| Near-infrared absorbing agent compound | | Maximum absorption wavelength | Transmittance % at the maximum absorption wavelength | Transmittance at 400 nm | Transmittance at 700 nm | Half-width | Lxy coordinates X value | Lxy coordinates Y value | D |
| Specific near-infrared absorbing agent | D-1 | 882 nm | 0.05 | 96% | 88% | 35 nm | 0.304 | 0.312 | 0.084 |
| Specific near-infrared absorbing agent | D-28 | 863 nm | 0.06 | 92% | 86% | 32 nm | 0.303 | 0.312 | 0.078 |
| Specific near-infrared absorbing agent | D-35 | 743 nm | 0.05 | 94% | 75% | 30 nm | 0.303 | 0.312 | 0.062 |
| Specific near-infrared absorbing agent | E-1 | 746 nm | 0.06 | 85% | 20% | 55 nm | 0.296 | 0.315 | 0.13 |
| Specific near-infrared absorbing agent | E-13 | 829 nm | 0.05 | 90% | 42% | 50 nm | 0.29 | 0.313 | 0.152 |
| Specific near-infrared absorbing agent | E-21 | 814 nm | 0.05 | 89% | 64% | 58 nm | 0.295 | 0.314 | 0.149 |
| Specific near-infrared absorbing agent | G-13 | 794 nm | 0.07 | 89% | 65% | 46 nm | 0.29 | 0.315 | 0.087 |
| Specific near-infrared absorbing agent | F-53 | 780 nm | 0.07 | 90% | 72% | 48 nm | 0.301 | 0.314 | 0.031 |
| Comparative near-infrared absorbing agent | H-1 | 842 nm | 0.15 | 41% | 52% | 160 nm | 0.275 | 0.41 | 0.231 |
| Comparative near-infrared absorbing agent | H-2 | 1080 nm | 0.07 | 32% | 24% | 254 nm | 0.262 | 0.468 | 0.854 |

From the results shown in Table 1, it can be seen that each of the specific near-infrared absorbing agents used for the lens for spectacles of the present disclosure has a maximum absorption wavelength in the range of more than 700 nm and 1000 nm or less, and has a low transmittance of the maximum absorption wavelength, and therefore has excellent blocking property of the target near-infrared rays. Further, the transmittance of light having wavelengths of 400 nm and 100 nm was high, and the half-width was narrow, so that the transmittance of light in the visible light region was good.

Furthermore, the measurement results of the x value and the y value of the Lxy coordinates of the specific near-infrared absorbing agent indicate that the tint is neutral, and it can be expected that in the case of being applied to the lens for spectacles, the discomfort regarding the tint of the observation object at the time of wearing becomes less.

From Table 1, it can be seen that the specific near-infrared absorbing agent has a small ratio D of the absorbance at a wavelength shorter than the maximum absorption wavelength by 100 nm to the absorbance at the maximum absorption wavelength, efficiently blocks near-infrared light at the specific wavelength, and at the same time, has a high transmittance of light in the visible region shorter than the maximum absorption wavelength.

[Production of Lens for Spectacles]

Example 1

100 parts by mass of MR-8 (registered trademark) [trade name, refractive index: 1.60, Mitsui Chemicals, Inc.] as a precursor monomer of a thiourethane resin, 0.05 parts by mass of the specific near-infrared absorbing agent D-1 described above, and 0.01 parts by mass of dibutyltin dichloride as a polymerization catalyst were mixed so as to obtain a resin composition. The obtained resin composition was filled into a mold and then was heated at 130° C. for two hours to be cured, such that a lens for spectacles having a thickness of 2 mm was produced. Visual observation confirmed that the produced lens for spectacles was transparent.

FIG. 1 is a graph showing the absorption spectrum of the pyrrolopyrrole coloring agent (D-1), which is the specific near-infrared absorbing agent used in Example 1, obtained by the device described above. As shown in FIG. 1, it can be seen that the specific near-infrared absorbing agent (D-1) shows a steep maximum absorption peak near the wavelength of 900 nm and has a narrow half-width.

Example 2

100 parts by mass of MR-7 (registered trademark) [trade name, refractive index: 1.67, Mitsui Chemicals, Inc.] as a precursor monomer of a thiourethane resin, 0.05 parts by mass of the specific near-infrared absorbing agent D-1 described above, and 0.01 parts by mass of dibutyltin dichloride as a polymerization catalyst were mixed so as to obtain a resin composition. The obtained resin composition was filled into a mold and then was heated at 130° C. for two hours to be cured, such that a lens for spectacles having a thickness of 2 mm was produced. Visual observation confirmed that the produced lens for spectacles was transparent.

Example 3

100 parts by mass of MR-7 (registered trademark) [trade name, refractive index: 1.67, Mitsui Chemicals, Inc.] as a precursor monomer of a thiourethane resin, 0.05 parts by mass of the specific near-infrared absorbing agent D-28 described above, and 0.01 parts by mass of dibutyltin dichloride as a polymerization catalyst were mixed so as to obtain a resin composition. The obtained resin composition was filled into a mold and then was heated at 130° C. for two hours to be cured, such that a lens for spectacles having a thickness of 2 mm was produced. Visual observation confirmed that the produced lens for spectacles was transparent.

Example 4

100 parts by mass of MR-7 (registered trademark) [trade name, refractive index: 1.67, Mitsui Chemicals, Inc.] as a precursor monomer of a thiourethane resin, 0.05 parts by mass of the specific near-infrared absorbing agent D-35 described above, and 0.01 parts by mass of dibutyltin dichloride as a polymerization catalyst were mixed so as to obtain a resin composition. The obtained resin composition was filled into a mold and then was heated at 130° C. for two hours to be cured, such that a lens for spectacles having a thickness of 2 mm was produced. Visual observation confirmed that the produced lens for spectacles was transparent.

Example 5

100 parts by mass of PANLITE (registered trademark) L-1250WP [trade name, an aromatic polycarbonate resin powder manufactured by an interfacial condensation polymerization method from bisphenol and phosgene, viscosity average molecular weight: 24,000, Teijin Limited] as a polycarbonate resin, 0.1 parts by mass of the specific near-infrared absorbing agent D-35 described above, and 0.01 parts by mass of dibutyltin dichloride as a polymerization catalyst were mixed using a blender to obtain a resin composition. The obtained resin composition was melt-kneaded with a vented biaxial extruder so as to obtain pellets.

TEX30α (specification: perfect meshing, same direction rotation, double thread screw) of The Japan Steel Works, Ltd. was used as the vented biaxial extruder. There was one kneading zone in front of the vent port [upstream side]. With respect to the extrusion conditions, the jetting amount was set to 30 kg/hr, the screw rotation speed was set to 150 rpm (round per minute), the vent vacuum was set to 3 kPa, and the extrusion temperature from a first supply port to a die portion was set to 280° C. The obtained pellets were dried at 120° C. for five hours by using a hot air circulating dryer, and then an injection molding machine (injection conditions: cylinder temperature 340° C., die temperature 80° C.) was used to produce a lens for spectacles having a thickness of 2 mm. Visual observation confirmed that the produced lens for spectacles was transparent.

Example 6

100 parts by mass of bis-β-epithiopropyl disulfide and 10 parts by mass of 4,8-dimercaptomethyl-1,11-dimercapto-3,6,9-trithiaundecane as precursors of an episulfide resin, 0.05 parts by mass of the specific near-infrared absorbing agent D-35 described above, and 0.01 parts by mass of N,N-dimethylcyclohexylamine as a polymerization catalyst were mixed using a blender, and the obtained mixture was filled into a mold, was left at 30° C. for eight hours, and then was cured at 100° C. for 10 hours, such that a lens for spectacles having a thickness of 2 mm was produced. Visual observation confirmed that the produced lens for spectacles was transparent.

Example 7

100 parts by mass of MR-7 (registered trademark) [trade name, refractive index: 1.67, Mitsui Chemicals, Inc.] as a precursor monomer of a thiourethane resin, 0.05 parts by mass of the specific near-infrared absorbing agent D-35 described above, 0.1 parts by mass of the following ultraviolet absorbing agent UV-1 (merocyanine-based compound), and 0.01 parts by mass of dibutyltin dichloride as a polymerization catalyst were mixed so as to obtain a resin composition. The obtained resin composition was filled into a mold and then was heated at 130° C. for two hours to be cured, such that a lens for spectacles having a thickness of 2 mm was produced. Visual observation confirmed that the produced lens for spectacles was transparent.

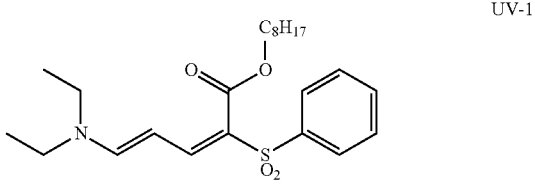

Example 8

100 parts by mass of MR-7 (registered trademark) [trade name, refractive index: 1.67, Mitsui Chemicals, Inc.] as a precursor monomer of a thiourethane resin, 0.05 parts by mass of the specific near-infrared absorbing agent D-35 described above, 0.1 parts by mass of the following ultraviolet absorbing agent UV-2 (benzoxazinone-based compound), and 0.01 parts by mass of dibutyltin dichloride as a polymerization catalyst were mixed so as to obtain a resin composition. The obtained resin composition was filled into a mold and then was heated at 130° C. for two hours to be cured, such that a lens for spectacles having a thickness of 2 mm was produced. Visual observation confirmed that the produced lens for spectacles was transparent.

In the structure of "UV-2" below, "Me" represents a methyl group.

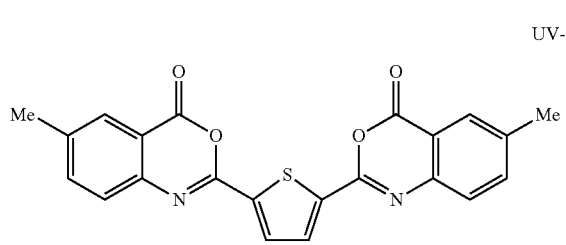

UV-2

Example 9

100 parts by mass of MR-7 (registered trademark) [trade name, refractive index: 1.67, Mitsui Chemicals, Inc.] as a precursor monomer of a thiourethane resin, 0.05 parts by mass of the specific near-infrared absorbing agent D-35 described above, 0.1 parts by mass of the following ultraviolet absorbing agent UV-3 (benzodityran-based compound), and 0.01 parts by mass of dibutyltin dichloride as a polymerization catalyst were mixed so as to obtain a resin composition. The obtained resin composition was filled into a mold (that is, a molding die) and then was heated at 130° C. for two hours to be cured, such that a lens for spectacles having a thickness of 2 mm was produced. Visual observation confirmed that the produced lens for spectacles was transparent.

In the structure of "UV-3" below, "t-Bu" represents a tert-butyl group.

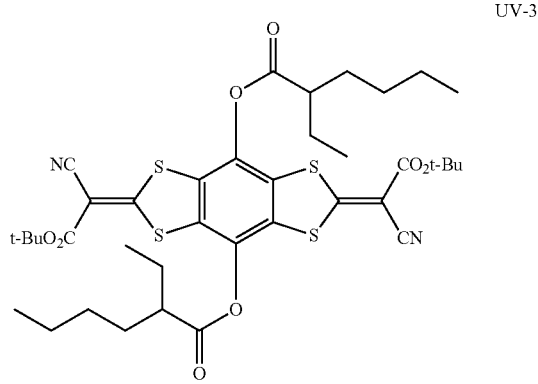

UV-3

Example 10

100 parts by mass of MR-7 (registered trademark) [trade name, refractive index: 1.67, Mitsui Chemicals, Inc.] as a precursor monomer of a thiourethane resin, 0.05 parts by mass of the specific near-infrared absorbing agent D-35 described above, 0.1 parts by mass of the following ultraviolet absorbing agent UV-4 (benzotriazole-based compound), and 0.01 parts by mass of dibutyltin dichloride as a polymerization catalyst were mixed so as to obtain a resin composition. The obtained resin composition was filled into a mold and then was heated at 130° C. for two hours to be cured, such that a lens for spectacles having a thickness of 2 mm was produced. Visual observation confirmed that the produced lens for spectacles was transparent.

In the structure of "UV-4 below", "t-Bu" represents a tert-butyl group.

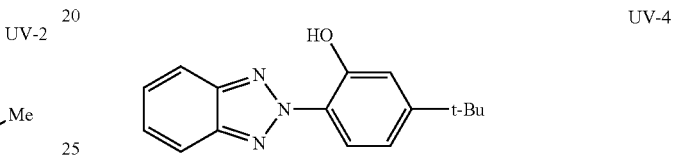

UV-4

Example 11

100 parts by mass of MR-8 (registered trademark) [trade name, refractive index: 1.60, Mitsui Chemicals, Inc.] as a precursor monomer of a thiourethane resin, 0.05 parts by mass of the specific near-infrared absorbing agent E-1 described above, and 0.01 parts by mass of dibutyltin dichloride as a polymerization catalyst were mixed so as to obtain a resin composition. The obtained resin composition was filled into a mold and then was heated at 130° C. for two hours to be cured, such that a lens for spectacles having a thickness of 2 mm was produced. Visual observation confirmed that the produced lens for spectacles was transparent.

Figure 2:
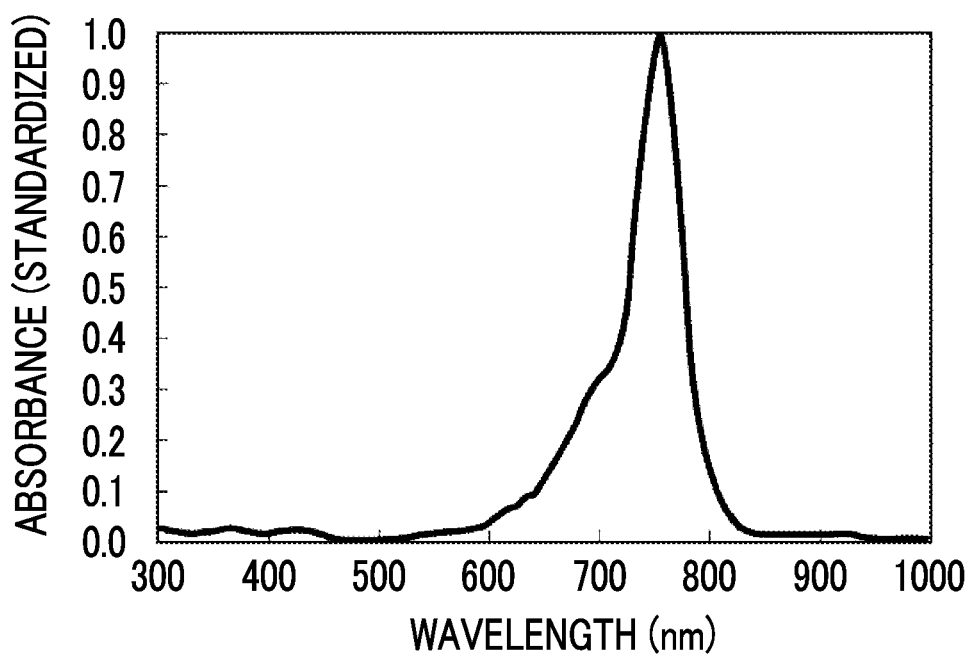
FIG. 2 is a graph showing an absorbance of a cyanine coloring agent (E-1), which is an example of a near-infrared absorbing coloring agent of the present disclosure, at wavelengths of 300 nm to 1000 nm.

FIG. 2 is a graph showing the absorption spectrum of the cyanine coloring agent (E-1), which is the specific near-infrared absorbing agent used in Example 11, obtained by the device described above. As shown in FIG. 2, it can be seen that the specific near-infrared absorbing agent (E-1) shows a steep maximum absorption peak near the wavelength of 700 nm to 800 nm and has a narrow half-width.

Example 12

100 parts by mass of MR-7 (registered trademark) [trade name, refractive index: 1.67, Mitsui Chemicals, Inc.] as a precursor monomer of a thiourethane resin, 0.05 parts by mass of the specific near-infrared absorbing agent E-13 described above, and 0.01 parts by mass of dibutyltin dichloride as a polymerization catalyst were mixed so as to obtain a resin composition. The obtained resin composition was filled into a mold and then was heated at 130° C. for two hours to be cured, such that a lens for spectacles having a thickness of 2 mm was produced. Visual observation confirmed that the produced lens for spectacles was transparent.

Example 13

100 parts by mass of MR-7 (registered trademark) [trade name, refractive index: 1.67, Mitsui Chemicals, Inc.] as a precursor monomer of a thiourethane resin, 0.05 parts by mass of the specific near-infrared absorbing agent E-13 described above, 0.1 parts by mass of the ultraviolet absorbing agent UV-1, and 0.01 parts by mass of dibutyltin dichloride as a polymerization catalyst were mixed so as to obtain a resin composition. The obtained resin composition was filled into a mold and then was heated at 130° C. for two hours to be cured, such that a lens for spectacles having a thickness of 2 mm was produced. Visual observation confirmed that the produced lens for spectacles was transparent.

Example 14

100 parts by mass of MR-7 (registered trademark) [trade name, refractive index: 1.67, Mitsui Chemicals, Inc.] as a precursor monomer of a thiourethane resin, 0.05 parts by mass of the specific near-infrared absorbing agent E-21 described above, and 0.01 parts by mass of dibutyltin dichloride as a polymerization catalyst were mixed so as to obtain a resin composition. The obtained resin composition was filled into a mold and then was heated at 130° C. for two hours to be cured, such that a lens for spectacles having a thickness of 2 mm was produced. Visual observation confirmed that the produced lens for spectacles was transparent.

Example 15

100 parts by mass of MR-7 (registered trademark) [trade name, refractive index: 1.67, Mitsui Chemicals, Inc.] as a precursor monomer of a thiourethane resin, 0.05 parts by mass of the specific near-infrared absorbing agent G-13 described above, and 0.01 parts by mass of dibutyltin dichloride as a polymerization catalyst were mixed so as to obtain a resin composition. The obtained resin composition was filled into a mold and then was heated at 130° C. for two hours to be cured, such that a lens for spectacles having a thickness of 2 mm was produced. Visual observation confirmed that the produced lens for spectacles was transparent.

Figure 3:
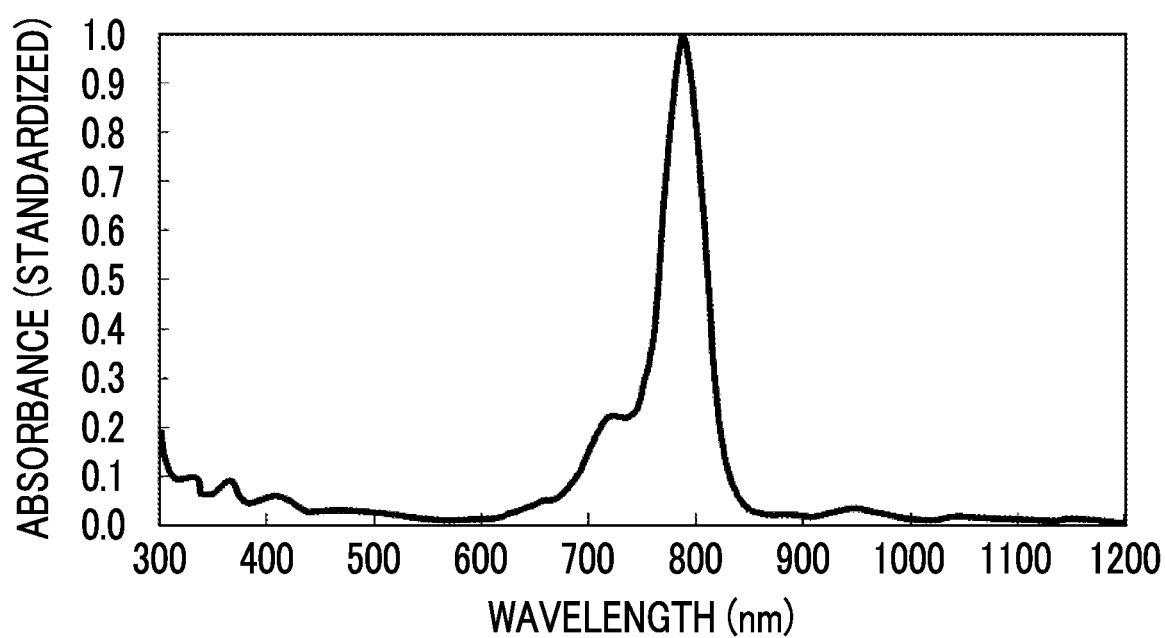
FIG. 3 is a graph showing an absorbance of a squarylium coloring agent (G-13), which is an example of a near-infrared absorbing coloring agent of the present disclosure, at wavelengths of 300 nm to 1000 nm.

FIG. 3 is a graph showing the absorption spectrum of the squarylium coloring agent (G-13), which is the specific near-infrared absorbing agent used in Example 15, obtained by the device described above. As shown in FIG. 3, it can be seen that the specific near-infrared absorbing agent (G-13) shows a steep maximum absorption peak near the wavelength of 700 nm to 800 nm and has a narrow half-width.

Example 16

100 parts by mass of MR-7 (registered trademark) [trade name, refractive index: 1.67, Mitsui Chemicals, Inc.] as a precursor monomer of a thiourethane resin, 0.05 parts by mass of the specific near-infrared absorbing agent G-13 described above, 0.1 parts by mass of the ultraviolet absorbing agent UV-1, and 0.01 parts by mass of dibutyltin dichloride as a polymerization catalyst were mixed so as to obtain a resin composition. The obtained resin composition was filled into a mold and then was heated at 130° C. for two hours to be cured, such that a lens for spectacles having a thickness of 2 mm was produced. Visual observation confirmed that the produced lens for spectacles was transparent.

Example 17

100 parts by mass of MR-7 (registered trademark) [trade name, refractive index: 1.67, Mitsui Chemicals, Inc.] as a precursor monomer of a thiourethane resin, 0.05 parts by mass of the specific near-infrared absorbing agent F-53 described above, and 0.01 parts by mass of dibutyltin dichloride as a polymerization catalyst were mixed so as to obtain a resin composition. The obtained resin composition was filled into a mold and then was heated at 130° C. for two hours to be cured, such that a lens for spectacles having a thickness of 2 mm was produced. Visual observation confirmed that the produced lens for spectacles was transparent.

Example 18

100 parts by mass of MR-8 (registered trademark) [trade name, refractive index: 1.67, Mitsui Chemicals, Inc.] as a precursor monomer of a thiourethane resin, 0.05 parts by mass of the specific near-infrared absorbing agent F-53 described above, and 0.01 parts by mass of dibutyltin dichloride as a polymerization catalyst were mixed so as to obtain a resin composition. The obtained resin composition was filled into a mold and then was heated at 130° C. for two hours to be cured, such that a lens for spectacles having a thickness of 2 mm was produced. Visual observation confirmed that the produced lens for spectacles was transparent.

Example 19

100 parts by mass of MR-7 (registered trademark) [trade name, refractive index: 1.67, Mitsui Chemicals, Inc.] as a precursor monomer of a thiourethane resin, 0.05 parts by mass of the specific near-infrared absorbing agent F-53 described above, 0.1 parts by mass of the ultraviolet absorbing agent UV-1, and 0.01 parts by mass of dibutyltin dichloride as a polymerization catalyst were mixed so as to obtain a resin composition. The obtained resin composition was filled into a mold and then was heated at 130° C. for two hours to be cured, such that a lens for spectacles having a thickness of 2 mm was produced. Visual observation confirmed that the produced lens for spectacles was transparent.

Figure 4:
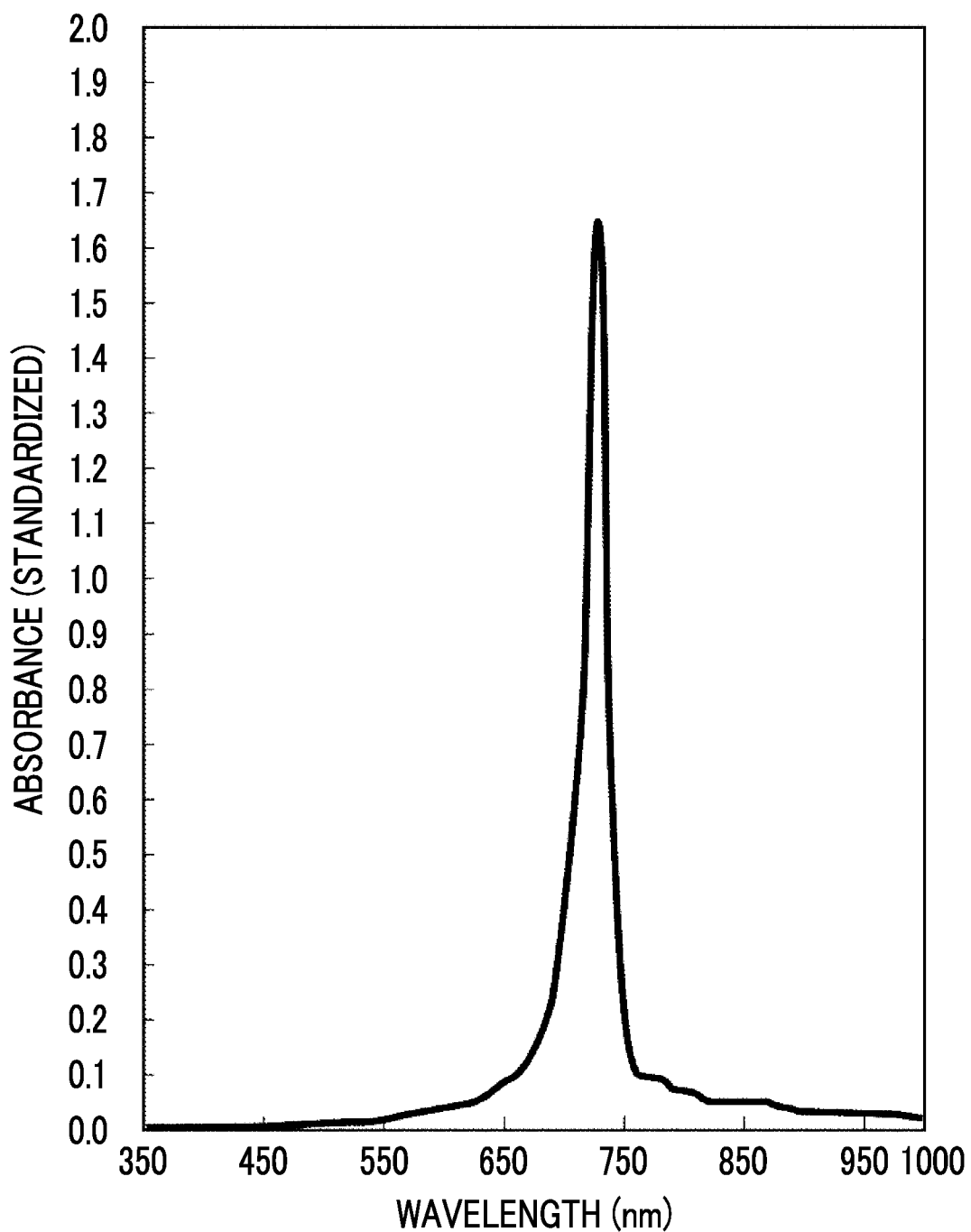
FIG. 4 is a graph showing an absorbance of an oxonol coloring agent (F-53), which is an example of a near-infrared absorbing coloring agent of the present disclosure, at wavelengths of 300 nm to 1000 nm.

FIG. 4 is a graph showing the absorption spectrum of the oxonol coloring agent (F-53), which is the specific near-infrared absorbing agent used in Example 19, obtained by the device described above. As shown in FIG. 4, it can be seen that the specific near-infrared absorbing agent (F-53) shows a steep maximum absorption peak near the wavelength of 650 nm to 750 nm and has a narrow half-width.

Example 20

100 parts by mass of MR-7 (registered trademark) [trade name, refractive index: 1.67, Mitsui Chemicals, Inc.] as a precursor monomer of a thiourethane resin, 0.05 parts by mass of the specific near-infrared absorbing agent D-1 described above, 0.05 parts by mass of the specific near-infrared absorbing agent D-35 described above, and 0.01 parts by mass of dibutyltin dichloride as a polymerization catalyst were mixed so as to obtain a resin composition. The obtained resin composition was filled into a mold and then was heated at 130° C. for two hours to be cured, such that a lens for spectacles having a thickness of 2 mm was produced. Visual observation confirmed that the produced lens for spectacles was transparent.

Comparative Example 1

100 parts by mass of MR-7 (registered trademark) [trade name, refractive index: 1.67, Mitsui Chemicals, Inc.] as a precursor monomer of a thiourethane resin, 0.05 parts by mass of the comparative near-infrared absorbing agent H-1, and 0.01 parts by mass of dibutyltin dichloride as a polymerization catalyst were mixed so as to obtain a resin composition. The obtained resin composition was filled into a mold and then was heated at 130° C. for two hours to be cured, such that a lens for spectacles having a thickness of 2 mm was produced. Visual observation confirmed that the produced lens for spectacles was transparent.

The comparative near-infrared absorbing agent H-1 is a phthalocyanine-based near-infrared absorbing agent.

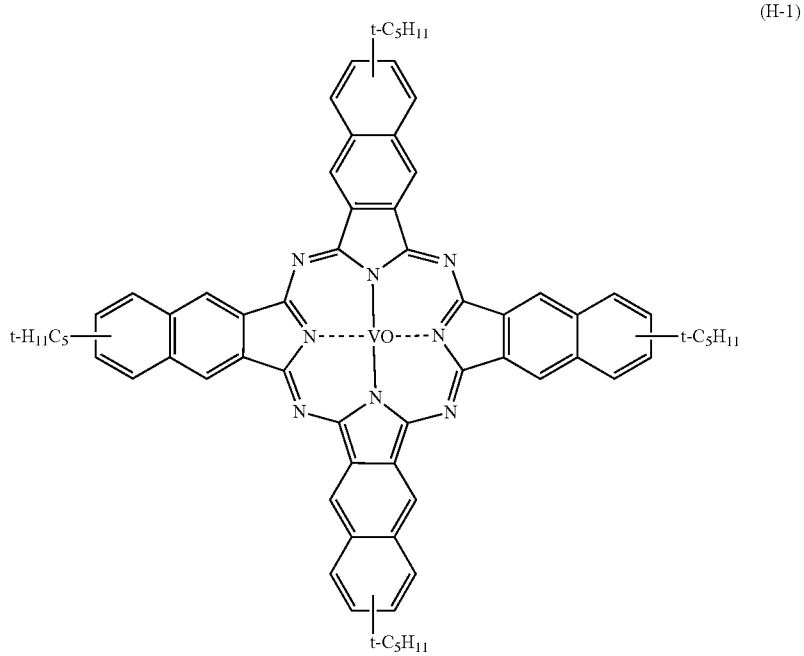

(H-1)

Figure 5:
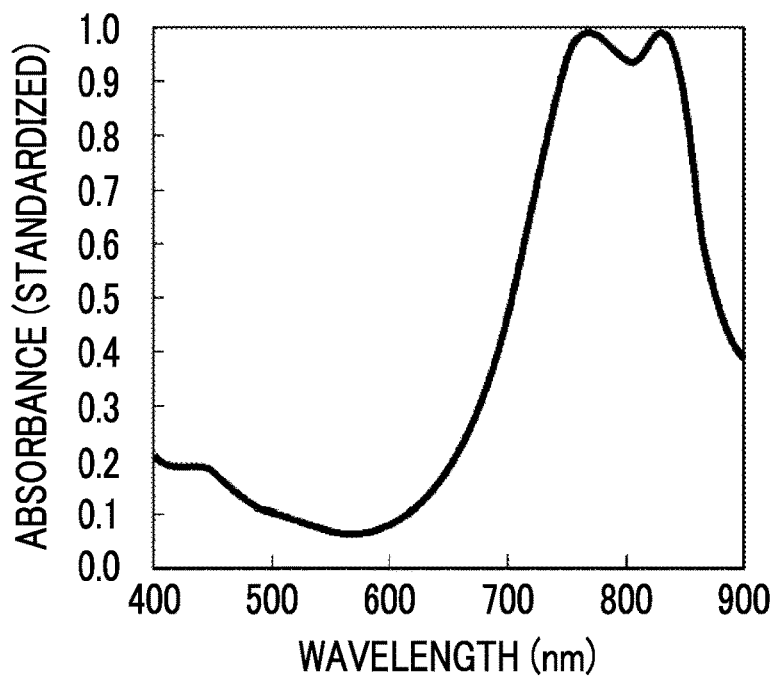
FIG. 5 is a graph showing an absorbance of a phthalocyanine coloring agent (H-1), which is an example of a comparative near-infrared absorbing coloring agent, at wavelengths of 300 nm to 1000 nm.

FIG. 5 is a graph showing the absorption spectrum of the phthalocyanine coloring agent (H-1), which is the comparative near-infrared absorbing agent used in Comparative Example 1, obtained by the device described above. As shown in FIG. 5, it can be seen that the comparative near-infrared absorbing agent (H-1) shows a maximum absorption peak in the wavelength of 700 nm to 900 nm, but has a plurality of peaks and a wide half-width. From this, it is presumed that the comparative near-infrared absorbing agent (H-1) has a plurality of vibration modes.

Comparative Example 2

100 parts by mass of MR-7 (registered trademark) [trade name, refractive index: 1.67, Mitsui Chemicals, Inc.] as a precursor monomer of a thiourethane resin, 0.05 parts by mass of the comparative near-infrared absorbing agent H-2, and 0.01 parts by mass of dibutyltin dichloride as a polymerization catalyst were mixed so as to obtain a resin composition. The obtained resin composition was filled into a mold and then was heated at 130° C. for two hours to be cured, such that a lens for spectacles having a thickness of 2 mm was produced. Visual observation confirmed that the produced lens for spectacles was transparent.

The comparative near-infrared absorbing agent H-2 is a diimmonium-based near-infrared absorbing agent.

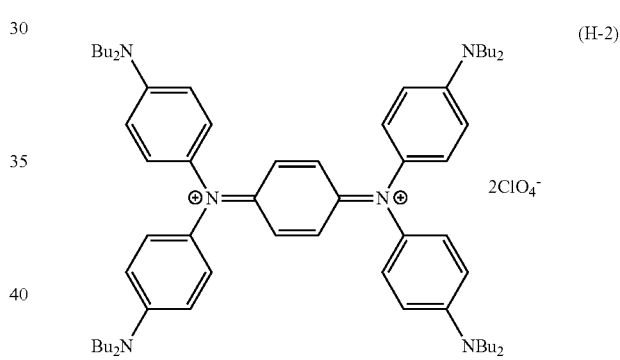

(H-2)

Figure 6:
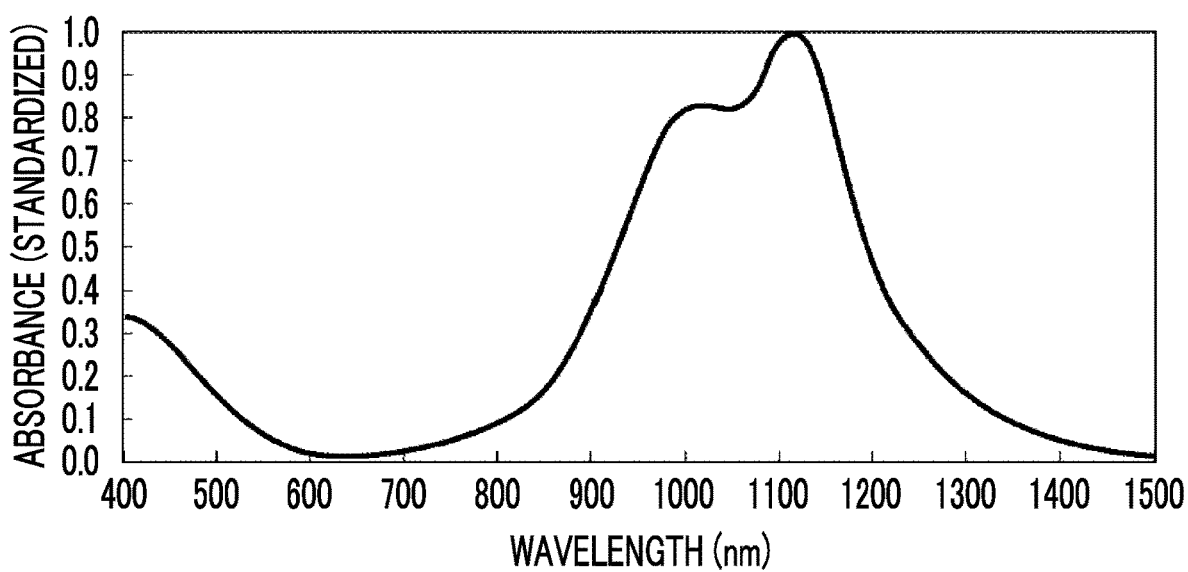
FIG. 6 is a graph showing an absorbance of a diimmonium coloring agent (H-2), which is an example of a comparative near-infrared absorbing coloring agent, at wavelengths of 300 nm to 1000 nm.

FIG. 6 is a graph showing the absorption spectrum of the diimmonium coloring agent (H-2), which is the comparative near-infrared absorbing agent used in Comparative Example 2, obtained by the apparatus described above. As shown in FIG. 6, it can be seen that the comparative near-infrared absorbing agent (H-2) shows a maximum absorption peak on a slightly longer wavelength side than the wavelength of 1000 nm to 1200 nm, and has a plurality of peaks and a wide half-width. From this, it is presumed that the comparative near-infrared absorbing agent (H-2) has a low near-infrared light blocking property and has a plurality of vibration modes.

[Production of Spectacles]

Each of the lenses for spectacles of Examples 1 to 20 and Comparative Examples 1 and 2 was mounted on a spectacle frame so as to produce spectacles.

[Evaluation]

1. Presence or Absence of Change in Tint of the Object

Two evaluation monitors were asked to wear the produced spectacles, and an image displayed on the display of the image display device was viewed. Then, in a case where an image was viewed through the lens for spectacles, whether or not a change in tint was recognized before and after wearing the spectacles was evaluated.

As a result, both of the two evaluation monitors wearing the spectacles including the lenses for spectacles of Examples 1 to 20 evaluated that almost no change in tint was recognized ("none"). It is considered that this is because there is no yellowish coloring in the lens for spectacles.

On the other hand, both of the two evaluation monitors wearing the spectacles including the lenses for spectacles of Comparative Examples 1 and 2 evaluated that a change in tint was recognized ("yes").

2. Transmittance in the Near-Infrared Region

The transmittance of the lens for spectacles produced in Examples 1 to 20 and Comparative Examples 1 and 2 in the range of more than 700 nm and 1000 nm or less was measured to determine the transmittance at the maximum absorption wavelength. As the measuring instrument, an ultraviolet-visible-near-infrared spectrophotometer (Model number: UV 3150) of Shimadzu Corporation was used. The smaller the measured transmittance value, the higher the near-infrared light blocking property of the lens for spectacles. Results thereof are as shown in Tables 2 and 3.

3. Transmittance of Light in the Visible Region

The transmittances of light having wavelengths of 400 nm to 700 nm of the lens for spectacles produced in Examples 1 to 20 and Comparative Examples 1 and 2 were measured, and the average thereof was obtained. As the measuring instrument, an ultraviolet-visible-near-infrared spectrophotometer (Model number: UV 3150) of Shimadzu Corporation was used. The higher the measured transmittance value is, the light having a wavelength of 400 nm to 700 nm is transmitted, and therefore, the coloring of the lens for spectacles is smaller. Results thereof are as shown in Tables 2 and 3.

4. Color Value (Molar Absorption Coefficient/Molecular Weight)

The molar absorption coefficient was calculated from the relationship between the number of moles of the specific compound and the transmittance in accordance with Lambert-Boyle's law, based on the measurement result of 2. Transmittance in the near-infrared region. The color value (=molar absorption coefficient/molecular weight) was calculated from the obtained molar absorption coefficient and the molecular weight of the specific compound.

5. Haze

The haze of the lens for spectacles produced in Examples 1 to 20 and Comparative Examples 1 and 2 was measured. As the measuring instrument, a haze meter (Model number: NDH 7000) of Nippon Denshoku Industries Co., Ltd. was used. The lower the measured haze value, the better the transparency of the lens for spectacles. Results thereof are as shown in Tables 2 and 3.

6. Light Resistance

The light resistance of the lens for spectacles produced in Examples 1 to 20 and Comparative Examples 1 and 2 was evaluated. First, the transmittance at the maximum absorption wavelength in the wavelength range of more than 700 nm and 1000 nm or less of the lens for spectacles was measured by using an ultraviolet-visible-near-infrared spectrophotometer (Model number: UV 3150) of Shimadzu Corporation.

Subsequently, by using a super accelerated weather fastness tester [Product name: EYE SUPER UV TESTER, Iwasaki Electric Co., Ltd.], the lens for spectacles was irradiated with the light of a metal halide lamp (cut about 290 nm or less), under the conditions of the illuminance of 90 mW/cm$^2$, a temperature of 63° C., and the relative humidity of 50%, for 60 hours. After the light irradiation, the transmittance of light of the lens for spectacles at the wavelength of 400 nm was measured with an ultraviolet-visible-near-infrared spectrophotometer (Model number: UV 3150) of Shimadzu Corporation in the same manner as above.

The width of the change in transmittance at the maximum absorption wavelength before and after light irradiation was calculated, and in a case where the width of change was less than 10%, the light resistance was evaluated to be "particularly satisfactory", in a case where the width of change was 10% or more and less than 15%, the light resistance was evaluated to be "satisfactory", and in a case where the width of change was 15% or more, the light resistance was evaluated to be "poor". Results thereof are as shown in Tables 2 and 3.

7. Coloring (Evaluation of Yellowish Tint)

The lens for spectacles produced in each of Examples 1 to 20 and Comparative Examples 1 and 2 was placed on white paper. One evaluation monitor was asked to visually observe the lens for spectacles on paper and evaluate whether or not the lens for spectacles was colored, particularly whether or not the lens for spectacles had a yellowish tint. Results thereof are as shown in Tables 2 and 3.

8. Eye Fatigue

For each pair of spectacles having the lens for spectacles obtained in each of Examples 1 to 20 and Comparative Examples 1 and 2, two evaluation monitors wore the spectacles, and evaluated whether or not eye fatigue was felt after three hours of continuous viewing of the display of the image display device.

As a result, both of the two evaluation monitors wearing the spectacles including the lenses for spectacles of Examples 1 to 20 evaluated that eye fatigue was not felt ("none").

On the other hand, both of the two evaluation monitors wearing the spectacles including the lenses for spectacles of Comparative Examples 1 and 2 evaluated that eye fatigue was felt ("yes").

TABLE 2

| | Near-infrared absorbing agent | | | | Material other than near-infrared absorbing agent for spectacle lens | |
|---|---|---|---|---|---|---|
| | | Evaluation in thiourethane resin | | | | |
| | | Maximum | | Color value | | |
| | Compound | absorption wavelength λmax (nm) | 400 nm transmittance | (molar absorption coefficient/ molecular weight) | Resin (kind) | Ultraviolet absorbing agent |
| Example1 | D-1 | 882 | 96% | 351 | urethane resin (material MR-8) | — |
| Example2 | D-1 | 882 | 96% | 351 | urethane resin (material MR-7) | — |

TABLE 2-continued

| | | | | | | |
|---|---|---|---|---|---|---|
| Example3 | D-28 | 863 | 92% | 360 | urethane resin (material MR-7) | — |
| Example4 | D-35 | 743 | 94% | 387 | urethane resin (material MR-7) | — |
| Example5 | D-35 | 743 | 94% | 387 | polycarbonate resin (material L-1250WP) | — |
| Example6 | D-35 | 743 | 94% | 387 | episulfide resin | — |
| Example7 | D-35 | 743 | 94% | 387 | urethane resin (material MR-7) | UV-1 |
| Example8 | D-35 | 743 | 94% | 387 | urethane resin (material MR-7) | UV-2 |
| Example9 | D-35 | 743 | 94% | 387 | urethane resin (material MR-7) | UV-3 |
| Example10 | D-35 | 743 | 94% | 387 | urethane resin (material MR-7) | UV-4 |

| | Spectacle lens evaluation | | | | | | |
|---|---|---|---|---|---|---|---|
| | Physical property evaluation | | | | Functional evaluation | | |
| | Transmittance % at the maximum absorption wavelength | 400 nm to 700 nm transmittance % | Haze | Light resistance | Change in tint | Yellowish tint | Eye fatigue |
| Example1 | 0.05 | 94% | 0.1 | satisfactory | none | none | none |
| Example2 | 0.05 | 94% | 0.1 | satisfactory | none | none | none |
| Example3 | 0.06 | 94% | 0.1 | satisfactory | none | none | none |
| Example4 | 0.05 | 95% | 0.1 | satisfactory | none | none | none |
| Example5 | 0.06 | 95% | 0.2 | satisfactory | none | none | none |
| Example6 | 0.07 | 93% | 0.3 | satisfactory | none | none | none |
| Example7 | 0.05 | 91% | 0.2 | particularly satisfactory | none | none | none |
| Example8 | 0.05 | 90% | 0.3 | particularly satisfactory | none | none | none |
| Example9 | 0.05 | 89% | 0.3 | particularly satisfactory | none | none | none |
| Example10 | 0.05 | 87% | 0.6 | satisfactory | none | none | none |

TABLE 3

| | Near-infrared absorbing agent | | | | Material other than near-infrared absorbing agent for spectacle lens | |
|---|---|---|---|---|---|---|
| | Evaluation in thiourethane resin | | | | | |
| | | Maximum absorption wavelength λmax (nm) | 400 nm transmittance | Color value (molar absorption coefficient/molecular weight) | | Ultraviolet absorbing agent |
| | Compound | | | | Resin (kind) | |
| Example11 | E-1 | 746 | 85% | 328 | urethane resin (material MR-8) | — |
| Example12 | E-13 | 829 | 90% | 308 | urethane resin (material MR-7) | — |
| Example13 | E-13 | 829 | 90% | 308 | urethane resin (material MR-7) | UV-1 |
| Example14 | E-21 | 814 | 89% | 306 | urethane resin (material MR-7) | — |
| Example15 | G-13 | 794 | 89% | 262 | urethane resin (material MR-7) | — |
| Example16 | G-13 | 794 | 89% | 262 | urethane resin (material MR-7) | UV-1 |
| Example17 | F-53 | 740 | 90% | 378 | urethane resin (material MR-7) | — |
| Example18 | F-53 | 740 | 90% | 378 | urethane resin (material MR-8) | — |
| Example19 | F-53 | 740 | 90% | 378 | urethane resin (material MR-7) | UV-1 |
| Example20 | D-1 + D-35 | 882, 743 | 91% | 370 | urethane resin (material MR-7) | — |
| Comparative Example1 | H-1 | 842 | 41% | 151 | urethane resin (material MR-7) | — |

TABLE 3-continued

| | | | | | | |
|---|---|---|---|---|---|---|
| Comparative Example2 | H-2 | 1080 | 32% | 85 | urethane resin (material MR-7) | — |

| | Spectacle lens evaluation | | | | | | |
|---|---|---|---|---|---|---|---|
| | Physical property evaluation | | | | Functional evaluation | | |
| | Transmittance % at the maximum absorption wavelength | 400 nm to 700 nm trans- mittance % | Haze | Light resistance | Change in tint | Yellowish tint | Eye fatigue |
| Example11 | 0.06 | 89% | 0.2 | satisfactory | none | none | none |
| Example12 | 0.05 | 89% | 0.2 | satisfactory | none | none | none |
| Example13 | 0.05 | 86% | 0.3 | satisfactory | none | none | none |
| Example14 | 0.05 | 89% | 0.2 | satisfactory | none | none | none |
| Example15 | 0.07 | 89% | 0.2 | satisfactory | none | none | none |
| Example16 | 0.07 | 85% | 0.2 | satisfactory | none | none | none |
| Example17 | 0.05 | 89% | 0.2 | satisfactory | none | none | none |
| Example18 | 0.07 | 89% | 0.2 | satisfactory | none | none | none |
| Example19 | 0.07 | 85% | 0.2 | satisfactory | none | none | none |
| Example20 | 0.09 | 91% | 0.2 | satisfactory | none | none | none |
| Comparative Example1 | 0.15 | 78% | 0.8 | poor | yes | yes | yes |
| Comparative Example2 | 0.07 | 72% | 1.2 | poor | yes | yes | yes |

As shown in Tables 2 and 3, it was confirmed that, compared with the lenses for spectacles of Comparative Examples 1 and 2, the lenses for spectacles of Examples 1 to 20 had a low value of transmittance in the near-infrared region and small half-width, and thus found to be excellent in blocking property of near-infrared light having a specific wavelength.

Further, it was confirmed that, compared with the lenses for spectacles of Comparative Examples 1 and 2, the lenses for spectacles of Examples 1 to 20 had a low haze value and excellent transparency.

Furthermore, it was also confirmed that, compared with the lenses for spectacles of Comparative Examples 1 and 2, the lenses for spectacles of Examples 1 to 20 had excellent light resistance and were thus hardly colored.

It can be seen that the spectacles including the lenses for spectacles of Examples 1 to 20 mitigate eye fatigue in a case where the display of the image display device is viewed for a long period of time, as compared with the spectacles including the lenses for spectacles of Comparative Examples 1 and 2, and the eye fatigue is hardly recognized.

The disclosure of JP2018-166423 filed on Sep. 5, 2018 is incorporated herein by reference.

All documents, patent applications, and technical standards described in the present disclosure are incorporated herein by reference to the same extent as if each individual publication or patent application was specifically and individually indicated to be incorporated by reference.

What is claimed is:

1. A lens for spectacles comprising:
a resin; and
a near-infrared absorbing agent having a maximum absorption wavelength in a thiourethane resin in a range of more than 700 nm and 1000 nm or less and a transmittance of light having a wavelength of 400 nm of 50% or more and 100% or less,
wherein the resin contains at least one selected from a thiourethane resin or an episulfide resin, and
wherein the near-infrared absorbing agent contains at least one selected from the group consisting of a compound represented by General Formula (1) and a compound represented by General Formula (2):

in General Formula (1), $A^1$ represents a keto form of an acidic nucleus selected from the group consisting of General Formula (1-a) to General Formula (1-x);
$A^2$ represents an enol form of an acidic nucleus selected from the group consisting of General Formula (1-a) to General Formula (1-x), where a hydroxy group in the enol form may be dissociated;
the acidic nuclei represented by $A^1$ and $A^2$ may be the same as or different from each other;
$L^1$, $L^2$, and $L^3$ each independently represent a methine group;
$M^+$ represents a proton or a monovalent counter cation, and n represents a number required to make the positive charge number and the negative charge number of a compound represented by General Formula (1) equal to each other; and
k represents 2 or 3,

-continued
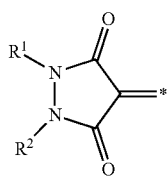
(1-c)
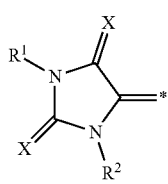
(1-d)
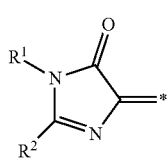
(1-e)
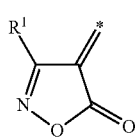
(1-f)
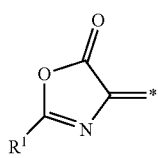
(1-g)
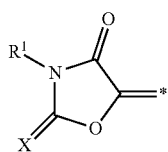
(1-h)
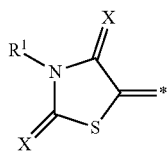
(1-i)
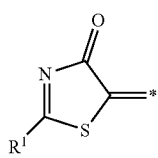
(1-j)
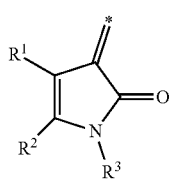
(1-k)
-continued
(1-l)
(1-m)
(1-n)
(1-o)
(1-p)
(1-q)
(1-r)
(1-s)
(1-t)

-continued

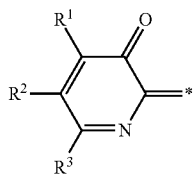
(1-u)

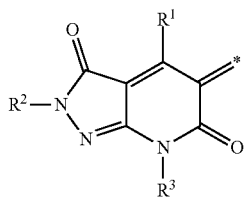
(1-v)

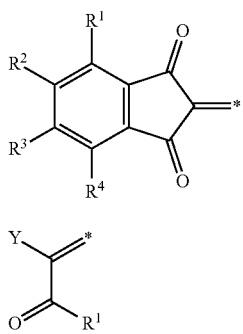
(1-w)

(1-x)

Y<br>‖<br>*<br>‖<br>O—R¹ in General Formula (1-a) to General Formula (1-x), each * represents a position at which the keto form of the acidic nucleus $A^1$ is bonded to $L^1$ and the enol form of the acidic nucleus $A^2$ is bonded to $L^3$;

X represents an oxygen atom or a sulfur atom; Y represents an electron-withdrawing group, Z represents a hydrogen atom, or a carbamoyl group, an alkyl group, an aryl group, a cyano group, a carboxyl group, an acyl group, an alkyloxycarbonyl group, an aryloxycarbonyl group, a halogen atom, an amino group, an acylamino group, an alkylsulfonyl group, an arylsulfonyl group, or a sulfo group; and $R^1$, $R^2$, $R^3$, $R^4$, $R^5$, and $R^6$ each independently represent a hydrogen atom or a monovalent substituent, and

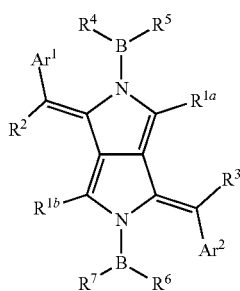
(2)

in General Formula (2), $R^{1a}$ and $R^{1b}$ each independently represent an alkyl group, an aryl group, or a heteroaryl group;

$Ar^1$ and $Ar^2$ each independently represent a heteroaryl group; and $R^2$ and $R^3$ each independently represent a hydrogen atom or a substituent, and $R^4$, $R^5$, $R^6$, and $R^7$ each independently represent a monovalent substituent.

2. The lens for spectacles according to claim 1, wherein a transmittance of the near-infrared absorbing agent at the maximum absorption wavelength is 1% or less, and a transmittance of light having a wavelength of 700 nm is 60% or more and 100% or less.

3. The lens for spectacles according to claim 1, wherein an x value of Lxy coordinates of the near-infrared absorbing agent in the thiourethane resin is in a range of 0.285 or more and 0.350 or less, and a y value thereof is 0.280 or more and 0.350 or less.

4. The lens for spectacles according to claim 2, wherein an x value of Lxy coordinates of the near-infrared absorbing agent in the thiourethane resin is in a range of 0.285 or more and 0.350 or less, and a y value thereof is 0.280 or more and 0.350 or less.

5. The lens for spectacles according to claim 1, wherein a ratio D of $A^{max-100}$ to $A^{max}$ is less than 0.20, where $A^{max}$ is an absorbance of the near-infrared absorbing agent in a maximum absorption wavelength band and $A^{max-100}$ is an absorbance at a wavelength shorter than the maximum absorption wavelength by 100 nm.

6. The lens for spectacles according to claim 4, wherein a ratio D of $A^{max-100}$ to $A^{max}$ is less than 0.20, where $A^{max}$ is an absorbance of the near-infrared absorbing agent in a maximum absorption wavelength band and $A^{max-100}$ is an absorbance at a wavelength shorter than the maximum absorption wavelength by 100 nm.

7. The lens for spectacles according to claim 1, wherein a transmittance of light having a wavelength in a range of 400 nm to 700 nm is 80% or more and 100% or less.

8. The lens for spectacles according to claim 1, wherein the near-infrared absorbing agent contains at least two near-infrared ray absorbing agents.

9. The lens for spectacles according to claim 1, further comprising:

at least one ultraviolet absorbing agent.

10. Spectacles comprising:

the lens for spectacles according to claim 1.

11. The lens for spectacles according to claim 1, wherein the near-infrared absorbing agent is selected from the group consisting of:
oxonol coloring agents (F-1) to (F-58):
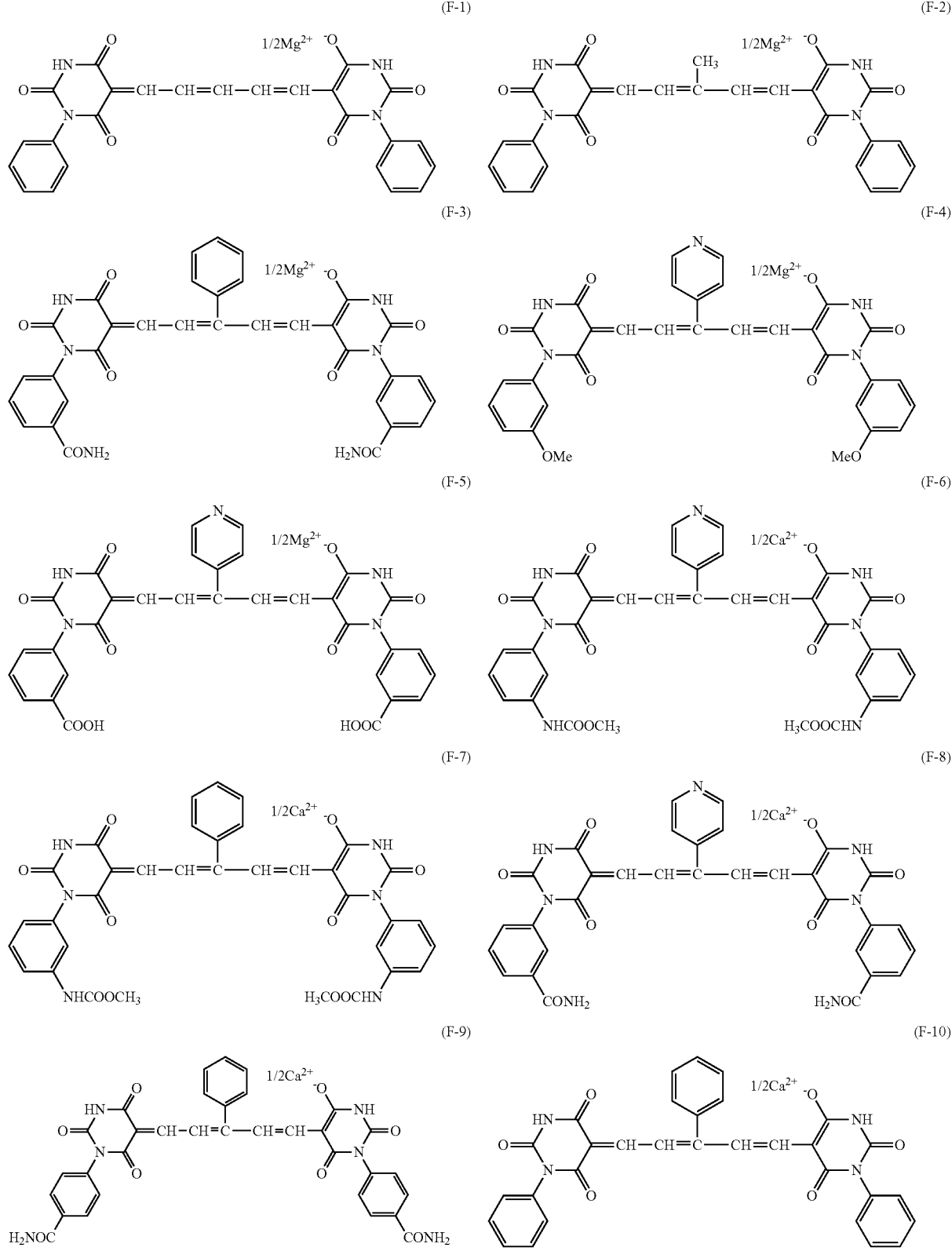

-continued
(F-11)
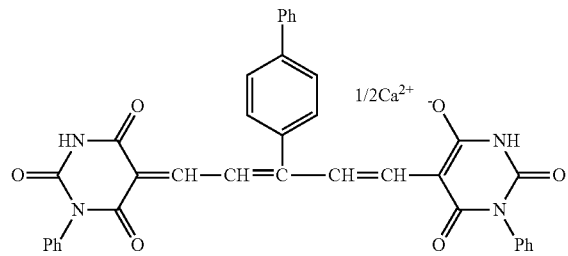
(F-12)
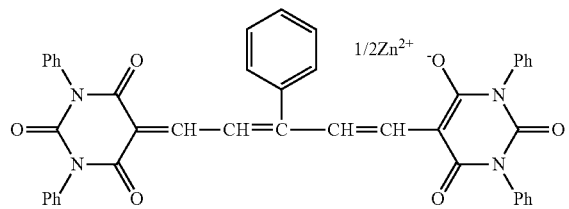
(F-13)
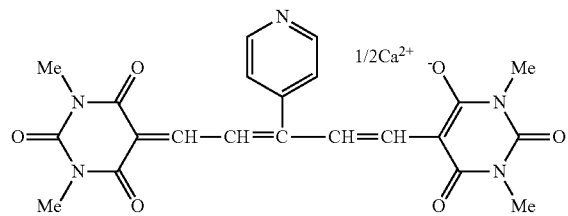
(F-14)
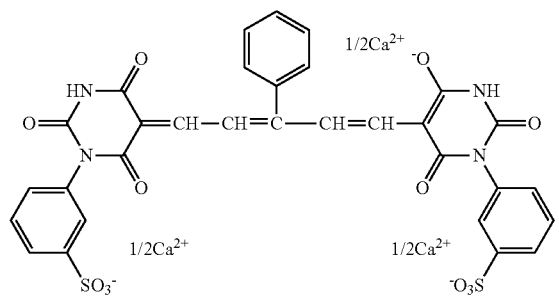
(F-15)
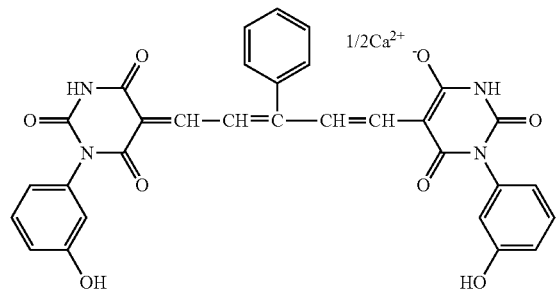
(F-16)
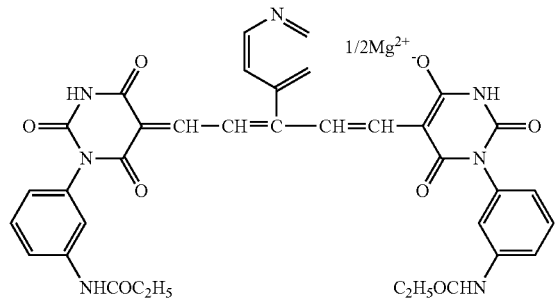
(F-17)
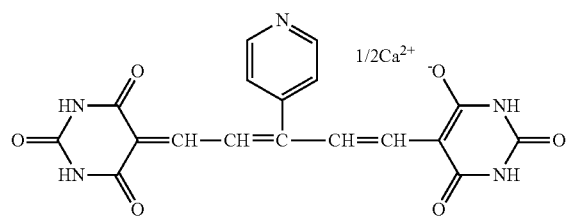
(F-18)
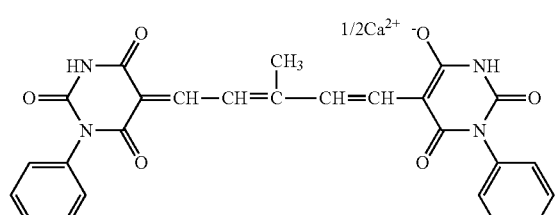
(F-19)
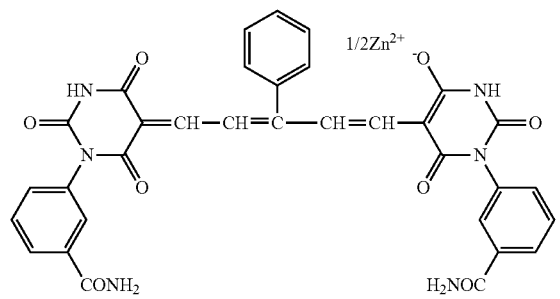
(F-20)
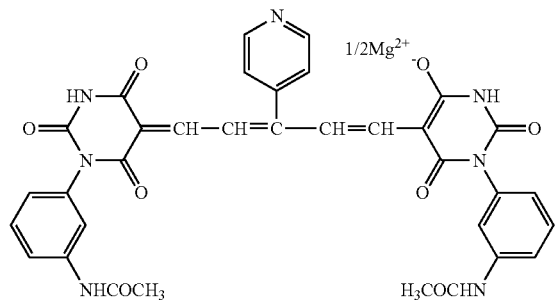

-continued
(F-21)
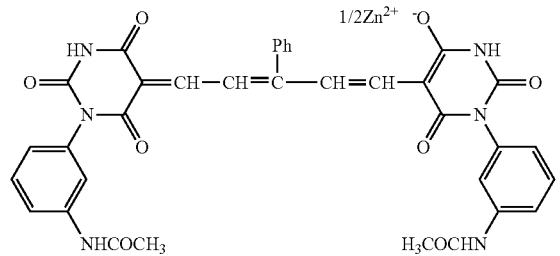
(F-22)
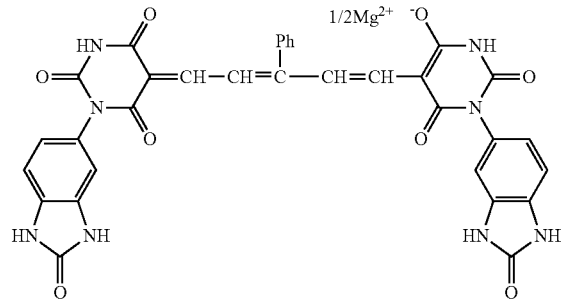
(F-23)
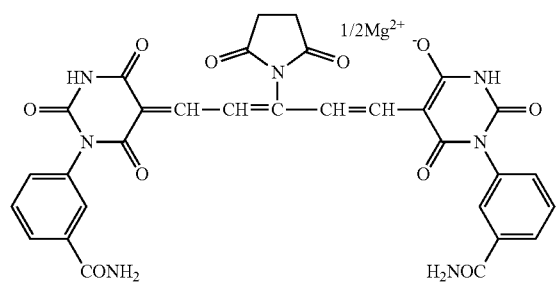
(F-24)
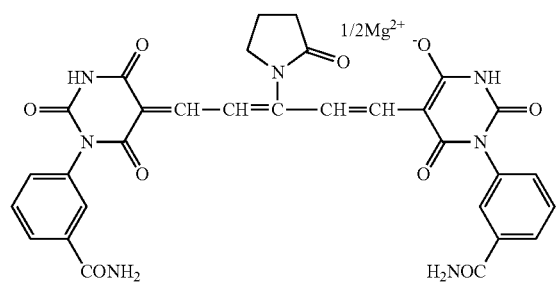
(F-25)
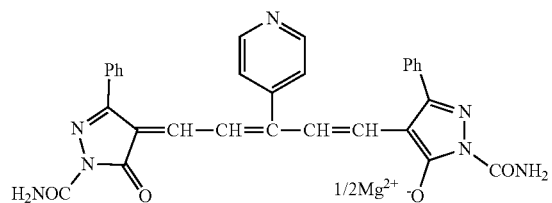
(F-26)
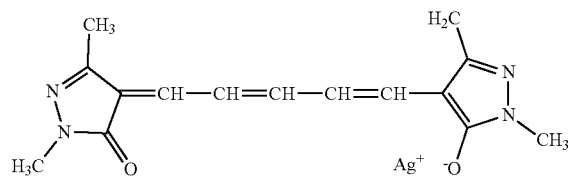
(F-27)
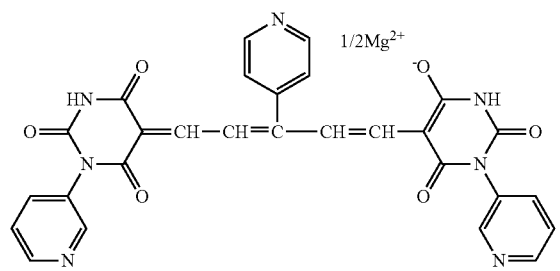
(F-28)
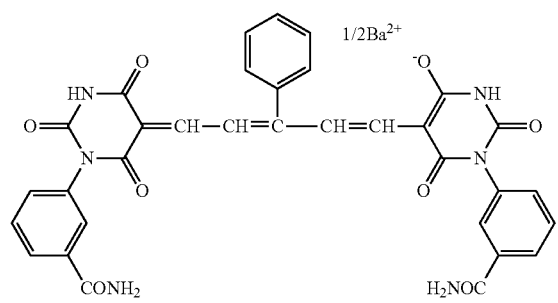
(F-29)
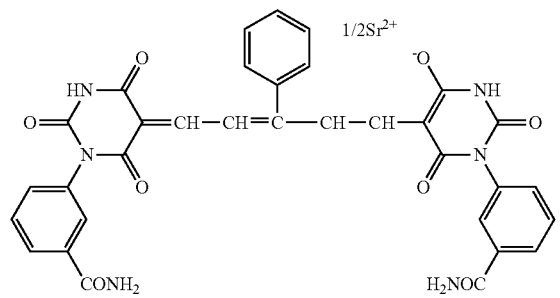
(F-30)
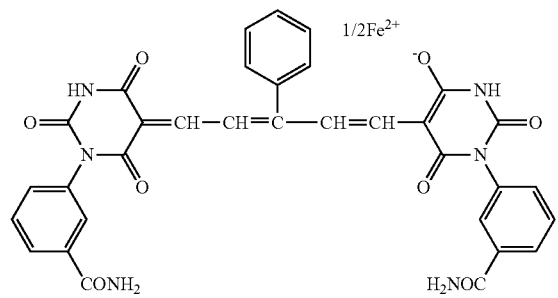

-continued
(F-31) 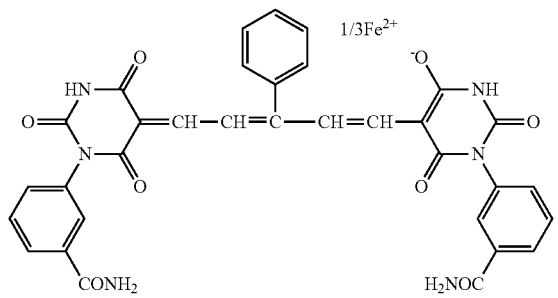
(F-32) 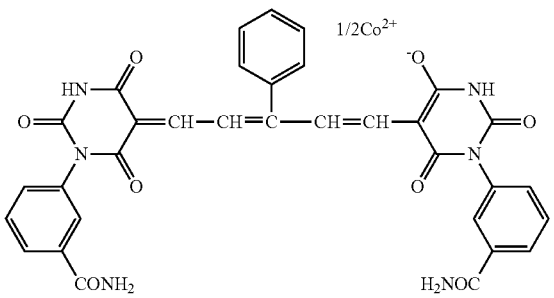
(F-33) 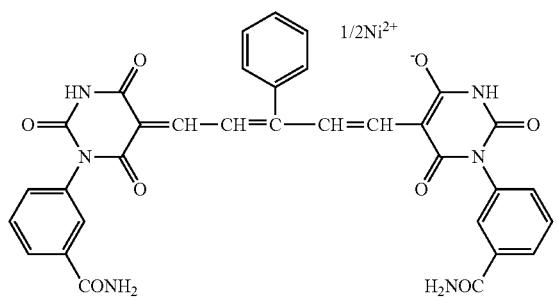
(F-34) 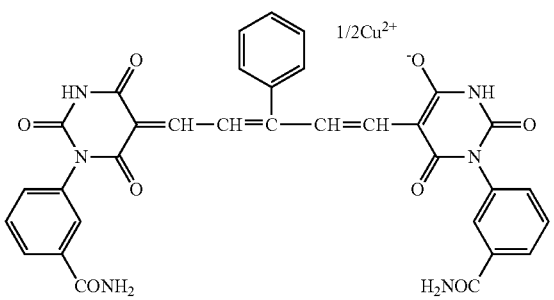
(F-35) 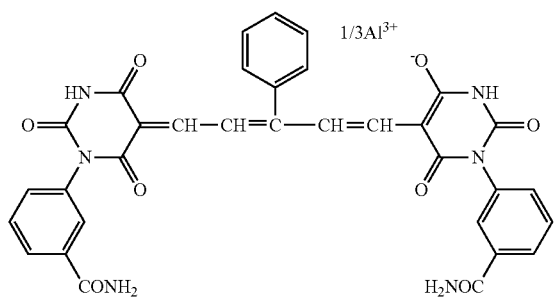
(F-36) 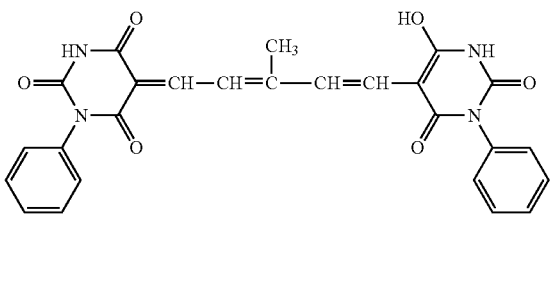
(F-37) 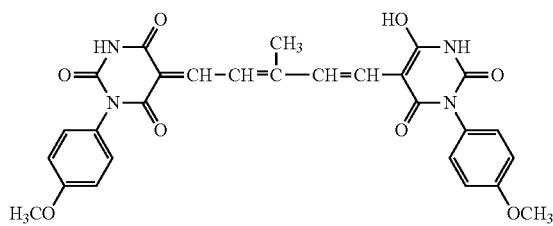
(F-38) 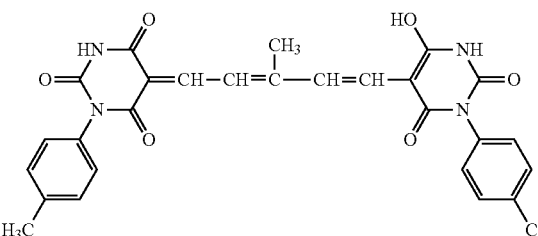
(F-39) 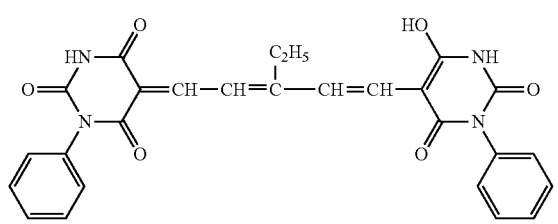
(F-40) 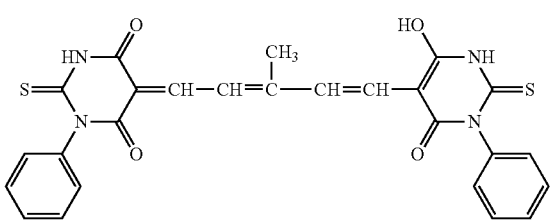

-continued
(F-41)
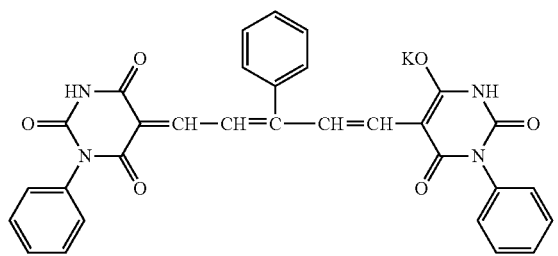
(F-42)
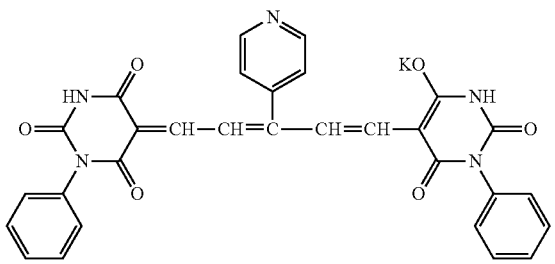
(F-43)
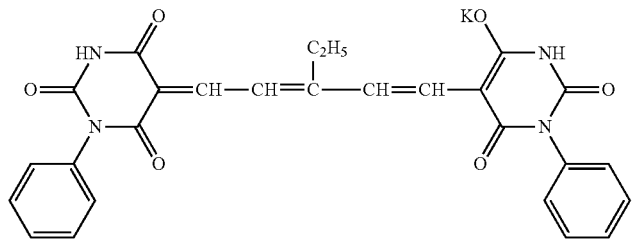
(F-44)
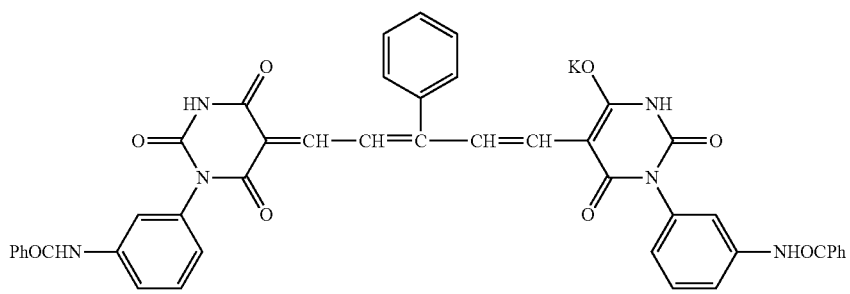
(F-45)
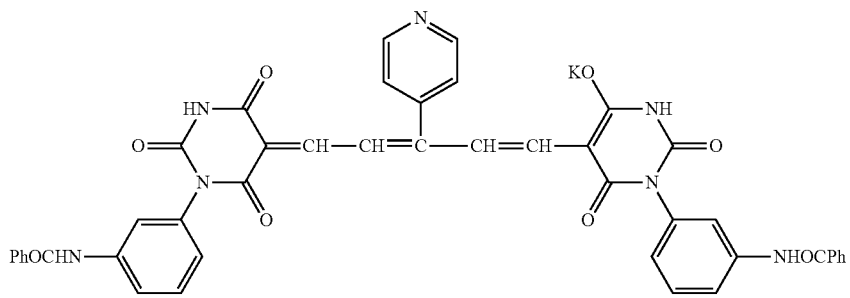
(F-46)
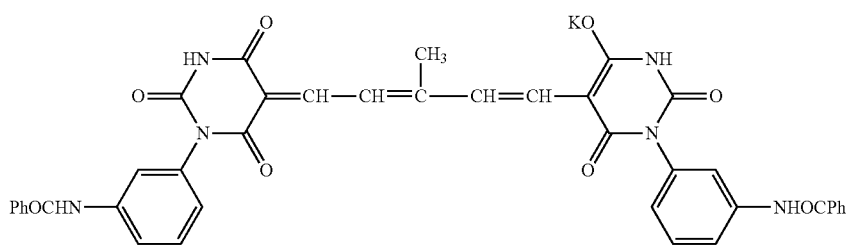

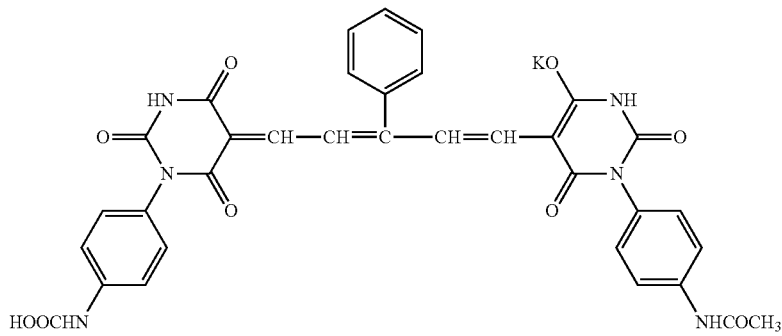
(F-47)
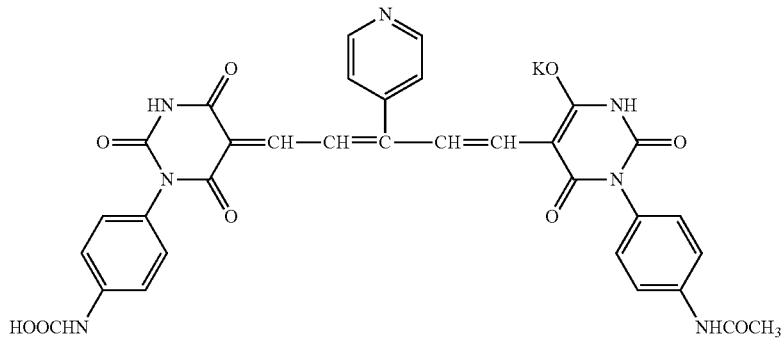
(F-48)
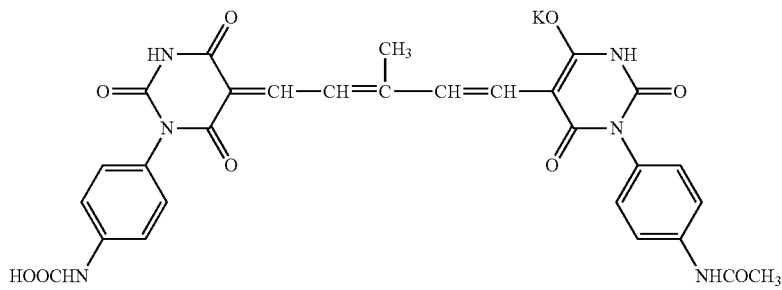
(F-49)
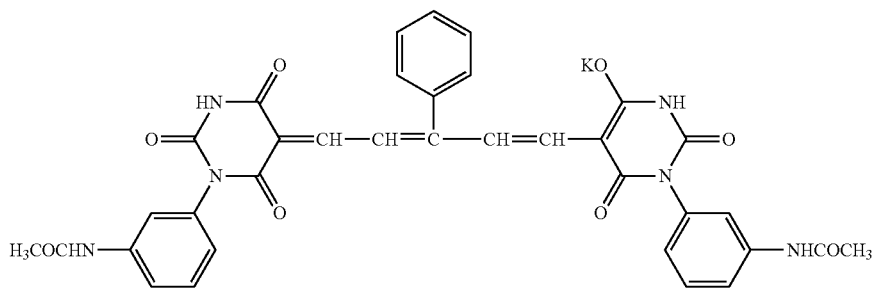
(F-50)
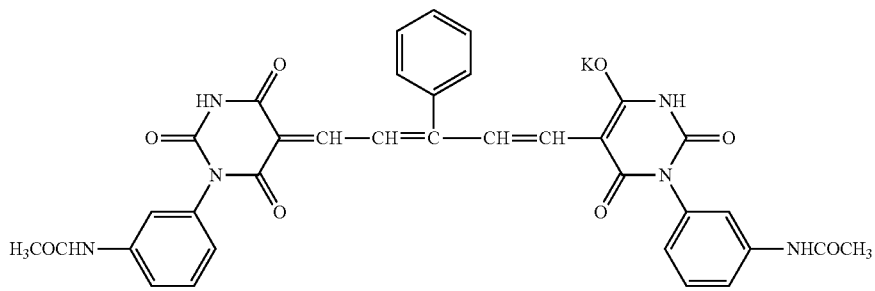
(F-51)

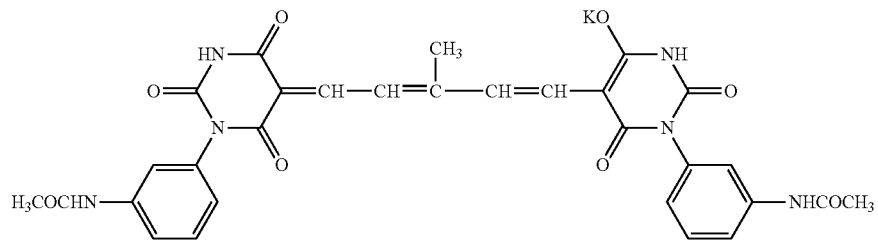
(F-52)
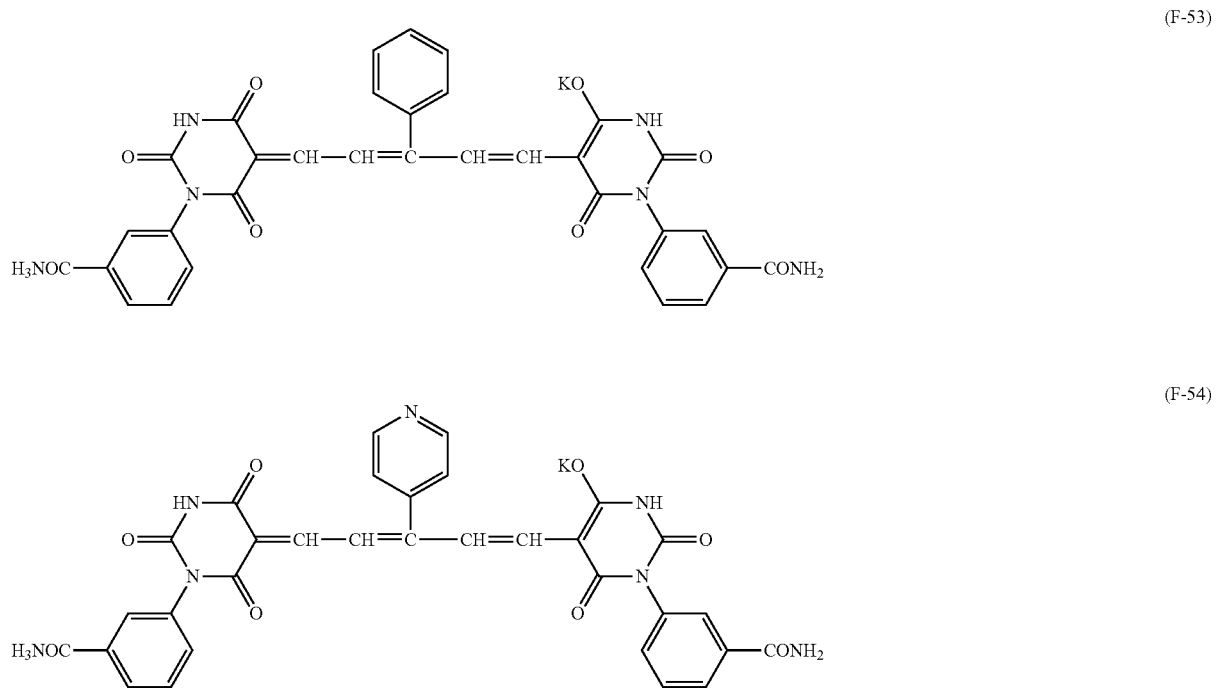
(F-53)
(F-54)
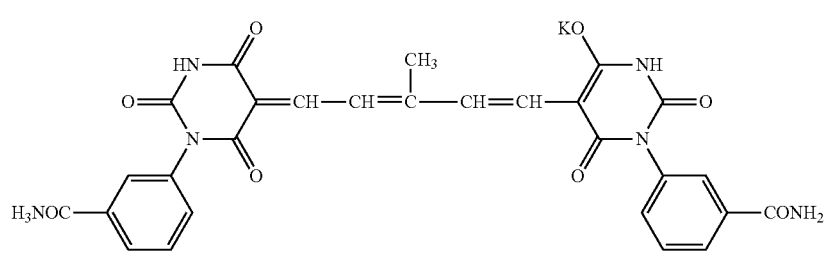
(F-55)
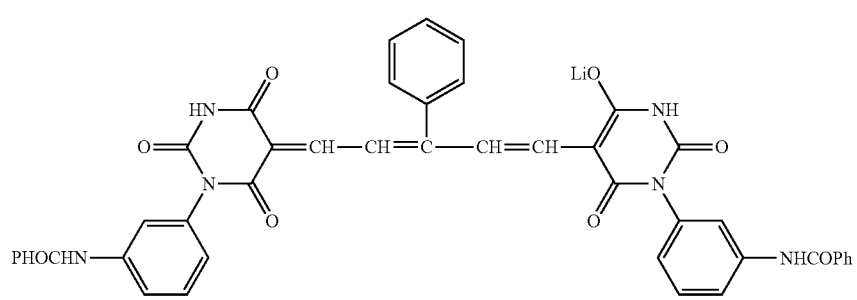
(F-56)

(F-57)
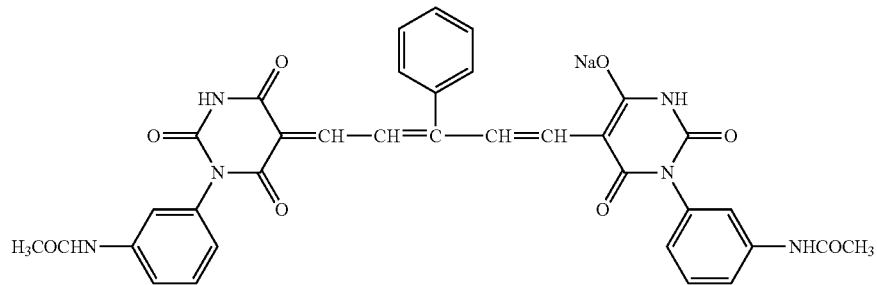
(F-58)
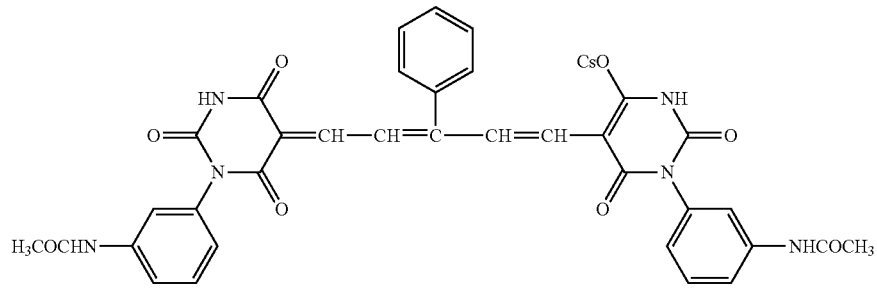
pyrrolopyrrole coloring agents (D-1) to (D-70);
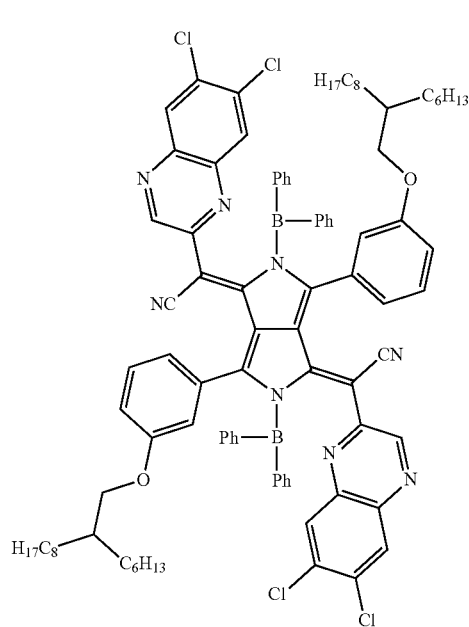
D-1
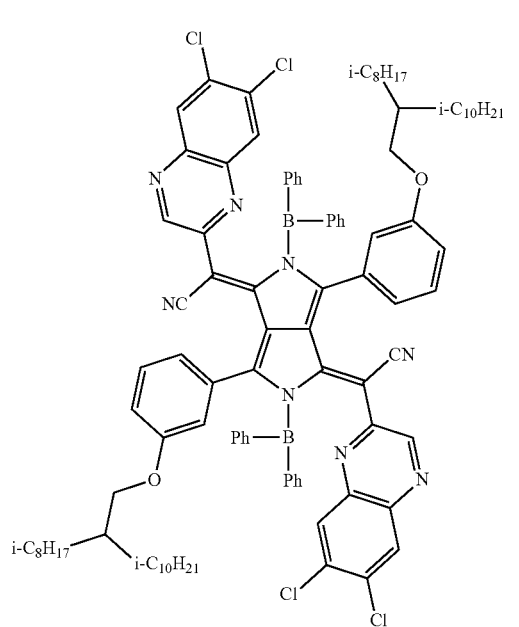
D-2

-continued
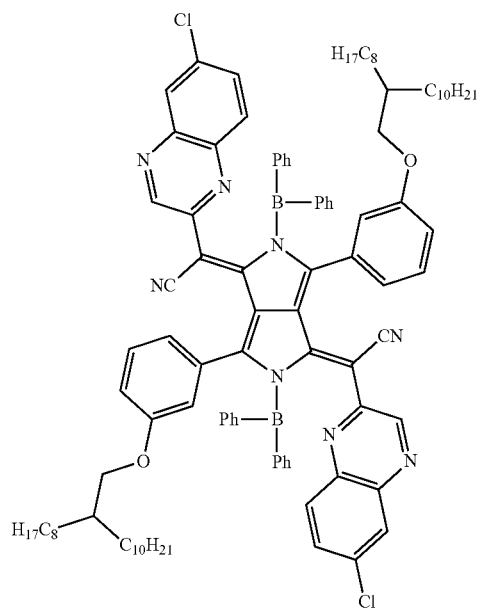
D-3
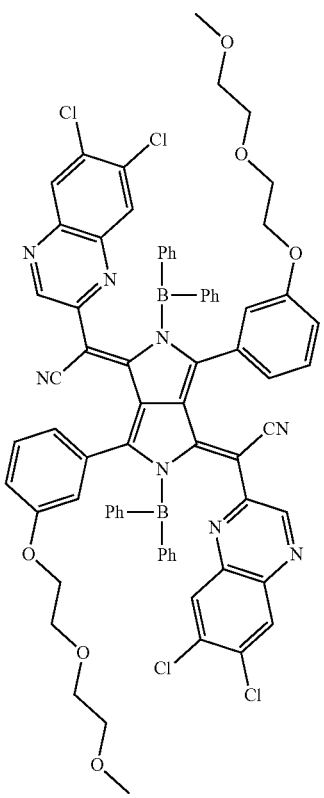
D-4
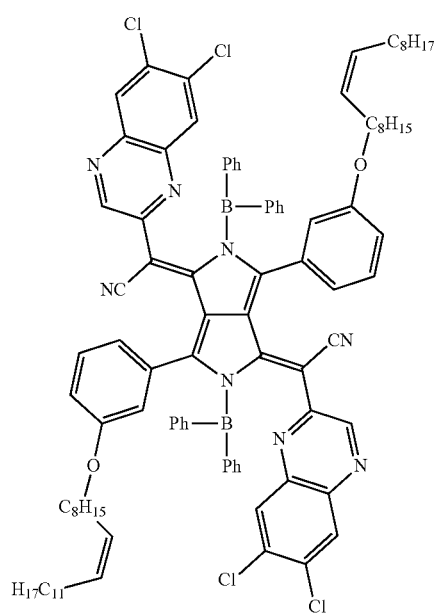
D-5

-continued
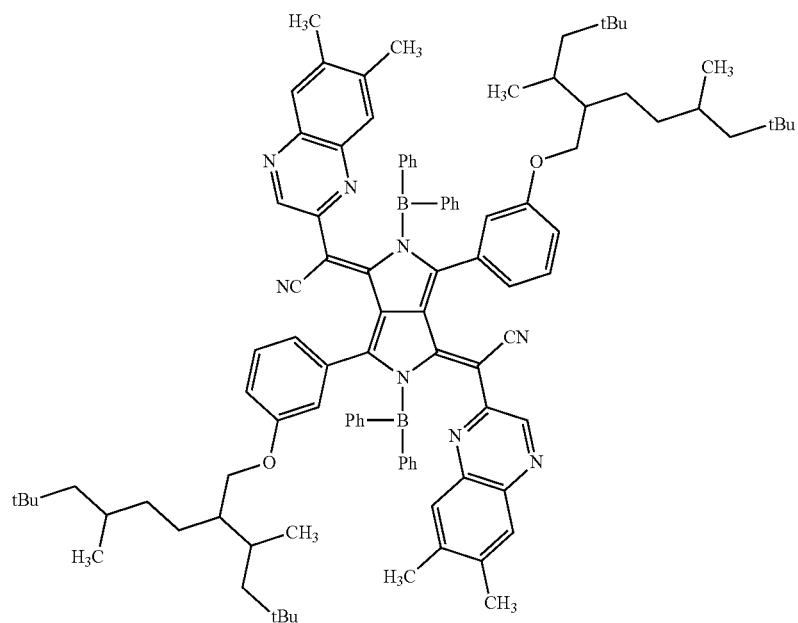
D-6
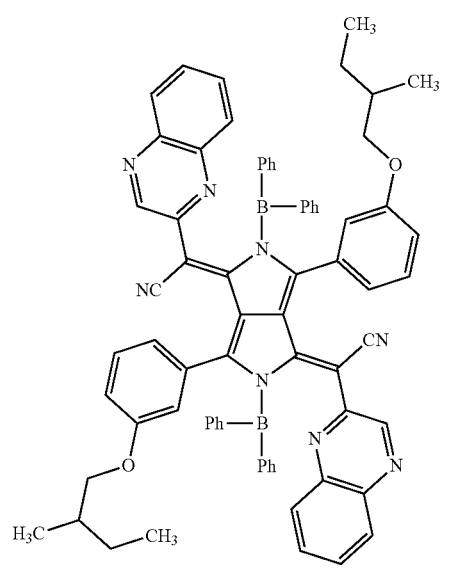
D-7
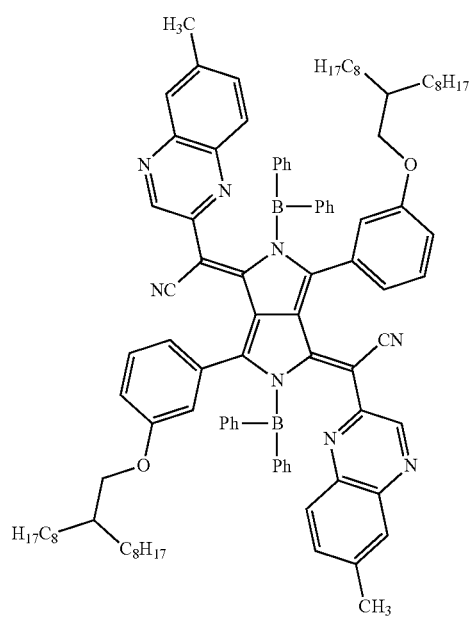
D-8

-continued
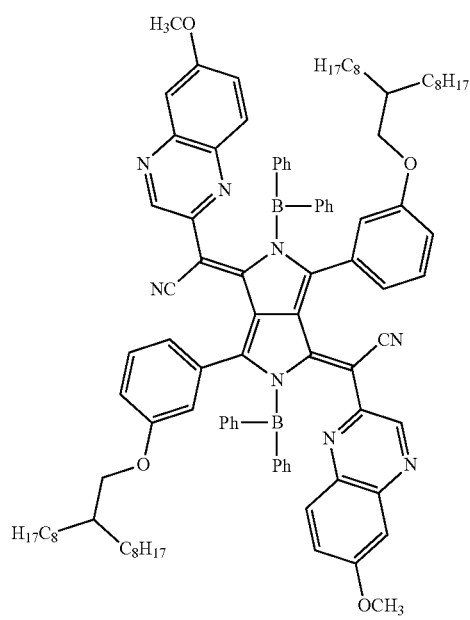
D-9
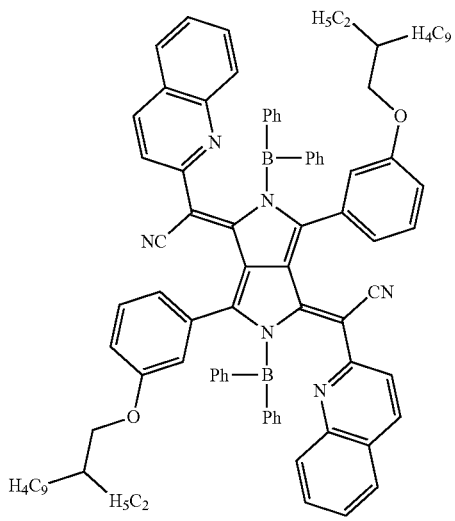
D-10
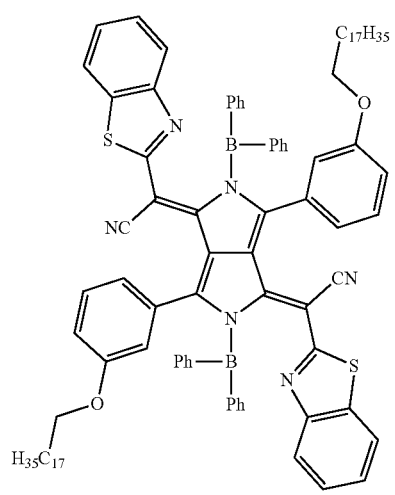
D-11

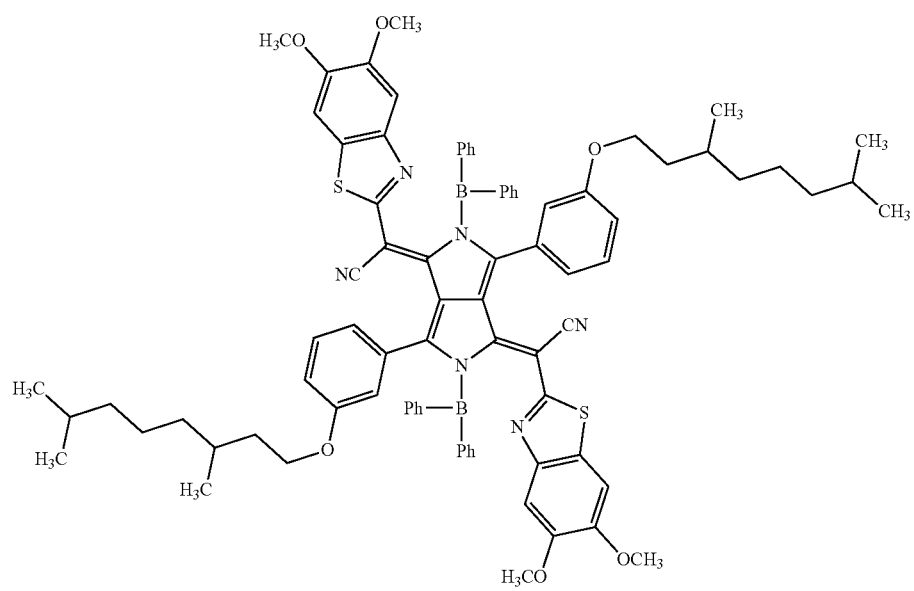
D-12
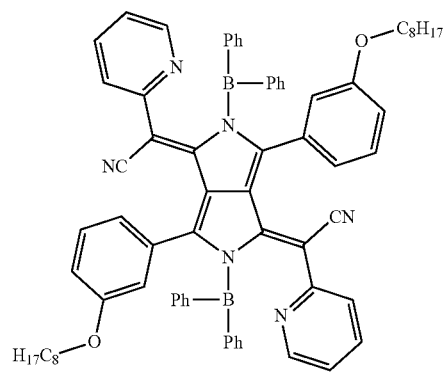
D-13
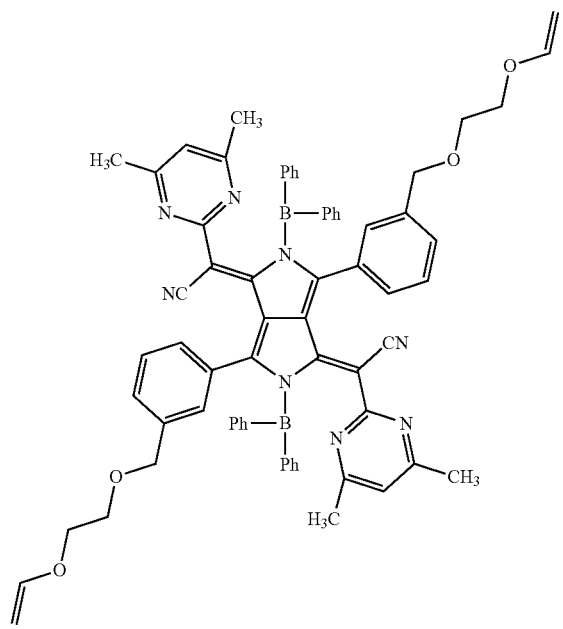
D-14

-continued
D-15
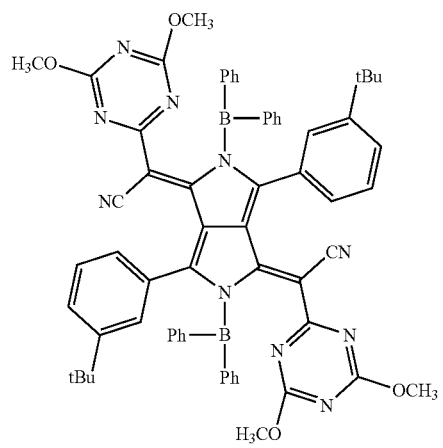
D-16
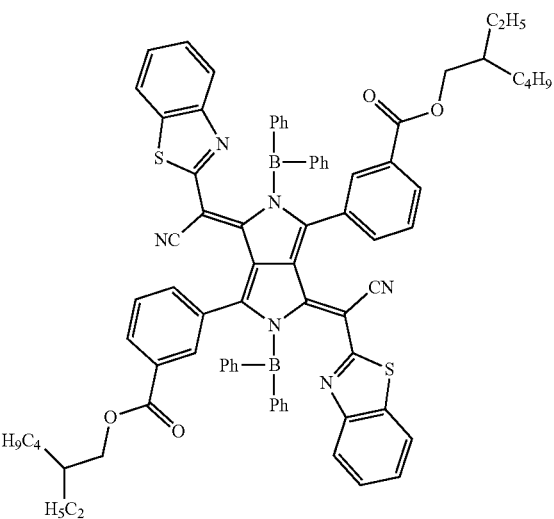
D-17
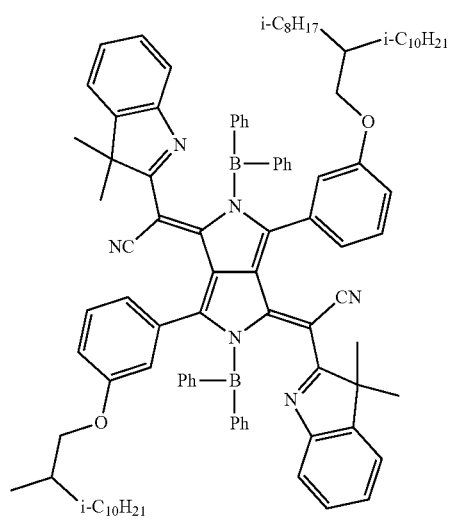
D-18
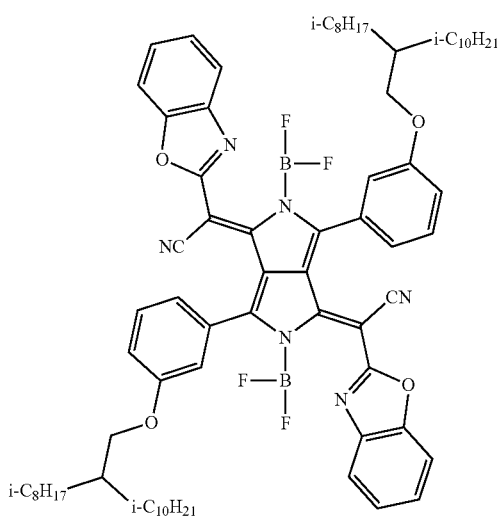
D-19
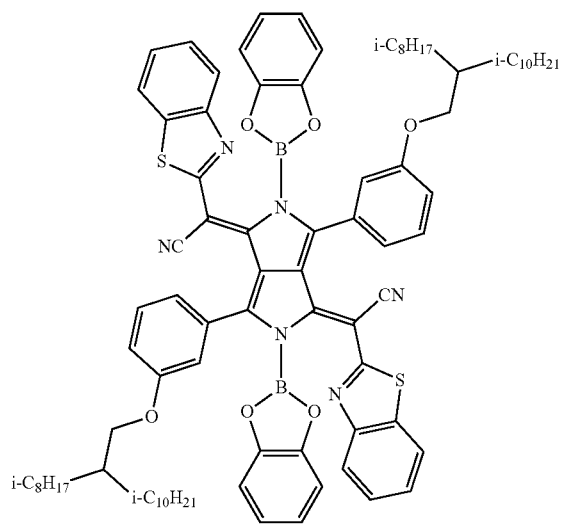
D-20
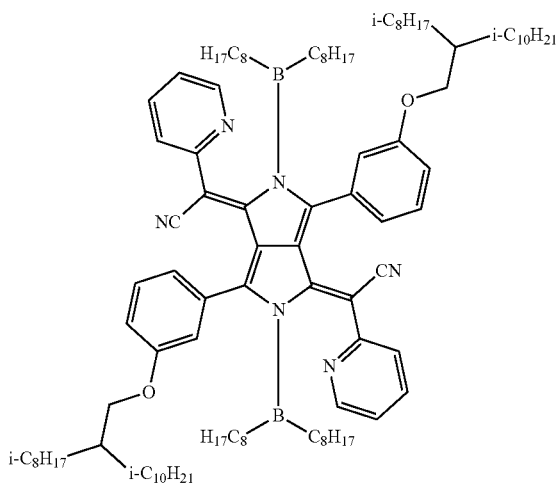

-continued
D-21
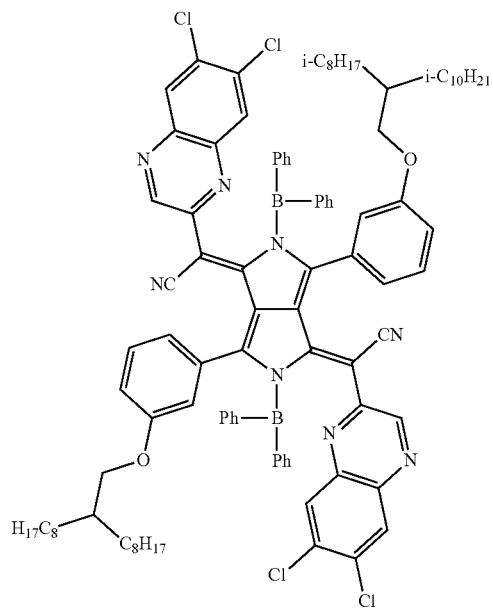
D-22
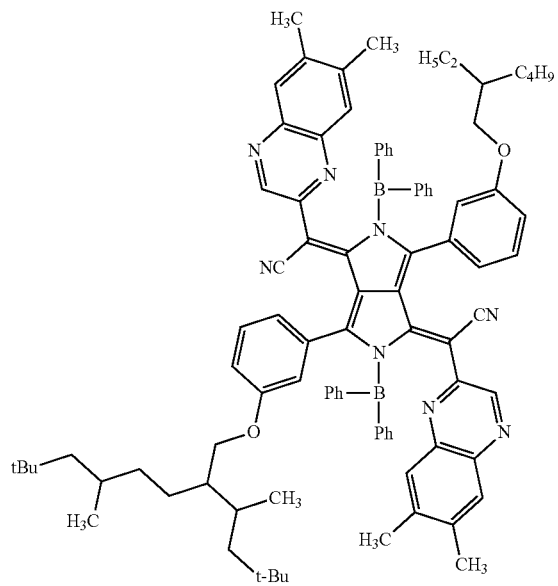
D-23
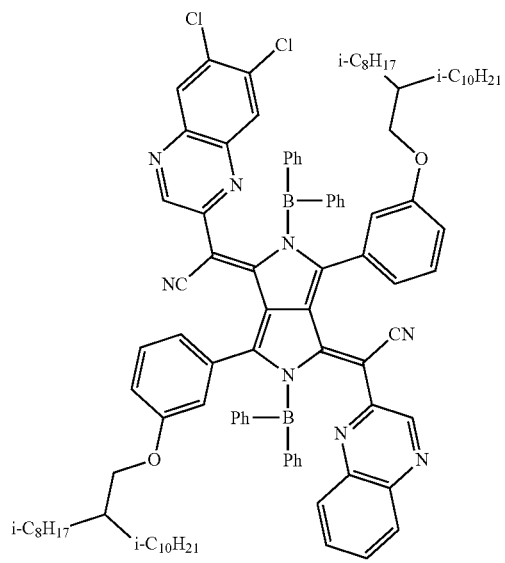
D-24
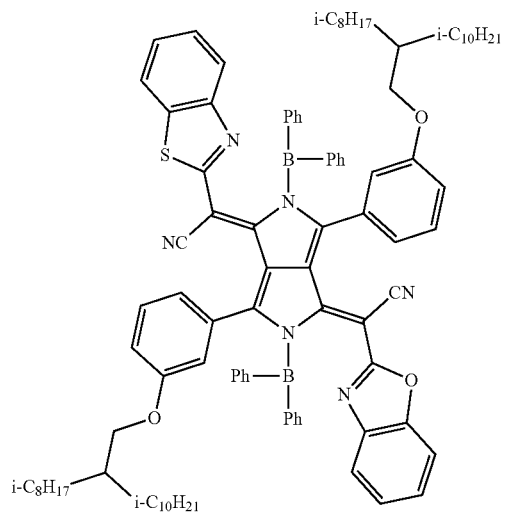

-continued
D-25
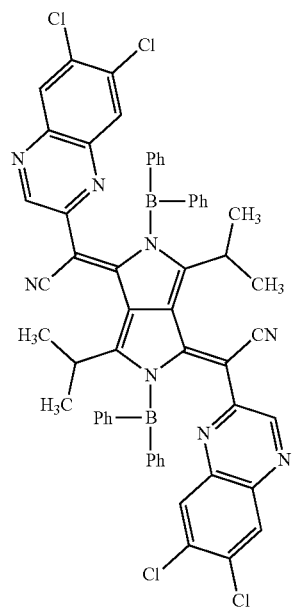
D-26
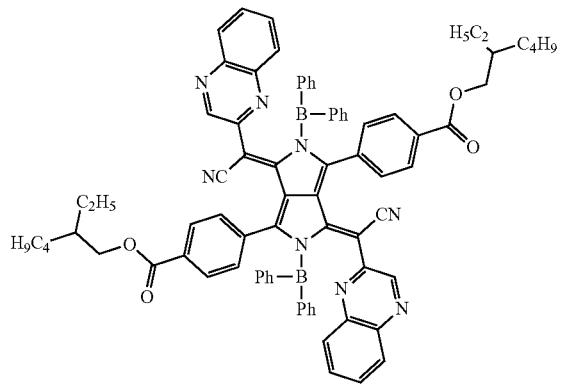
D-27
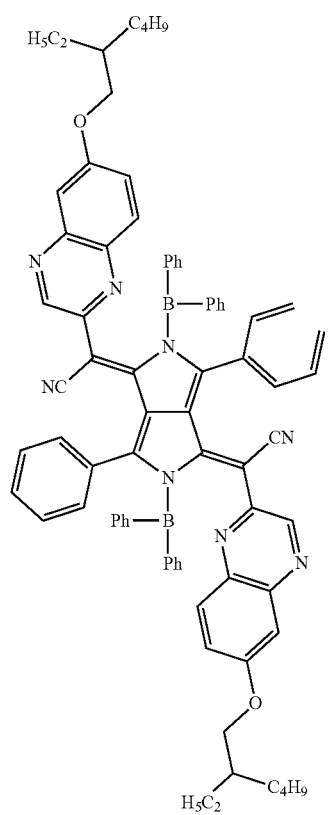

D-28
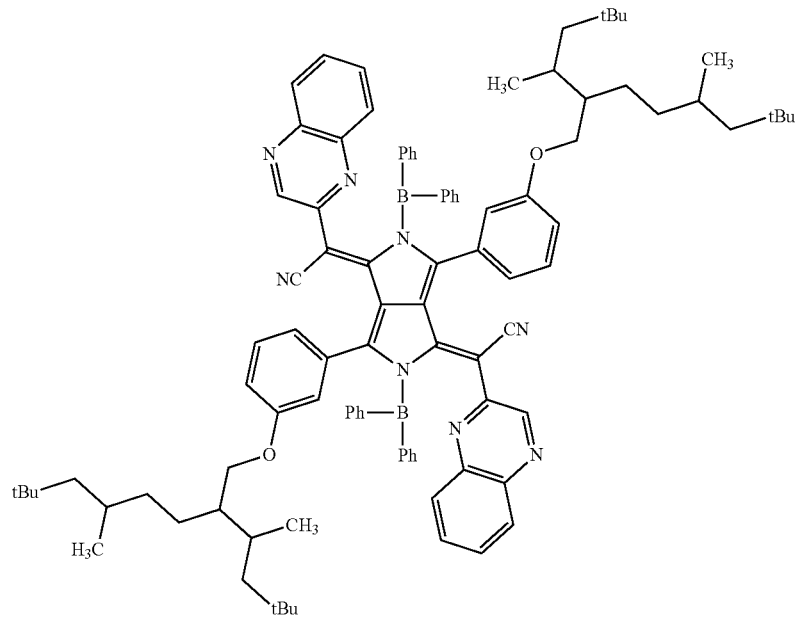
D-29
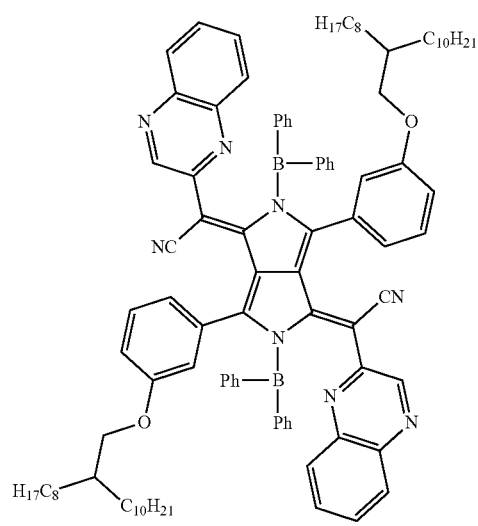
D-30
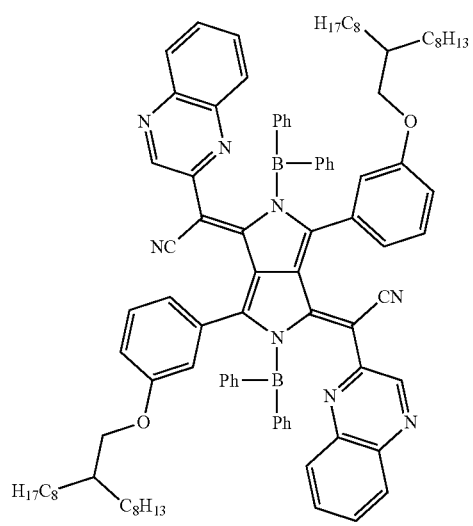

-continued
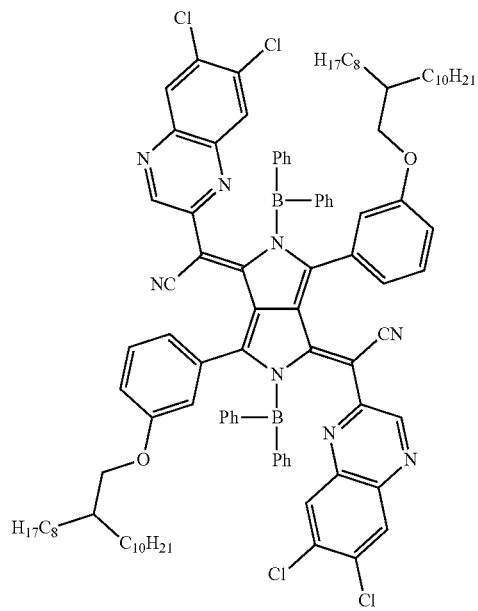
D-31
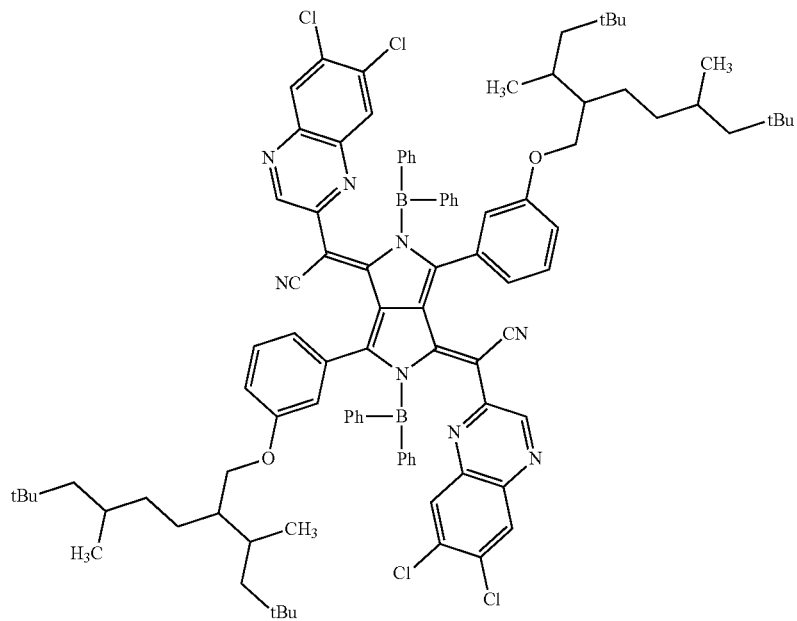
D-32

-continued
D-33
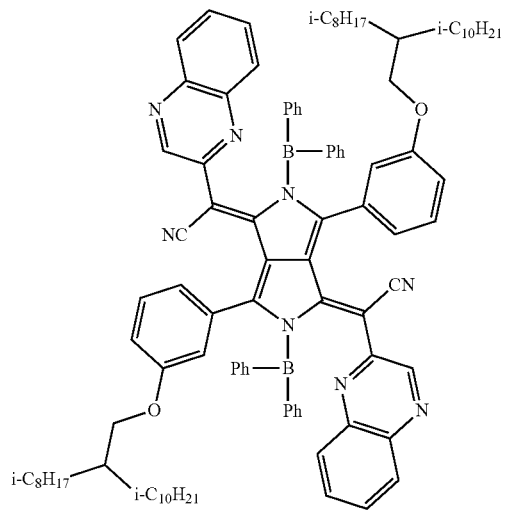
D-34
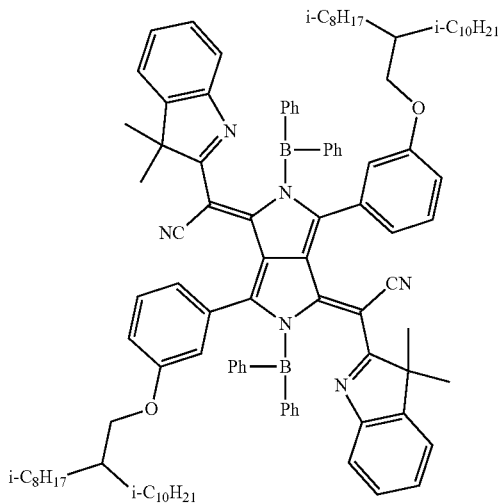
D-35
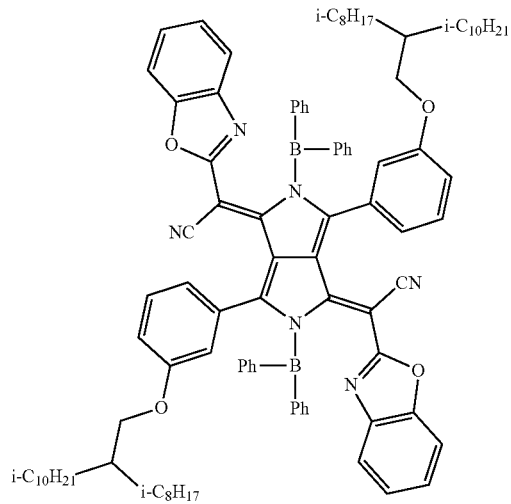
D-36
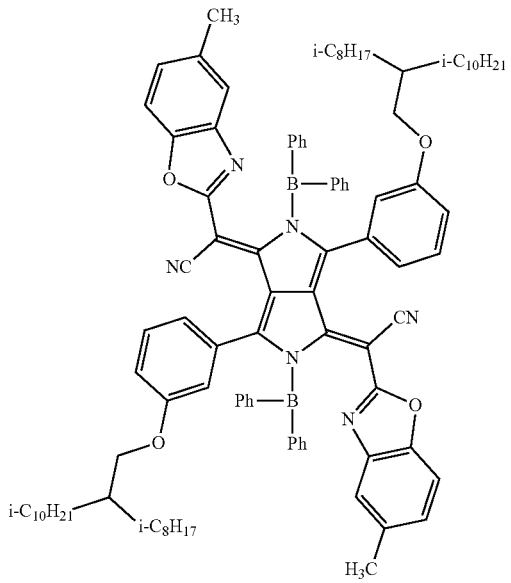
D-37
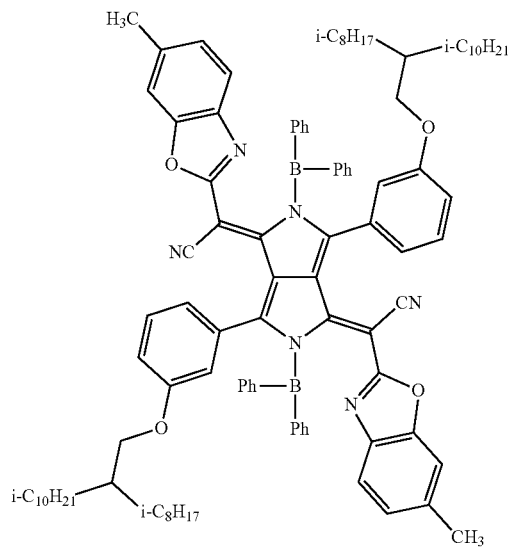
D-38
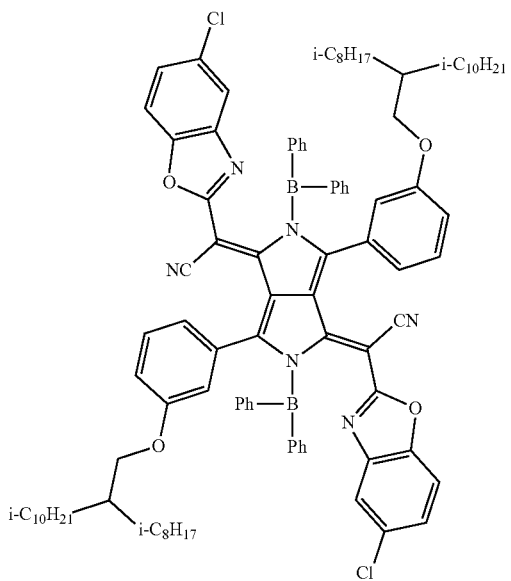

-continued
D-39
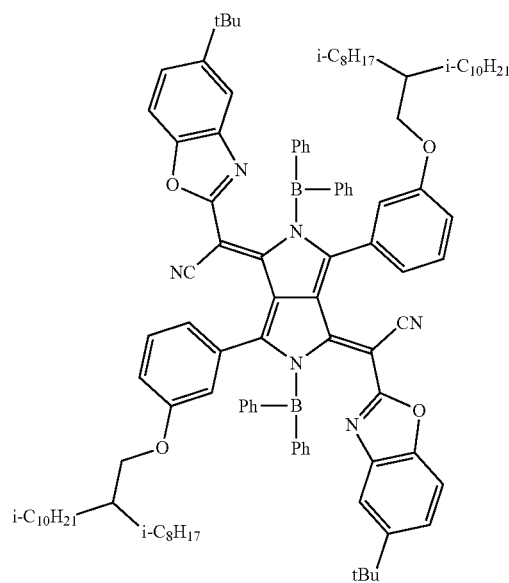
D-40
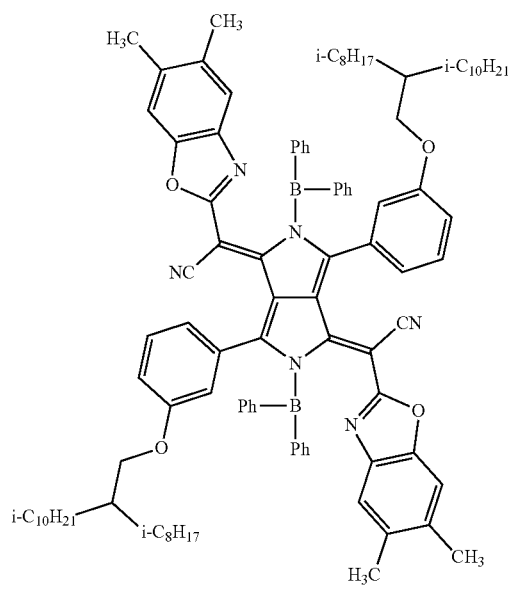
D-41
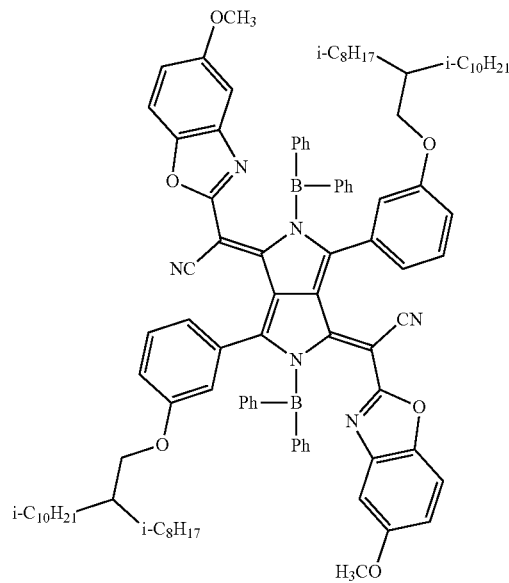
D-42
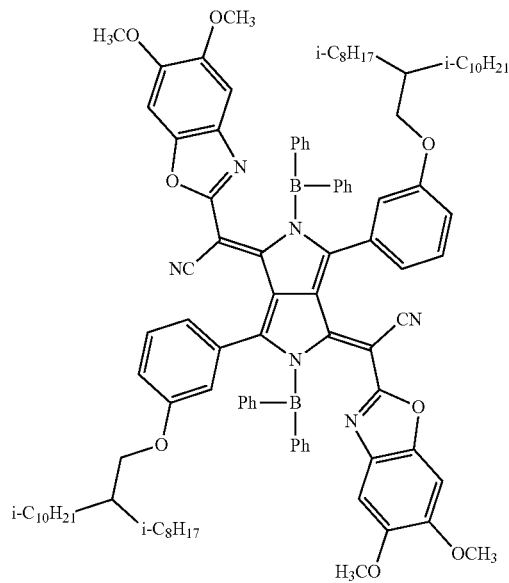

-continued
D-43
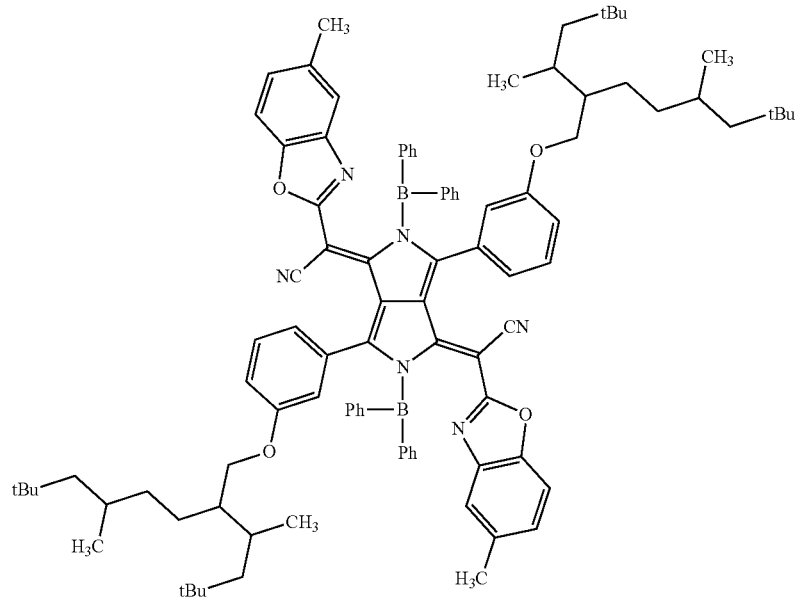
D-44
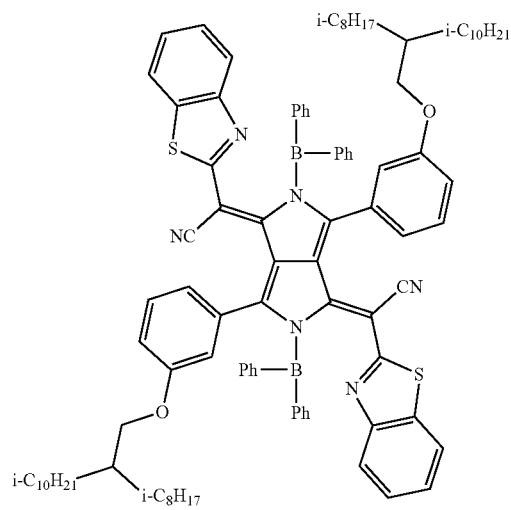
D-45
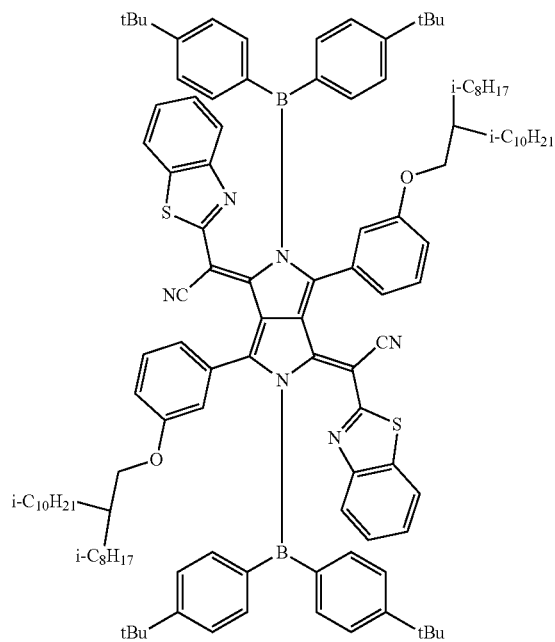

-continued
D-46
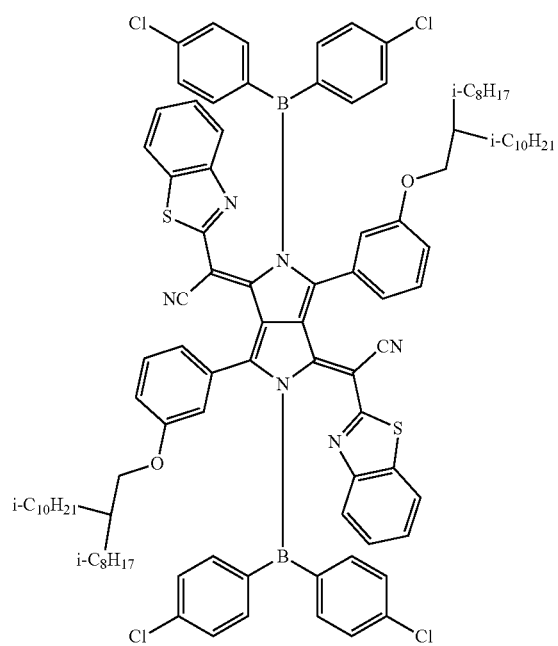
D-47
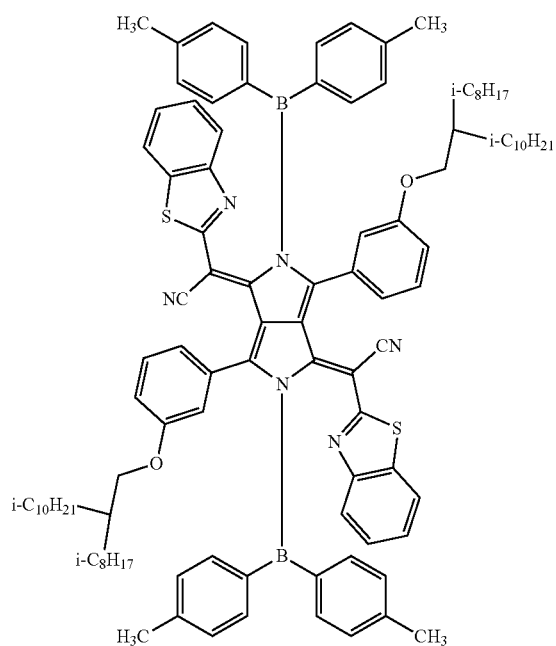
D-48
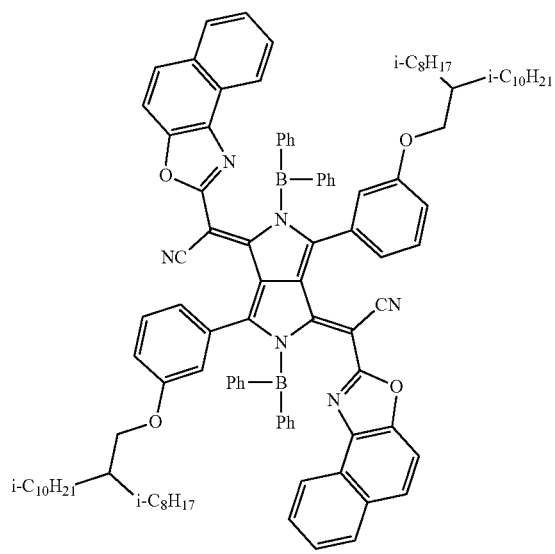
D-49
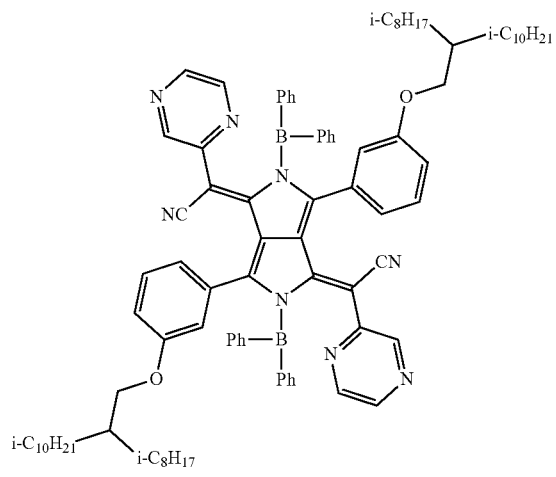

-continued
D-50
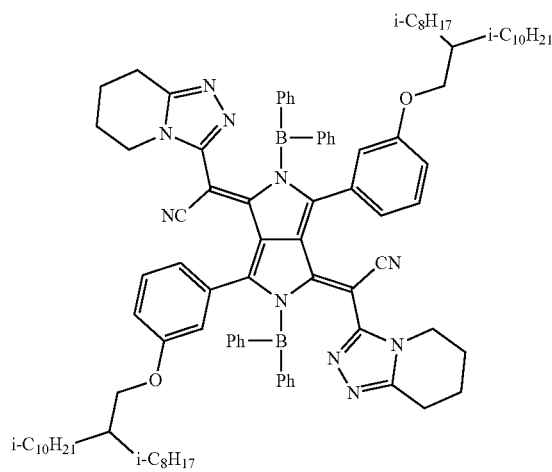
D-51
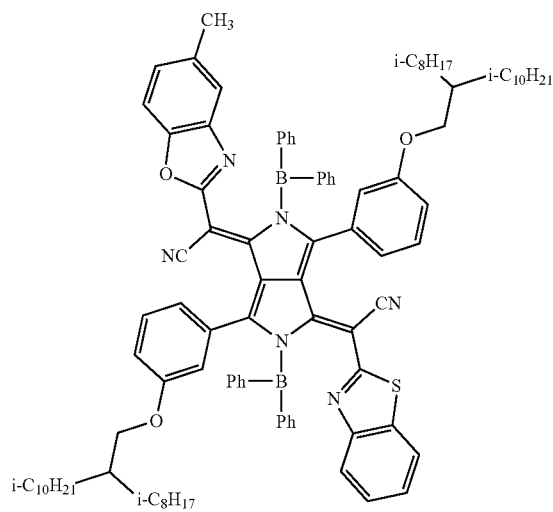
D-52
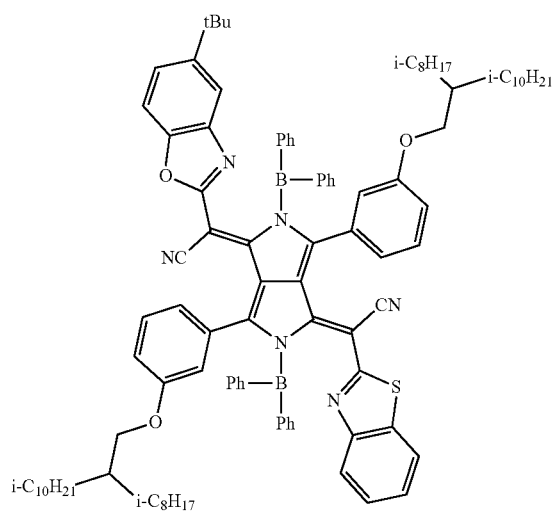
D-53
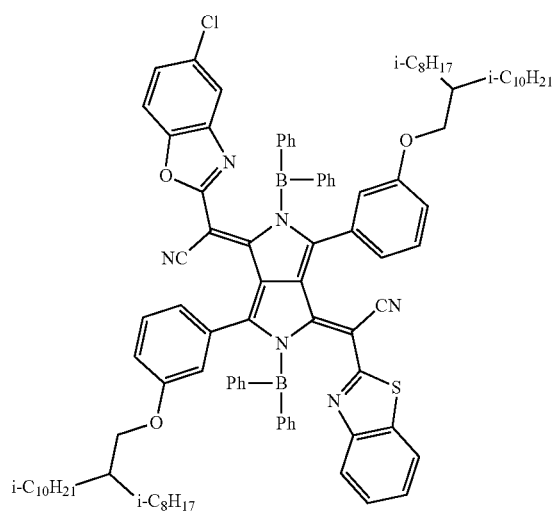
D-54
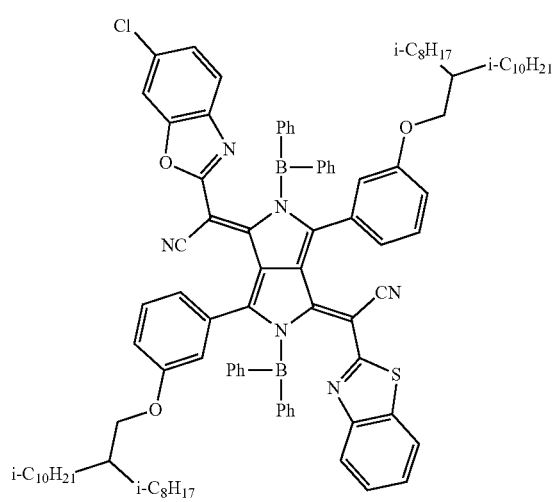
D-55
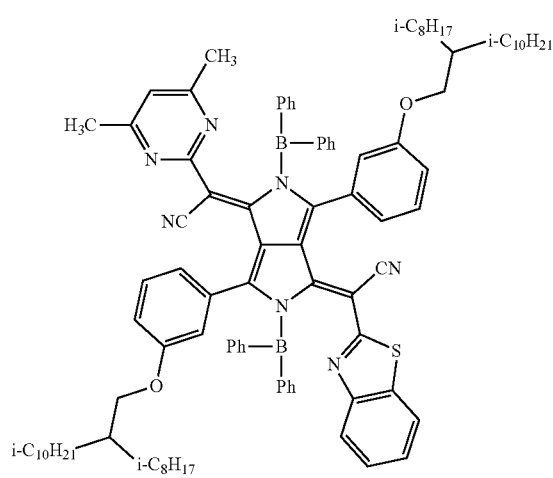

-continued
D-56
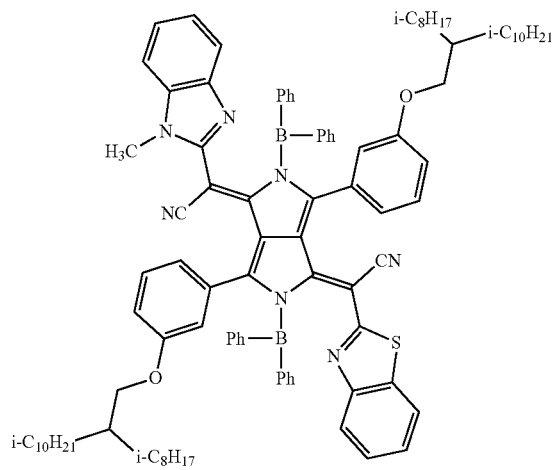
D-57
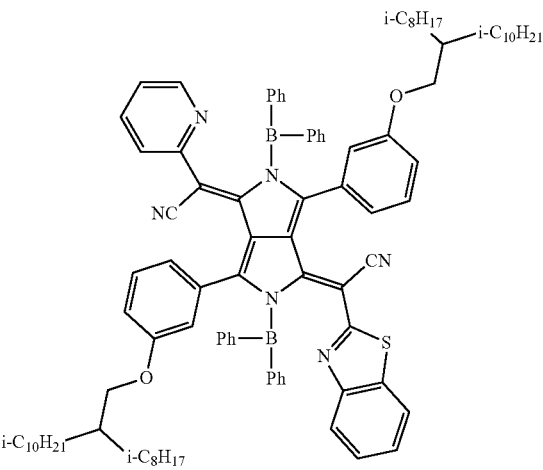
D-58
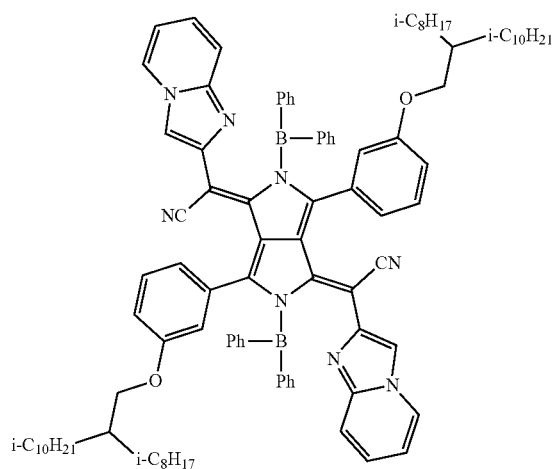
D-59
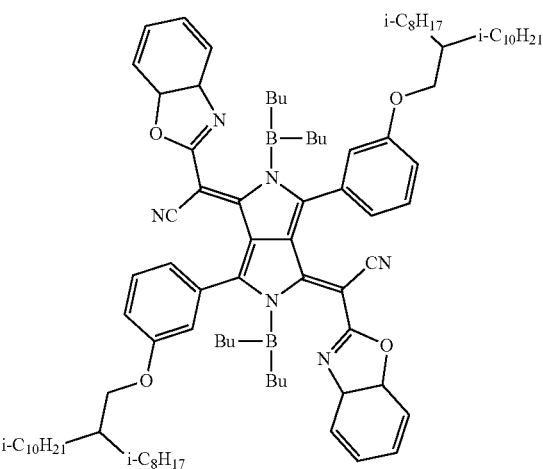
D-60
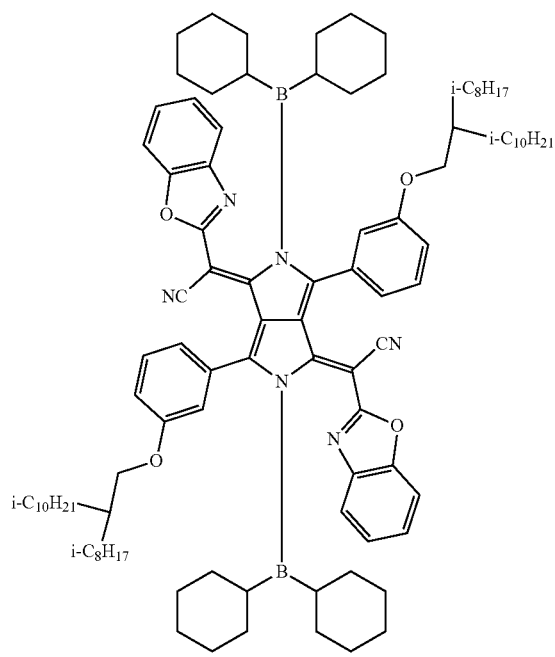

-continued
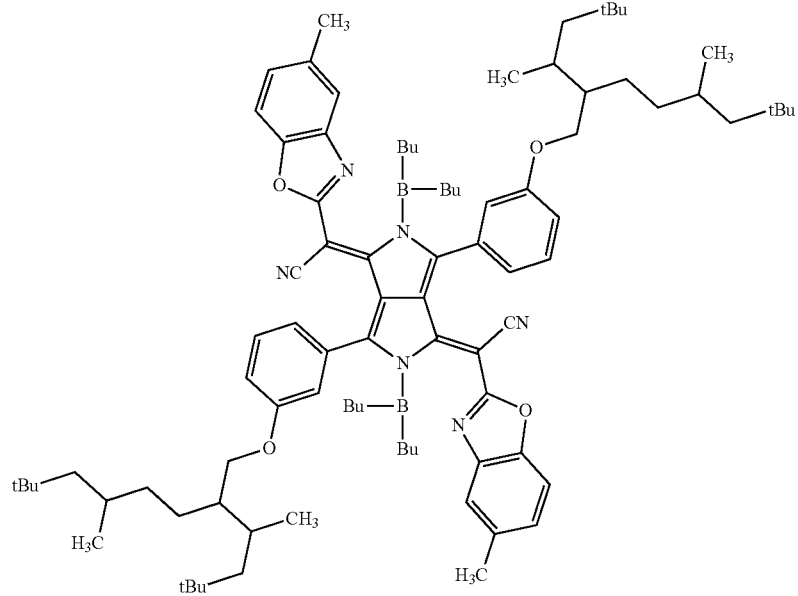
D-61
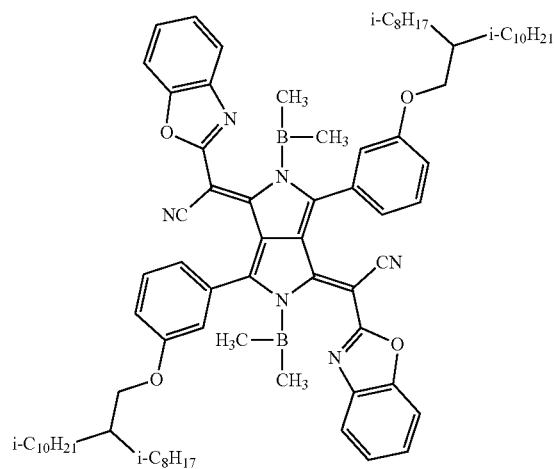
D-62
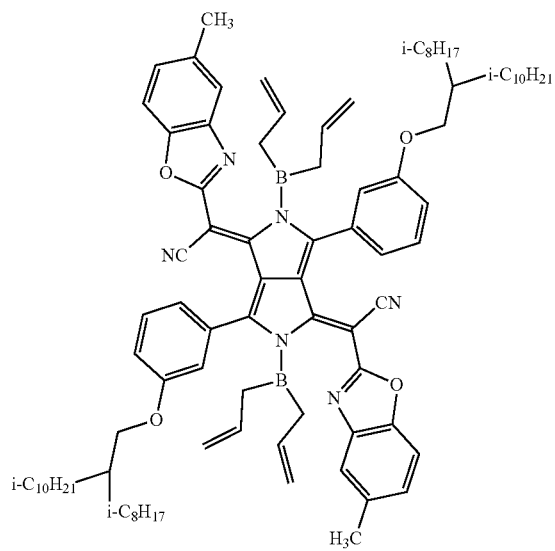
D-63

D-64
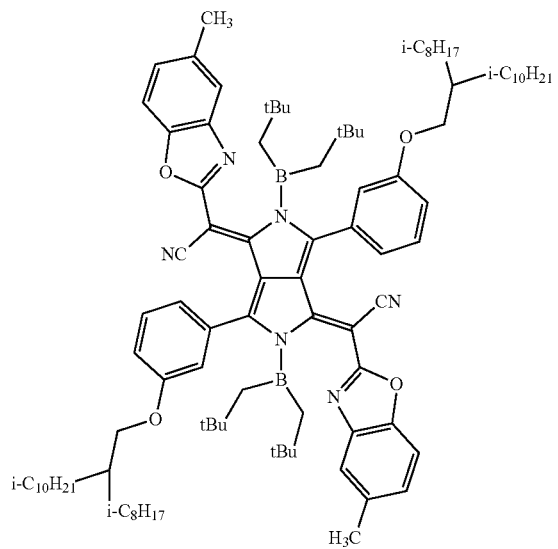
D-65
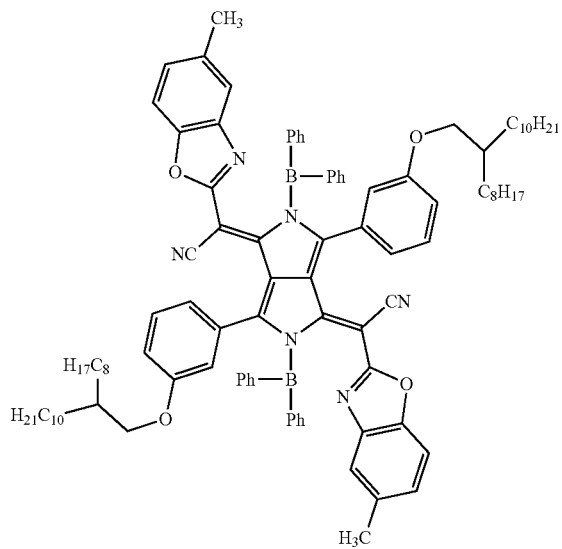
D-66
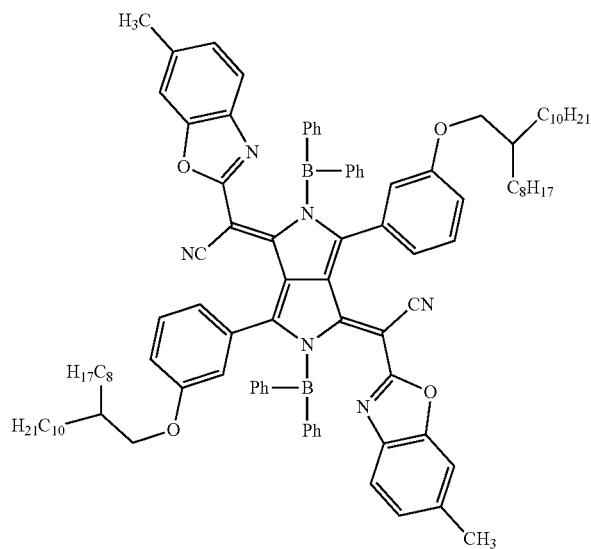
D-67
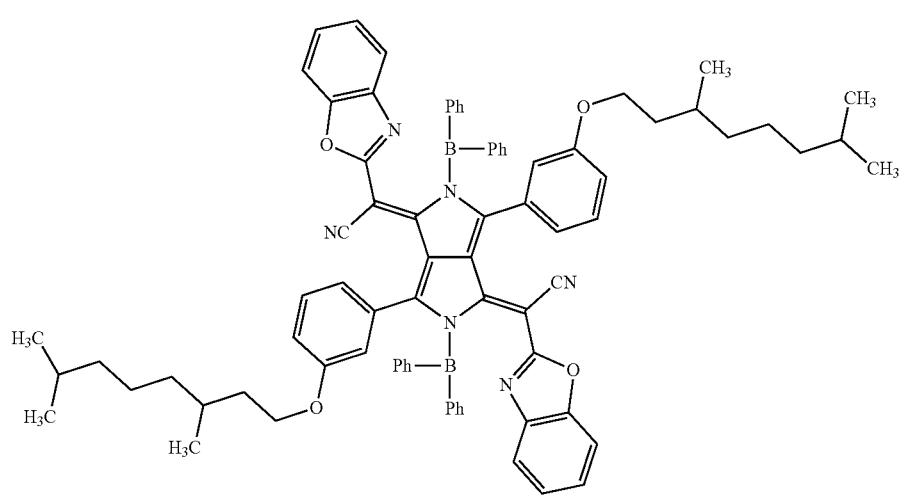

-continued
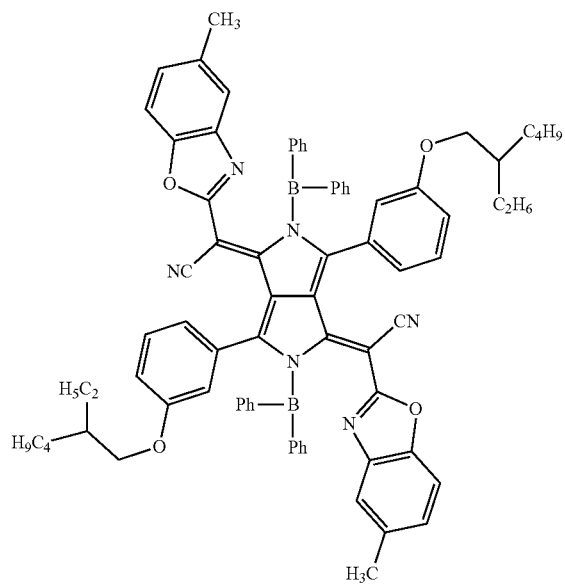
D-68
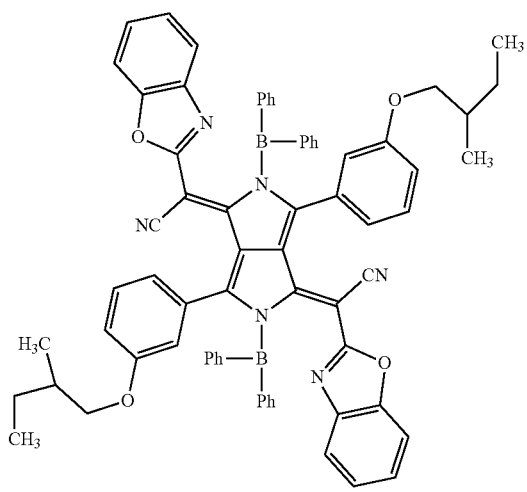
D-69
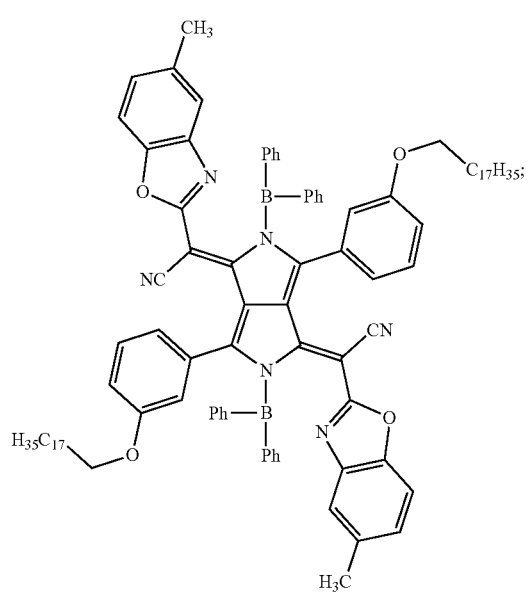
D-70
cyanine coloring agents (E-1) to (E-26), wherein the cyanine coloring agents (E-1) to (E-11) are compounds represented by the following formula:
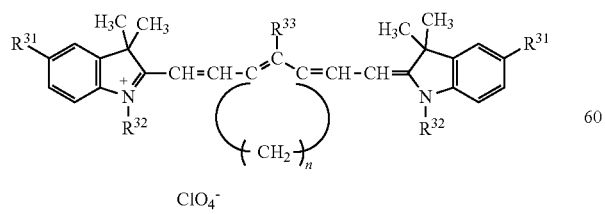
wherein $R^{31}$, $R^{32}$, $R^{33}$ and n in the cyanine coloring agents (E-1) to (E-11) are defined as follows:

| Compound | $R^{31}$ | $R^{32}$ | $R^{33}$ | n |
|---|---|---|---|---|
| E-1 | H | $C_4H_9$ | H | 0 |
| E-2 | H | $C_4H_9$ | H | 2 |
| E-3 | H | $C_4H_9$ | Cl | 3 |
| E-4 | $CH_3$ | $C_4H_9$ | $SC_6H_5$ | 3 |
| E-5 | Cl | $C_2H_5$ | $N(C_6H_5)_2$ | 2 |
| E-6 | $CH_3$ | (H₂O)₃O—⟨C₅H₁₁(t), C₅H₁₁(t)⟩ | $SC_6H_5$ | 3 |
| E-7 | H | (H₂O)₃O—⟨C₅H₁₁(t), C₅H₁₁(t)⟩ | $OC_6H_5$ | 2 |
| E-8 | $CH_3$ | (H₂O)₃O—⟨C₅H₁₁(t), C₅H₁₁(t)⟩ | barbituric acid derivative with $C_2H_5$–N, N–$C_2H_5$ | 2 |
| E-9 | H | $C_{18}H_{37}$ | $SC_6H_5$ | 3 |
| E-10 | H | $CH_3$ | $SO_2C_6H_5$ | 3 |
| E-11 | $CO_2C_2H_5$ | $C_8H_{17}$ | Br | 3 | wherein the cyanine coloring agents (E-12) to (E-20) are compounds represented by the following formula:

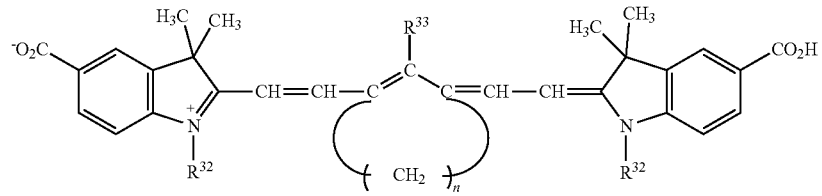

wherein $R^{31}$, $R^{32}$, and n in the cyanine coloring agents (E-12) to (E-20) are defined as follows:

| Compound | $R^{31}$ | $R^{32}$ | n |
|---|---|---|---|
| E-12 | $CH_3$ | $CH_3$ | 0 |
| E-13 | $CH_3$ | Cl | 3 |
| E-14 | $C_2H_4CO_2H$ | Cl | 3 |
| E-15 | $CH_3$ | $CH_3$ | 0 |
| E-16 | $CH_3$ | $N(C_6H_5)_2$ | 2 |
| E-17 | $CH_3$ | $OCH_3$ | 3 |
| E-18 | $C_2H_4CONHPh$ | $N(C_6H_5)_2$ | 2 |
| E-19 | $CH_3$ | $SC_6H_5$ | 2 |
| E-20 | $CH_3$ | —O—⟨C₆H₄⟩—$CH_3$ | 2 | wherein the cyanine coloring agents (E-21) to (E-23) are compounds represented by the following formula:

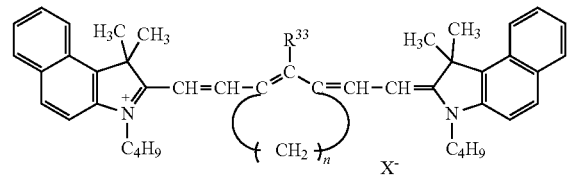

wherein $R^{31}$, n, and $X^-$ in the cyanine coloring agents (E-21) to (E-23) are defined as follows:

| Compound | $R^{31}$ | n | $X^-$ |
|---|---|---|---|
| E-21 | Cl | 3 | $H_3C$—⟨C₆H₄⟩—$SO_3^-$ |
| E-22 | $SC_6H_5$ | 3 | $BF_4^-$ |
| E-23 | $SO_2C_6H_5$ | 2 | $Br^-$ | wherein the cyanine coloring agents (E-24) to (E-26) are compounds represented by the following formula:

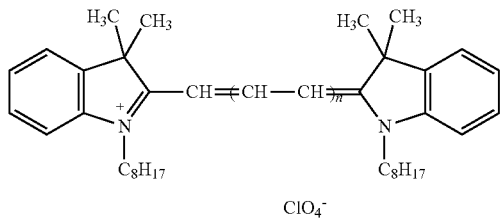

ClO₄⁻ wherein n in the cyanine coloring agents (E-24) to (E-26) are defined as follows:

| Compound | n |
|---|---|
| E-24 | 2 |
| E-25 | 4 |
| E-26 | 5; | and squarylium coloring agents (G-1) to (G-15), wherein the squarylium coloring agents (G-1) and (G-2) are compounds represented by the following formula:

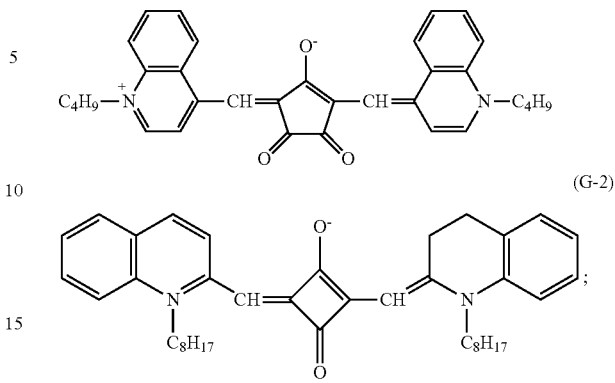

(G-1)

(G-2)

wherein the squarylium coloring agents (G-3) and (G-13) are compounds represented by the following formula:

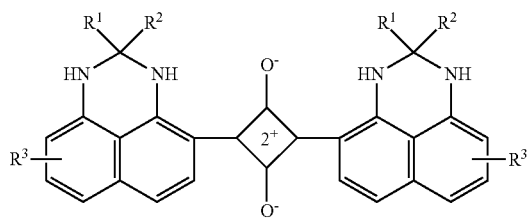

wherein $R^1$, $R^2$, and $R^3$ in the squarylium coloring agents (G-3) and (G-13) are defined as follows:

| Compound | $R^1$ | $R^2$ | $R^3$ |
|---|---|---|---|
| G-3 | $CH_3$ | $C_{11}H_{23}$ | H |
| G-4 | $C_2H_5$ | $C_2H_5$ | H |
| G-5 | $C_5H_{11}$ | $C_5H_{11}$ | H |
| G-6 | $C_2H_5$ | $C_{13}H_{27}$ | H |
| G-7 | $R^1$ and $R^2$ are linked to each other | (cyclohexyl-C₄H₉(t)) | H |
| G-8 | $CH_3$ | (furyl) | H |
| G-9 | $CH_3$ | $C_6H_5$ | H |
| G-10 | $CH_3$ | (N-CH₃ indolyl) | H |
| G-11 | $CH_3$ | (thienyl) | H |
| G-12 | $CH_3$ | $C_{11}H_{23}$ | 4-NHCOCH₃ |
| G-13 | $CH_2OCOC_5H_{11}$ | $CH_2OCOC_5H_{11}$ | H; | and
wherein the cyanine coloring agents (G-14) and (G-15) are compounds represented by the following formula:
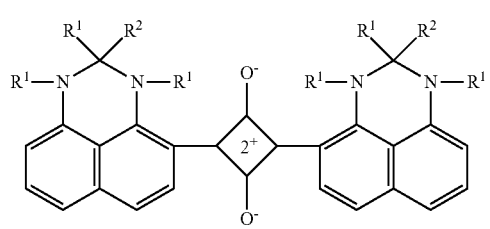
wherein $R^1$, and $R^2$ n in the cyanine coloring agents (G-14) to (G-15) are defined as follows:
| Compound | $R^1$ | $R^2$ |
|---|---|---|
| G-14 | CH₃ | CH₃ |
| G-15 | CH₃ | Both $R^2$ and $R^2$ 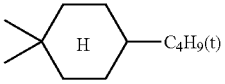 |
* * * * *